(12) United States Patent
Asami et al.

(10) Patent No.: US 9,030,764 B2
(45) Date of Patent: May 12, 2015

(54) IMAGING LENS AND IMAGING APPARATUS

(71) Applicant: FUJIFILM Corporation, Tokyo (JP)

(72) Inventors: Taro Asami, Saitama-ken (JP); Toshiaki Katsuma, Saitama-ken (JP); Toru Ito, Saitama-ken (JP); Masato Kondo, Saitama-ken (JP); Ryoko Otomo, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/219,018

(22) Filed: Mar. 19, 2014

(65) Prior Publication Data

US 2014/0204478 A1    Jul. 24, 2014

Related U.S. Application Data

(63) Continuation of application No. PCT/JP2012/005785, filed on Sep. 12, 2012.

(30) Foreign Application Priority Data

Sep. 29, 2011  (JP) ................................ 2011-213855

(51) Int. Cl.
*G02B 13/04*    (2006.01)
*G02B 3/02*     (2006.01)
*G02B 13/06*    (2006.01)
(Continued)

(52) U.S. Cl.
CPC . *G02B 13/04* (2013.01); *G02B 9/62* (2013.01); *G02B 13/18* (2013.01); *G02B 13/06* (2013.01); *G02B 13/0045* (2013.01)

(58) Field of Classification Search
CPC ...... G02B 13/0045; G02B 9/62; G02B 13/04; G02B 13/18; G02B 13/06; G02B 3/04
USPC .......................... 359/713, 740, 752, 756, 770
See application file for complete search history.

(56) References Cited

U.S. PATENT DOCUMENTS 5,424,877 A    6/1995  Tsuyuki et al.
7,023,628 B1 * 4/2006  Ning ............................. 359/781
(Continued)

FOREIGN PATENT DOCUMENTS

EP    1734393      12/2006
JP    05-288986    11/1993
(Continued)

OTHER PUBLICATIONS

International Search Report PCT/JP2012/005785 dated Jan. 22, 2013.

*Primary Examiner* — Evelyn A Lester
(74) *Attorney, Agent, or Firm* — Young & Thompson

(57) ABSTRACT

An imaging lens substantially consists of six lenses of a negative first lens, a negative second lens, a positive third lens, a positive fourth lens, a negative fifth lens and a positive sixth lens in this order from an object side. When a curvature radius of an object-side surface of the fourth lens is R8, and a curvature radius of an image-side surface of the fourth lens is R9, and an Abbe number of the material of the third lens for d-line is νd3, and an Abbe number of the material of the fifth lens for d-line is νd5, the following conditional formulas (1) and (6) are satisfied:

$-0.61 < (R8+R9)/(R8-R9) < 0.44$     (1); and $38.1 < \nu d3 + \nu d5 < 45.1$     (6).

17 Claims, 21 Drawing Sheets

(51) Int. Cl.
*G02B 13/00* (2006.01)
*G02B 9/62* (2006.01)
*G02B 13/18* (2006.01)

(56) References Cited

U.S. PATENT DOCUMENTS

| | | | |
|---|---|---|---|
| 7,768,719 B2 * | 8/2010 | Jung et al. | 359/762 |
| 7,933,078 B2 * | 4/2011 | Jung et al. | 359/762 |
| 8,902,516 B2 * | 12/2014 | Asami et al. | 359/762 |
| 2001/0000132 A1 | 4/2001 | Nagaoka | |
| 2005/0030639 A1 | 2/2005 | Homma | |
| 2005/0174463 A1 | 8/2005 | Ohzawa et al. | |
| 2007/0139793 A1 | 6/2007 | Kawada | |
| 2007/0217035 A1 | 9/2007 | Baba | |
| 2008/0074761 A1 * | 3/2008 | Yamakawa et al. | 359/794 |
| 2009/0296234 A1 * | 12/2009 | Asami | 359/713 |
| 2010/0142062 A1 * | 6/2010 | Asami et al. | 359/793 |
| 2011/0102660 A1 | 5/2011 | Mihara et al. | |
| 2012/0026285 A1 * | 2/2012 | Yoshida et al. | 359/717 |

FOREIGN PATENT DOCUMENTS

| | | |
|---|---|---|
| JP | 2599312 | 1/1997 |
| JP | 10-333034 | 12/1998 |
| JP | 2004-029282 | 1/2004 |
| JP | 2005-025059 | 1/2005 |
| JP | 2005-221920 | 8/2005 |
| JP | 2006-171597 | 6/2006 |
| JP | 2006-284620 | 10/2006 |
| JP | 2006-349920 | 12/2006 |
| JP | 2007-164079 | 6/2007 |
| JP | 2007-249073 | 9/2007 |
| JP | 2007-279632 | 10/2007 |
| JP | 2008-076716 | 4/2008 |
| JP | 2008-134494 | 6/2008 |
| JP | 2009-092797 | 4/2009 |
| JP | 2009-092798 | 4/2009 |
| JP | 2010-009028 | 1/2010 |
| JP | 2010-160479 | 7/2010 |
| JP | 2010-243709 | 10/2010 |
| JP | 2011-095488 | 5/2011 |

* cited by examiner

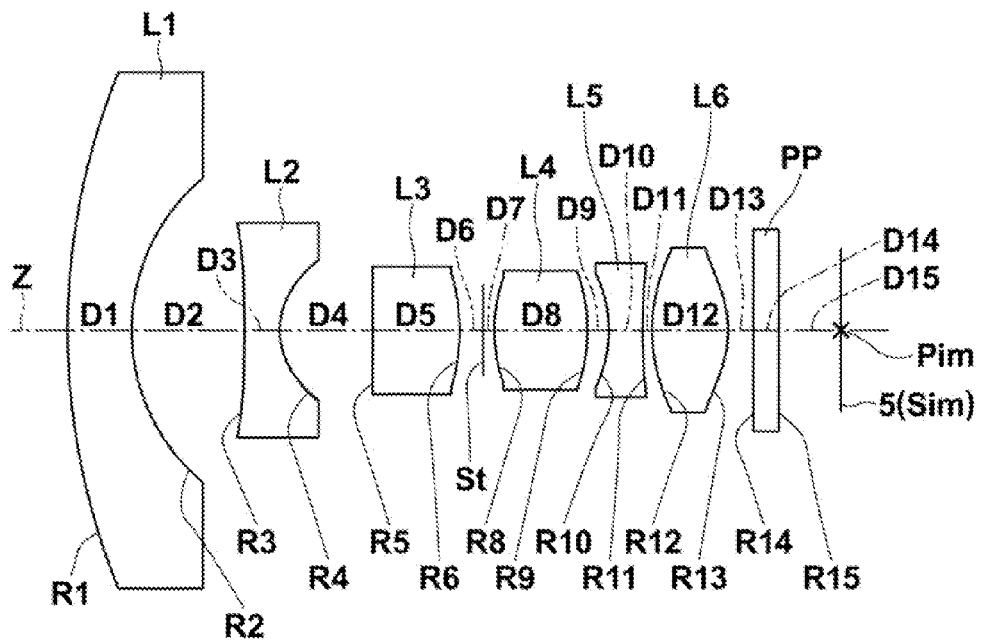
FIG.3 EXAMPLE 1
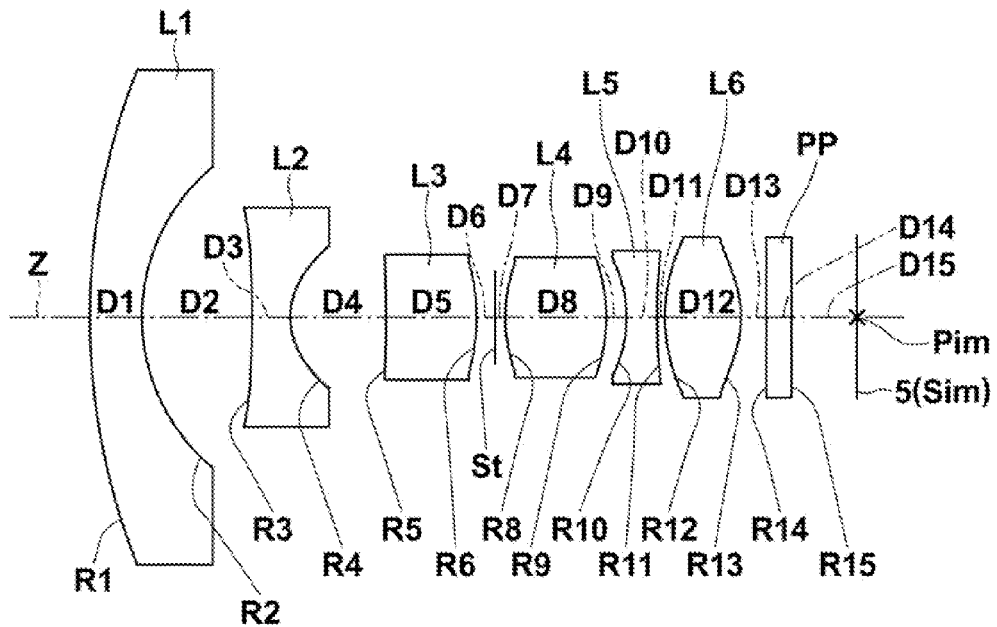
FIG.4 EXAMPLE 2

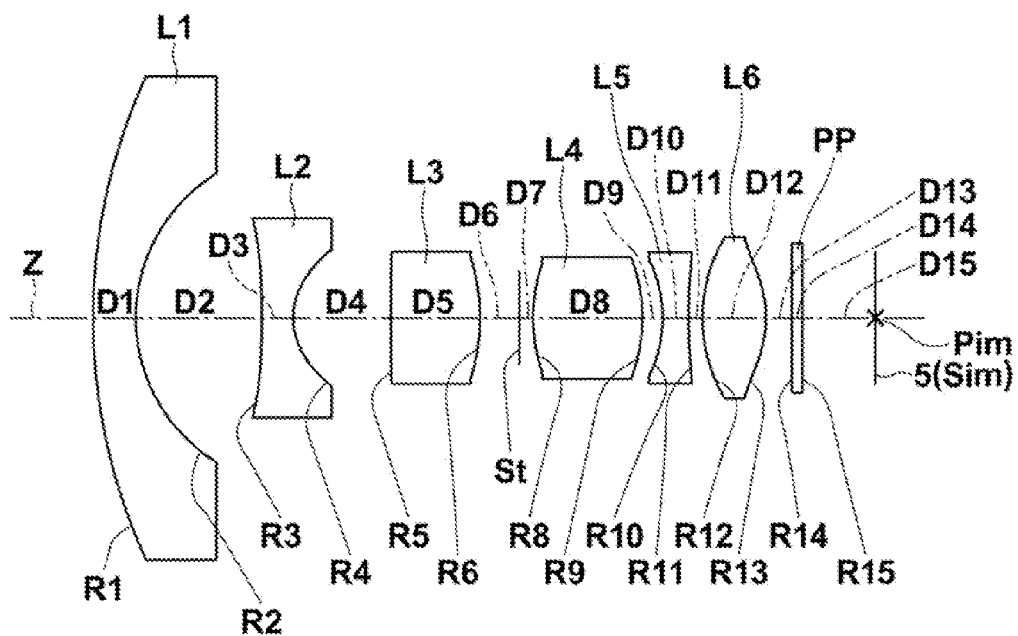
FIG.5 EXAMPLE 3
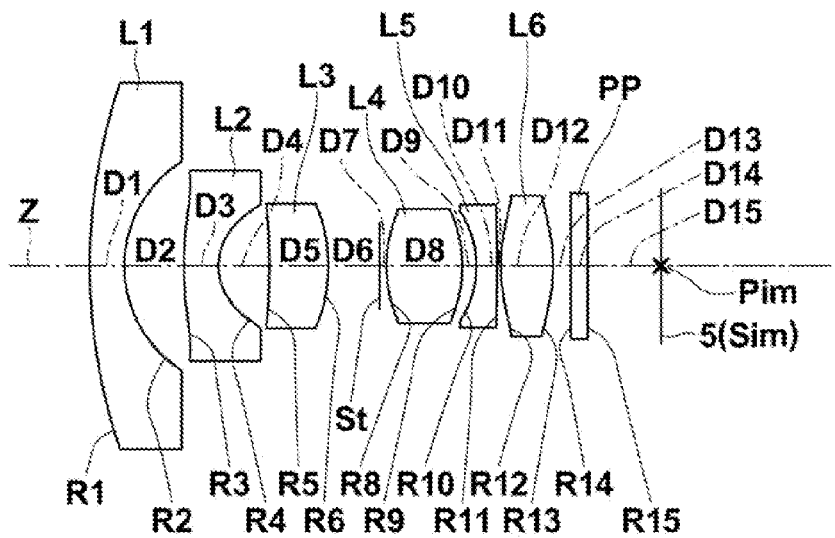
FIG.6 EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15    FIG.17
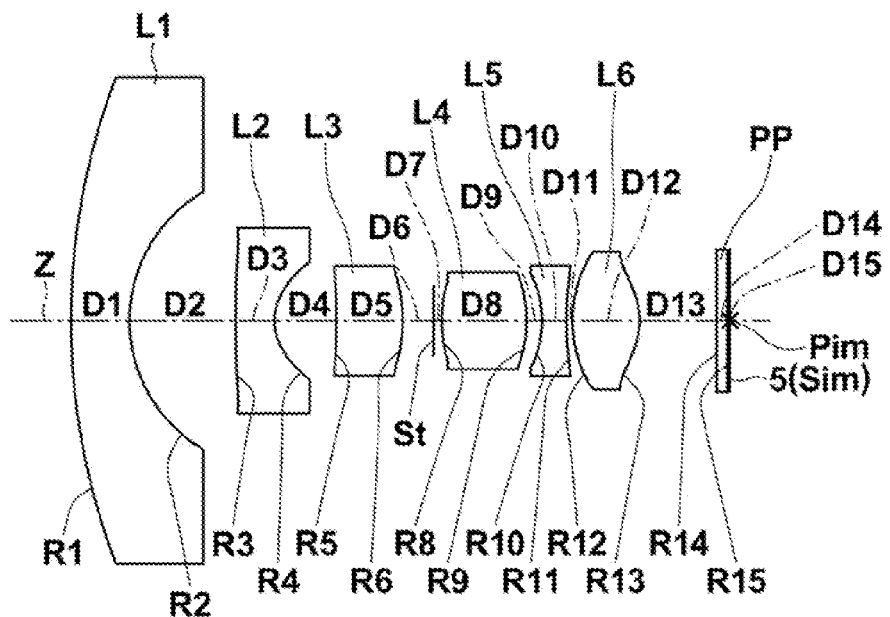
EXAMPLE 16    FIG.18
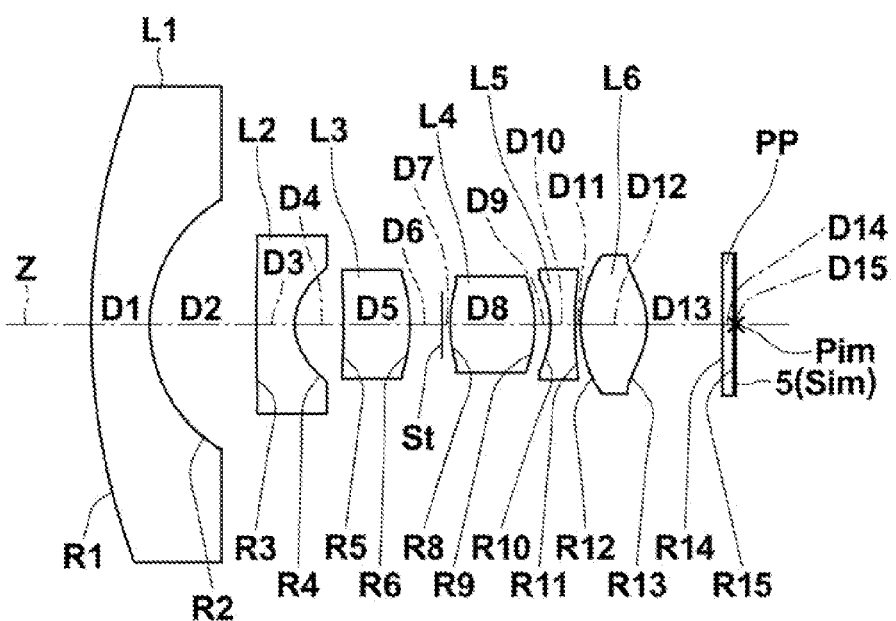

EXAMPLE 17

EXAMPLE 18

EXAMPLE 19

EXAMPLE 1

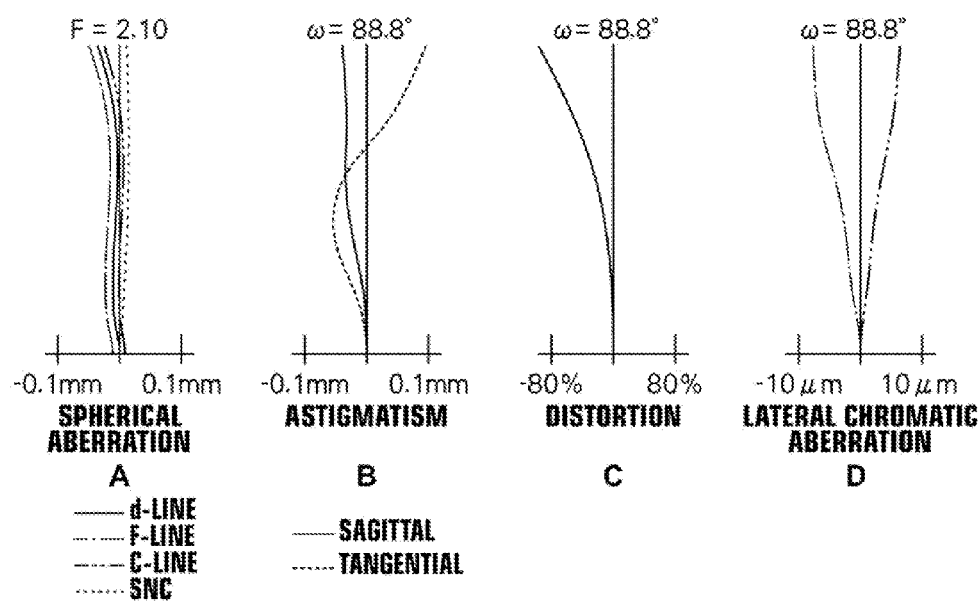
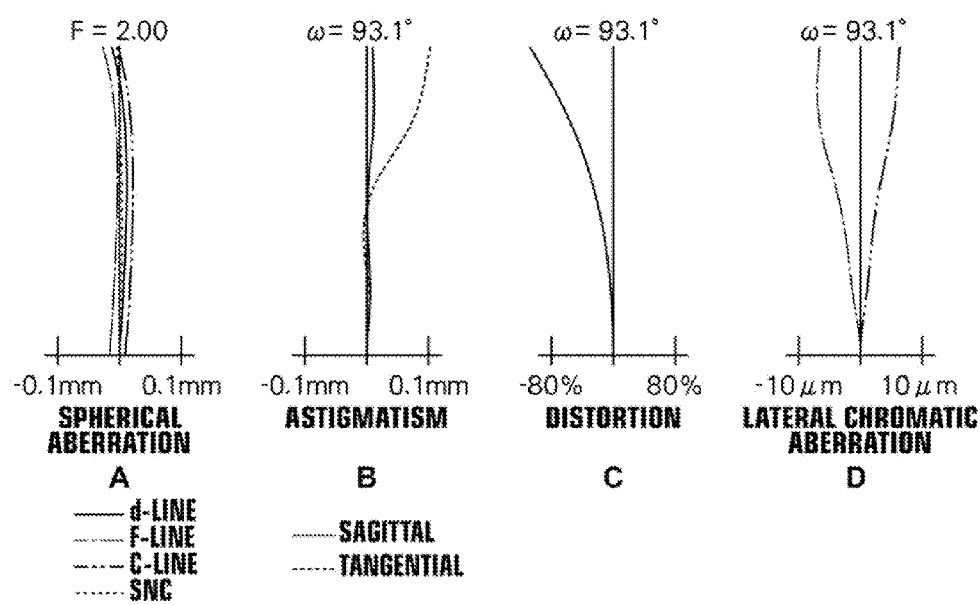

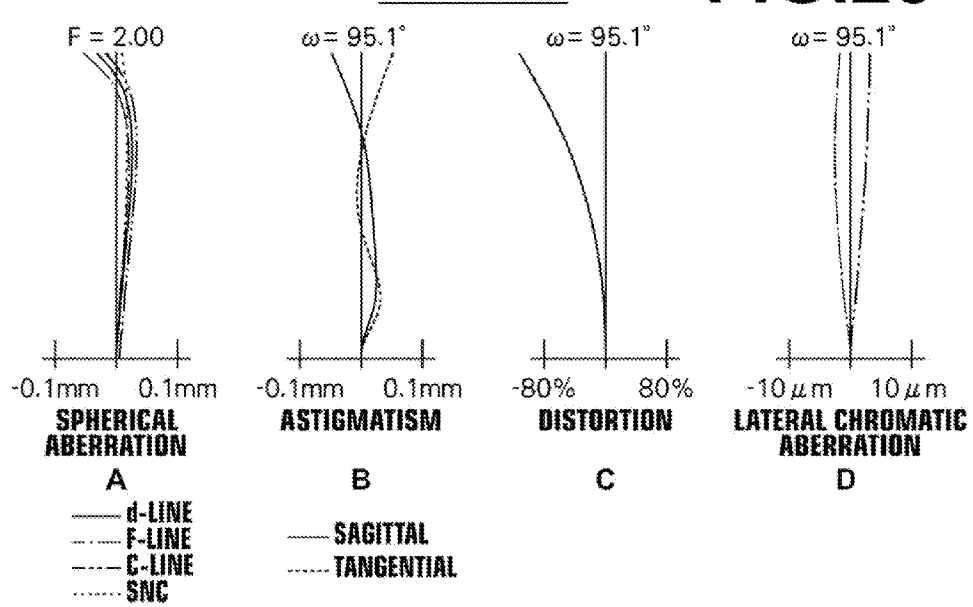
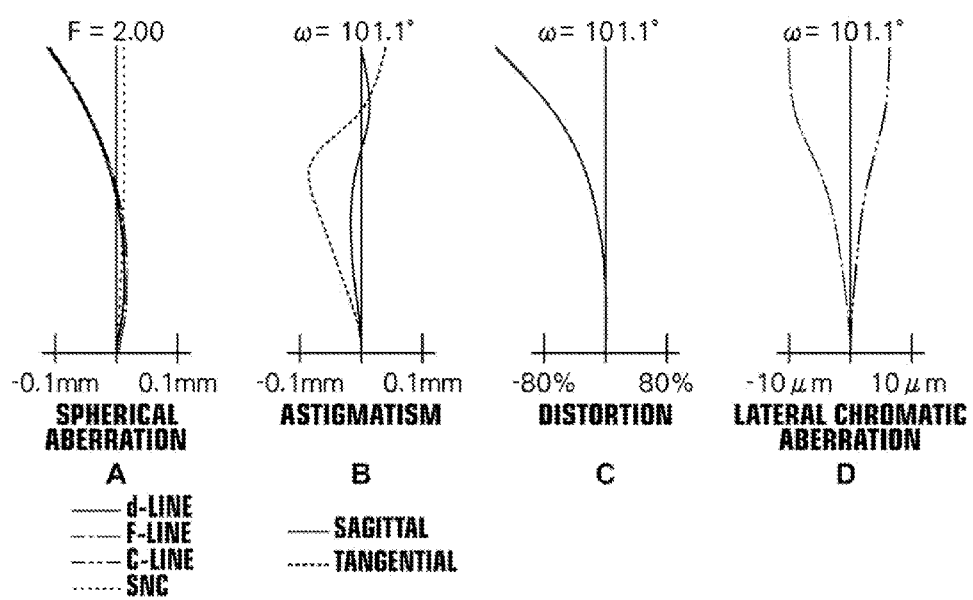

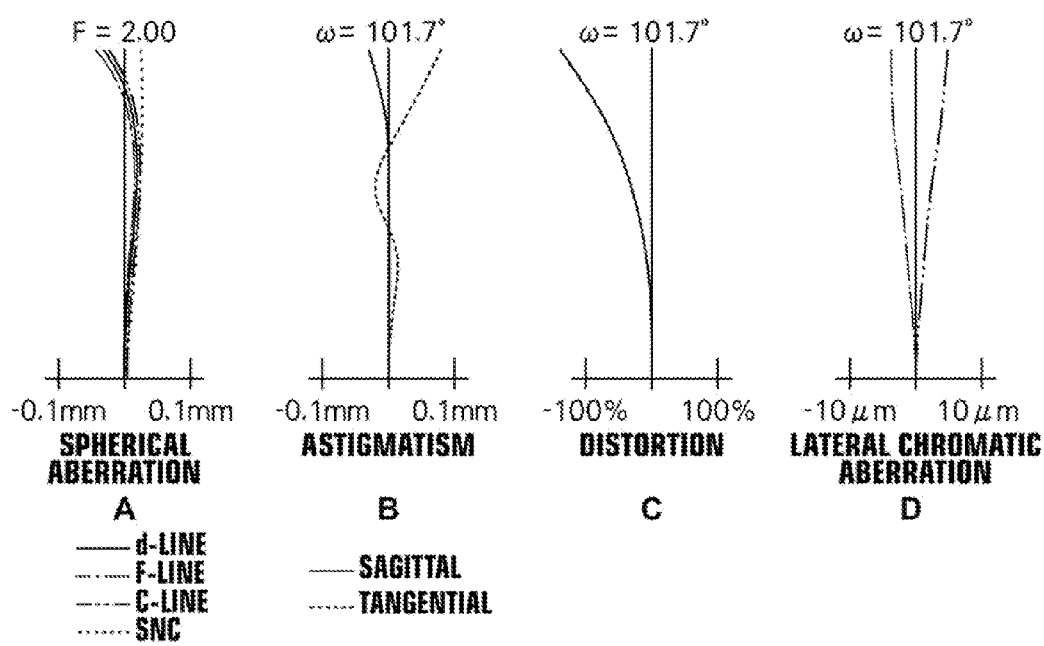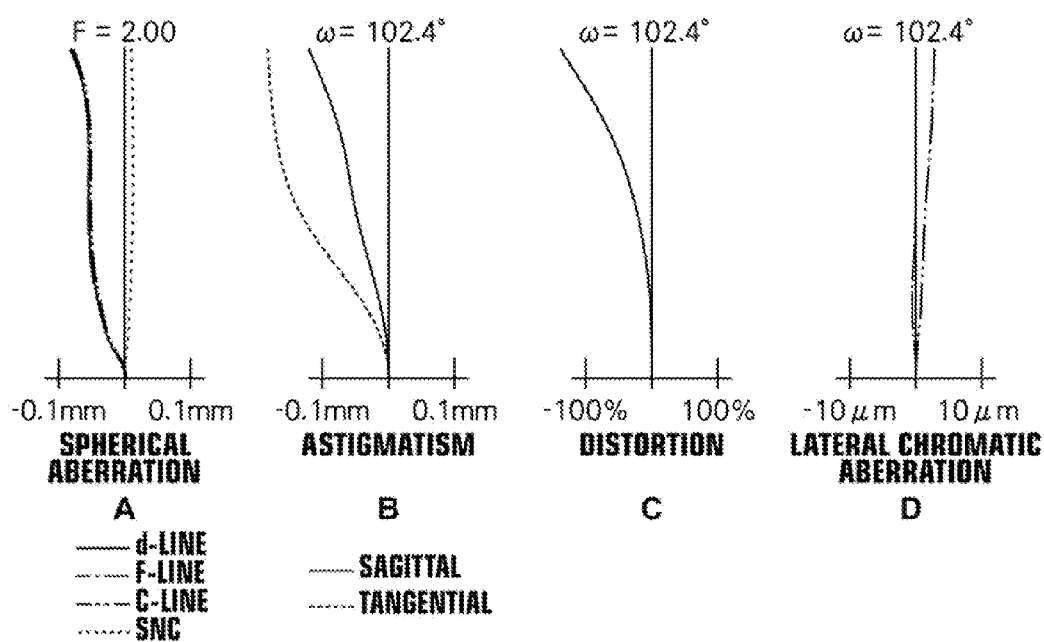

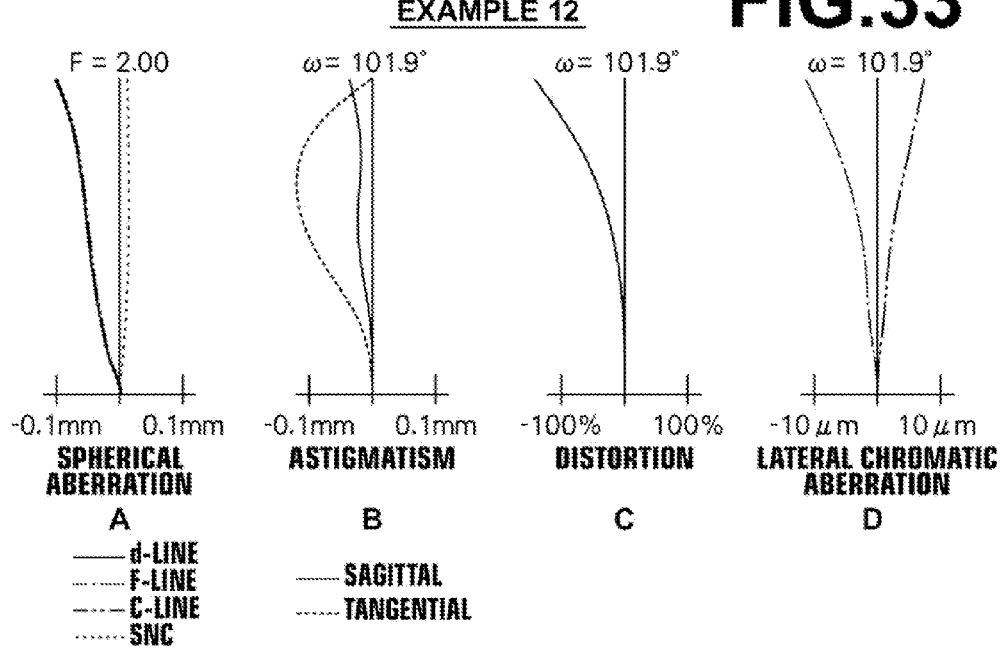
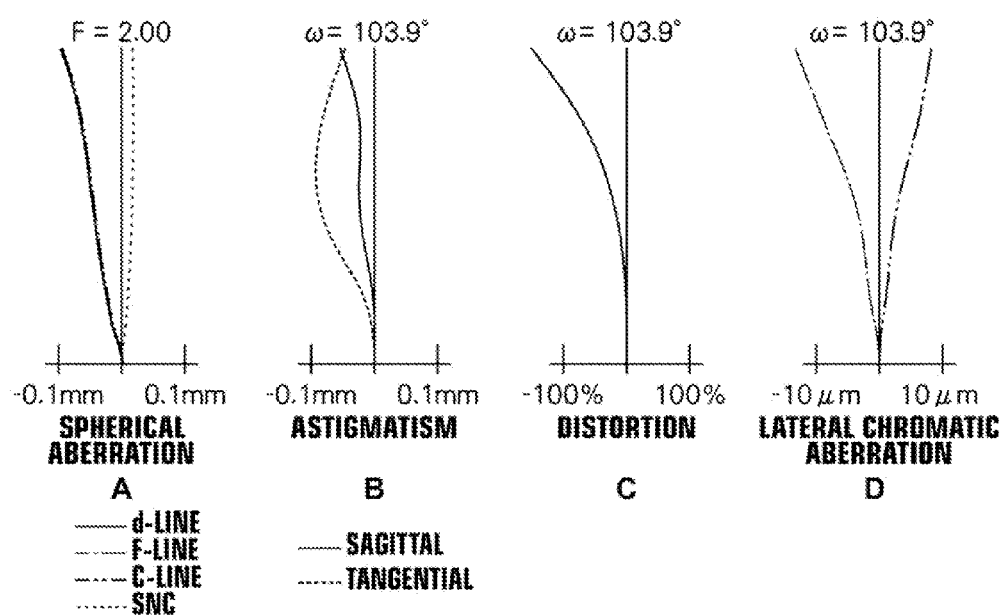

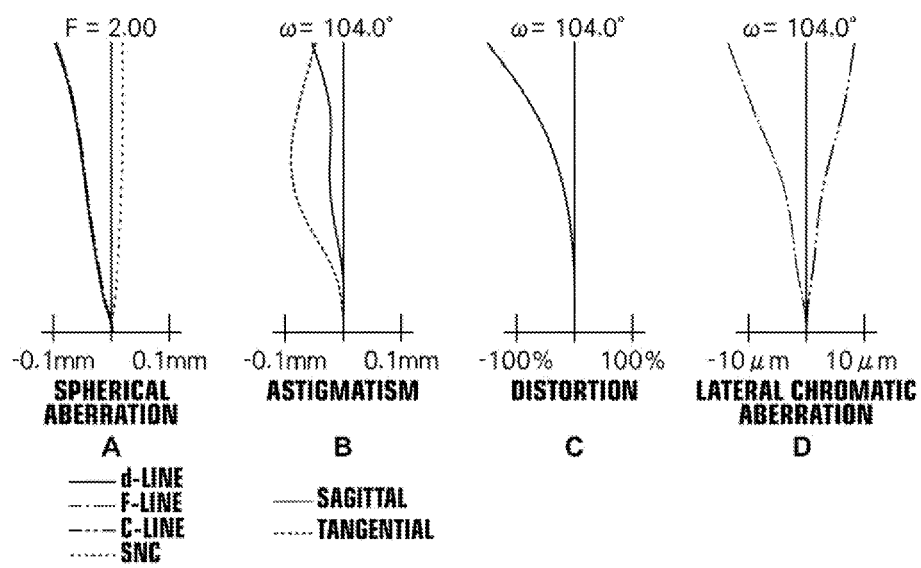
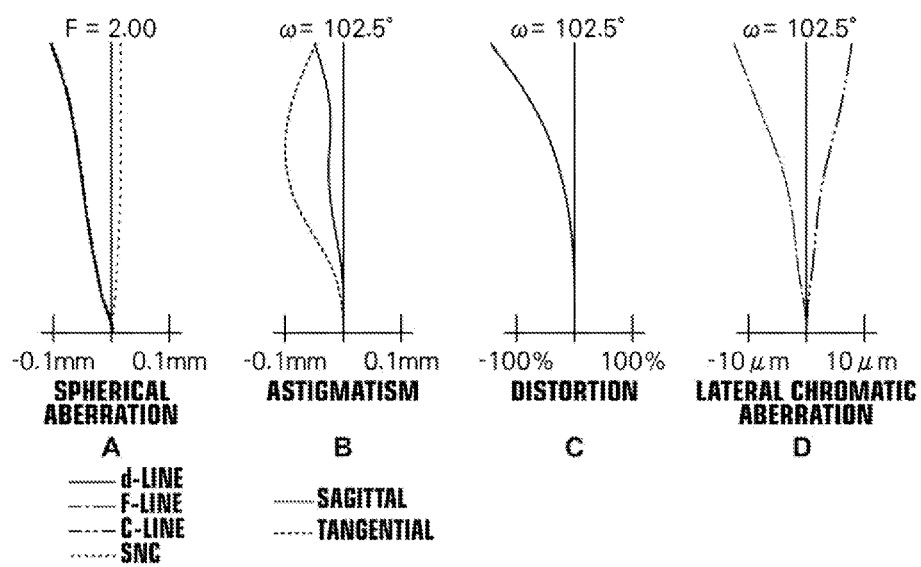

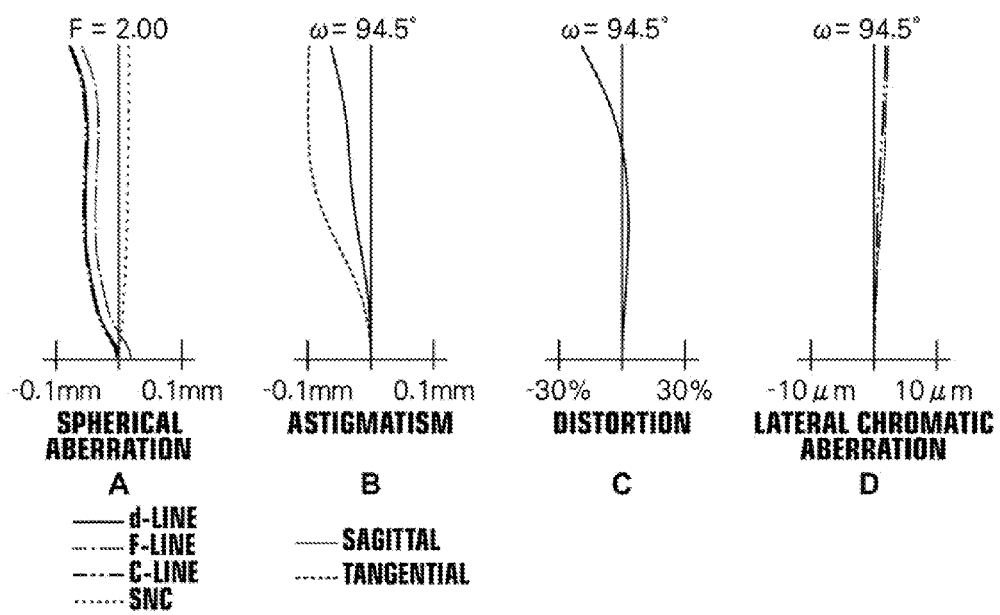
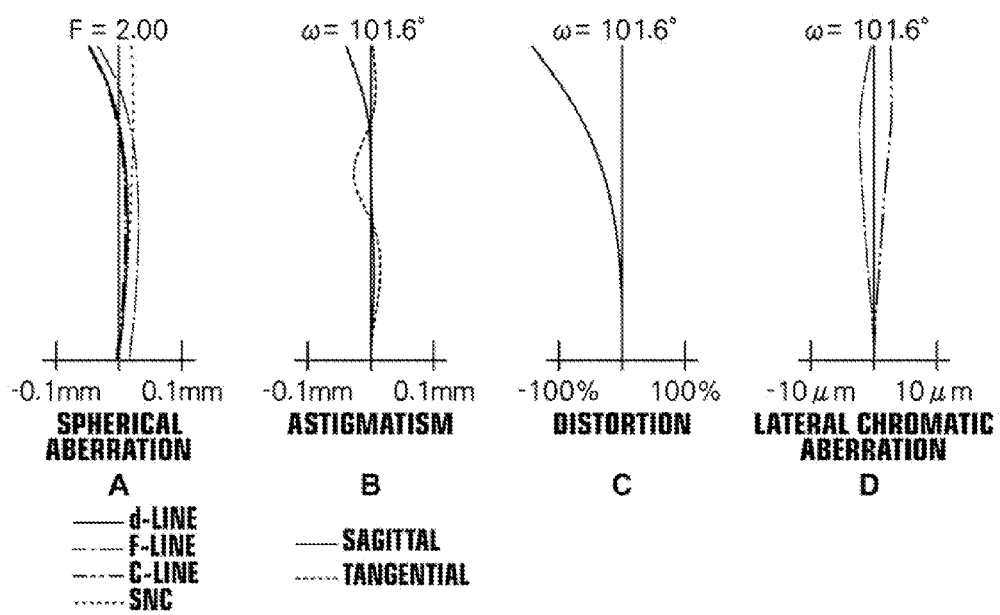

IMAGING LENS AND IMAGING APPARATUS

BACKGROUND OF THE INVENTION

1. Field of the Invention

The present invention relates to an imaging lens and an imaging apparatus. In particular, the present invention relates to an imaging lens appropriate for use in an in-vehicle camera, a camera for a mobile terminal, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became very small, and the resolution of the imaging device became very high. Consequently, the size of the body of imaging equipment including such an imaging device became small. Therefore, reduction in the size of an imaging lens to be mounted on the imaging equipment is also needed in addition to excellent optical performance of the imaging lens. Meanwhile, lenses mounted on an in-vehicle camera, a surveillance camera and the like need to be structurable in small size and at low cost, and to achieve a wide angle of view and high performance.

Japanese Unexamined Patent Publication No. 2005-221920 (Patent Document 1), Japanese Unexamined Patent Publication No. 2006-171597 (Patent Document 2), Japanese Unexamined Patent Publication No. 2006-349920 (Patent Document 3), Japanese Unexamined Patent Publication No. 2007-164079 (Patent Document 4), Japanese Unexamined Patent Publication No. 2007-249073 (Patent Document 5), Japanese Unexamined Patent Publication No. 2008-134494 (Patent Document 6), Japanese Unexamined Patent Publication No. 2010-243709 (Patent Document 7), Japanese Patent No. 2599312 (Patent Document 8), Specification of U.S. Pat. No. 7,023,628 (Patent Document 9), Specification of U.S. Pat. No. 7,768,719 (Patent Document 10), Specification of U.S. Pat. No. 7,933,078 (Patent Document 11), Japanese Unexamined Patent Publication No. 2010-160479 (Patent Document 12), Japanese Unexamined Patent Publication No. 2008-076716 (Patent Document 13), Japanese Unexamined Patent Publication No. 2009-092797 (Patent Document 14), Japanese Unexamined Patent Publication No. 2009-092798 (Patent Document 15), and Japanese Unexamined Patent Publication No. 2010-009028 (Patent Document 16) disclose lens systems consisting of six lenses. The lens system is usable in a camera on which a small-size CCD is mounted, and uses a plastic aspheric lens.

SUMMARY OF THE INVENTION

Meanwhile, requirements for an imaging lens to be mounted on an in-vehicle camera, a surveillance camera or the like have become tougher every year. Therefore, further reduction in the size and the cost of the imaging lens, a wider angle of view, and higher performance are needed.

Here, the lens systems disclosed in Patent Documents 1, 2, 4, 8, 9 and 11 are advantageous to chromatic aberrations and sensitivity, because cemented lenses are used. However, special cementing material and processing are required depending on usage conditions of the lens systems, and that increases the cost. In the lens system disclosed in Patent Document 3, a half angle of view is 40° or less, which is not sufficiently wide to achieve a wide angle of view to be addressed by the present invention. Further, the lens system disclosed in Patent Document 10 is an anamorphic lens. Therefore, it is impossible to produce the lens system at low cost.

In view of the foregoing circumstances, it is an object of the present invention to provide an imaging lens that can achieve small size, low cost, a wide angle of view, and high performance and an imaging apparatus including the imaging lens.

An imaging lens according to a first aspect of the present invention is an imaging lens substantially consisting of six lenses of a negative first lens, a negative second lens, a positive third lens, a positive fourth lens, a negative fifth lens and a positive sixth lens in this order from an object side, wherein the following conditional formulas (1) and (6) are satisfied:

$$-0.61 < (R8+R9)/(R8-R9) < 0.44 \quad (1); \text{ and}$$

$$38.1 < vd3+vd5 < 45.1 \quad (6), \text{ where}$$

R8: a curvature radius of an object-side surface of fourth lens,

R9: a curvature radius of an image-side surface of fourth lens, vd3: an Abbe number of the material of third lens for d-line, and vd5: an Abbe number of the material of fifth lens for d-line.

An imaging lens according to a second aspect of the present invention is an imaging lens substantially consisting of six lenses of a negative first lens, a negative second lens, a positive third lens, a positive fourth lens, a negative fifth lens and a positive sixth lens in this order from an object side, wherein the following conditional formulas (1-1) and (12) are satisfied:

$$-0.11 < (R8+R9)/(R8-R9) \quad (1-1); \text{ and}$$

$$R9/f < -2.9 \quad (12), \text{ where}$$

R8: a curvature radius of an object-side surface of fourth lens,

R9: a curvature radius of an image-side surface of fourth lens, and f: a focal length of an entire system.

An imaging lens according to a third aspect of the present invention is an imaging lens substantially consisting of six lenses of a negative first lens, a negative second lens, a positive third lens, a positive fourth lens, a negative fifth lens and a positive sixth lens in this order from an object side, wherein the following conditional formulas (1-2) and (4) are satisfied:

$$-0.075 < (R8+R9)/(R8-R9) < 0.11 \quad (1-2); \text{ and}$$

$$-1.04 < (R10+R11)/(R10-R11) < -0.34 \quad (4), \text{ where}$$

R8: a curvature radius of an object-side surface of fourth lens,

R9: a curvature radius of an image-side surface of fourth lens,

R10: a curvature radius of an object-side surface of fifth lens, and

R11: a curvature radius of an image-side surface of fifth lens.

An imaging lens according to a fourth aspect of the present invention is an imaging lens substantially consisting of six lenses of a negative first lens, a negative second lens, a positive third lens, a positive fourth lens, a negative fifth lens and a positive sixth lens in this order from an object side, wherein an object-side surface of the third lens is concave, and wherein the following conditional formulas (1-3) and (4-1) are satisfied:

$$(R8+R9)/(R8-R9)<0.17 \quad (1\text{-}3); \text{ and}$$

$$(R10+R11)/(R10-R11)<-0.35 \quad (4\text{-}1), \text{ where}$$

R8: a curvature radius of an object-side surface of fourth lens,
R9: a curvature radius of an image-side surface of fourth lens,
R10: a curvature radius of an object-side surface of fifth lens, and
R11: a curvature radius of an image-side surface of fifth lens.

An imaging lens according to a fifth aspect of the present invention is an imaging lens substantially consisting of six lenses of a negative first lens, a negative second lens, a positive third lens, a positive fourth lens, a negative fifth lens and a positive sixth lens in this order from an object side,
wherein an object-side surface of the third lens is concave, and
wherein the fourth lens is a biconvex lens, and
wherein the fifth lens is a biconcave lens, and
wherein the following conditional formulas (1-3) and (4-1) are satisfied:

$$(R8+R9)/(R8-R9)<0.17 \quad (1\text{-}3); \text{ and}$$

$$(R10+R11)/(R10-R11)<-0.35 \quad (4\text{-}1), \text{ where}$$

R8: a curvature radius of an object-side surface of fourth lens,
R9: a curvature radius of an image-side surface of fourth lens,
R10: a curvature radius of an object-side surface of fifth lens, and
R11: a curvature radius of an image-side surface of fifth lens.

The expression "substantially consisting of six lenses" means that lenses substantially without any refractive power, optical elements other than lenses, such as a stop and a cover glass, mechanical parts, such as a lens flange, a lens barrel, an imaging device, and a hand shake blur correction mechanism, and the like may be included in addition to the six lenses.

The imaging lenses according to the first through fifth aspects of the present invention substantially consist of six lenses. Therefore, it is possible to obtain excellent optical performance. Further, since the number of lenses is suppressed, it is possible to reduce the size of the imaging lens, and to suppress the cost of the imaging lens.

In the present invention, the surface shape of a lens, such as a convex surface, a concave surface, a flat surface, biconcave, meniscus, biconvex, plano-convex and plano-concave, and the sign of the refractive power of a lens, such as a positive lens and a negative lens, are considered in a paraxial region when a lens includes an aspherical surface, unless otherwise mentioned. Further, in the present invention, the sign of a curvature radius is positive when a surface shape is convex toward an object side, and negative when a surface shape is convex toward an image side.

In the imaging lenses according to the first through fifth aspects of the present invention, it is desirable that the following conditional formulas (19) through (23) are satisfied. As a desirable mode, an imaging lens may include a structure of one of the following conditional formulas (19) through (23), or a structure of arbitrary two or more of them in combination:

$$1<(D4+D5)/f<6 \quad (19);$$

$$-1<f/R5<1 \quad (20);$$

$$-3<f/R3<3 \quad (21);$$

$$-30<f23/f<-3 \quad (22); \text{ and}$$

$$2<f45/f<25 \quad (23), \text{ where}$$

D4: an air space between the second lens and the third lens on an optical axis,
D5: a center thickness of the third lens,
f: a focal length of an entire system,
R5: a curvature radius of an object-side surface of the third lens,
R3: a curvature radius of an object-side surface of the second lens,
f23: a combined focal length of the second lens and the third lens, and
f45: a combined focal length of the fourth lens and the fifth lens.

An imaging apparatus of the present invention includes at least one of the first through fifth imaging lenses of the present invention.

According to the imaging lens in the first aspect of the present invention, the arrangement of refractive power in the entire system and the like are appropriately set in the lens system including at least six lenses. Further, conditional formulas (1) and (6) are satisfied. Therefore, it is possible to achieve small size, low cost, and a wide angle of view. Further, it is possible to realize an imaging lens having high optical performance in which various aberrations are excellently corrected, and an excellent image is obtainable even in a peripheral portion of an image formation area.

According to the imaging lens in the second aspect of the present invention, the arrangement of refractive power in the entire system and the like are appropriately set in the lens system including at least six lenses. Further, conditional formulas (1-1) and (12) are satisfied. Therefore, it is possible to achieve small size, low cost, and a wide angle of view. Further, it is possible to realize an imaging lens having high optical performance in which various aberrations are excellently corrected, and an excellent image is obtainable even in a peripheral portion of an image formation area. According to the imaging lens in the third aspect of the present invention, the arrangement of refractive power in the entire system and the like are appropriately set in the lens system including at least six lenses. Further, conditional formulas (1-2) and (4) are satisfied. Therefore, it is possible to achieve small size, low cost, and a wide angle of view. Further, it is possible to realize an imaging lens having high optical performance in which various aberrations are excellently corrected, and an excellent image is obtainable even in a peripheral portion of an image formation area.

According to the imaging lens in the fourth aspect of the present invention, the arrangement of refractive power in the entire system, the surface shape of the third lens, and the like are appropriately set in the lens system including at least six lenses. Further, conditional formulas (1-3) and (4-1) are satisfied. Therefore, it is possible to achieve small size, low cost, and a wide angle of view. Further, it is possible to realize an imaging lens having high optical performance in which various aberrations are excellently corrected, and an excellent image is obtainable even in a peripheral portion of an image formation area.

According to the imaging lens in the fifth aspect of the present invention, the arrangement of refractive power in the entire system, the surface shapes of the third lens, the fourth lens and the fifth lens and the like are appropriately set in the lens system including at least six lenses. Further, conditional formulas (1-3) and (4-1) are satisfied. Therefore, it is possible to achieve small size, low cost, and a wide angle of view. Further, it is possible to realize an imaging lens having high optical performance in which various aberrations are excellently corrected, and an excellent image is obtainable even in a peripheral portion of an image formation area.

The imaging apparatus of the present invention includes the imaging lens of the present invention. Therefore, the imaging apparatus is structurable in small size and at low cost. Further, the imaging apparatus can perform photography with a wide angle of view, and obtain an excellent image with high resolution.

BRIEF DESCRIPTION OF THE DRAWINGS

FIG. 2 is a diagram for explaining the surface shape of a second lens, and the like;

FIG. 3 is a cross section illustrating the lens structure of an imaging lens in Example 1 of the present invention;

FIG. 4 is a cross section illustrating the lens structure of an imaging lens in Example 2 of the present invention;

FIG. 5 is a cross section illustrating the lens structure of an imaging lens in Example 3 of the present invention;

FIG. 6 is a cross section illustrating the lens structure of an imaging lens in Example 4 of the present invention;

FIG. 17 is a cross section illustrating the lens structure of an imaging lens in Example 15 of the present invention;

FIG. 18 is a cross section illustrating the lens structure of an imaging lens in Example 16 of the present invention;

FIG. 23, Sections A through D are aberration diagrams of the imaging lens in Example 2 of the present invention;

FIG. 24, Sections A through D are aberration diagrams of the imaging lens in Example 3 of the present invention;

FIG. 25, Sections A through D are aberration diagrams of the imaging lens in Example 4 of the present invention;

FIG. 26, Sections A through D are aberration diagrams of the imaging lens in Example 5 of the present invention;

FIG. 31, Sections A through D are aberration diagrams of the imaging lens in Example 10 of the present invention;

FIG. 32, Sections A through D are aberration diagrams of the imaging lens in Example 11 of the present invention;

FIG. 33, Sections A through D are aberration diagrams of the imaging lens in Example 12 of the present invention;

FIG. 34, Sections A through D are aberration diagrams of the imaging lens in Example 13 of the present invention;

FIG. 35, Sections A through D are aberration diagrams of the imaging lens in Example 14 of the present invention;

FIG. 36, Sections A through D are aberration diagrams of the imaging lens in Example 15 of the present invention;

FIG. 39, Sections A through D are aberration diagrams of the imaging lens in Example 18 of the present invention;

FIG. 40, Sections A through D are aberration diagrams of the imaging lens in Example 19 of the present invention.

DESCRIPTION OF THE PREFERRED EMBODIMENTS

Embodiments of the present invention will be described in detail with reference to drawings.

[Embodiments of Imaging Lens]

Figure 1:
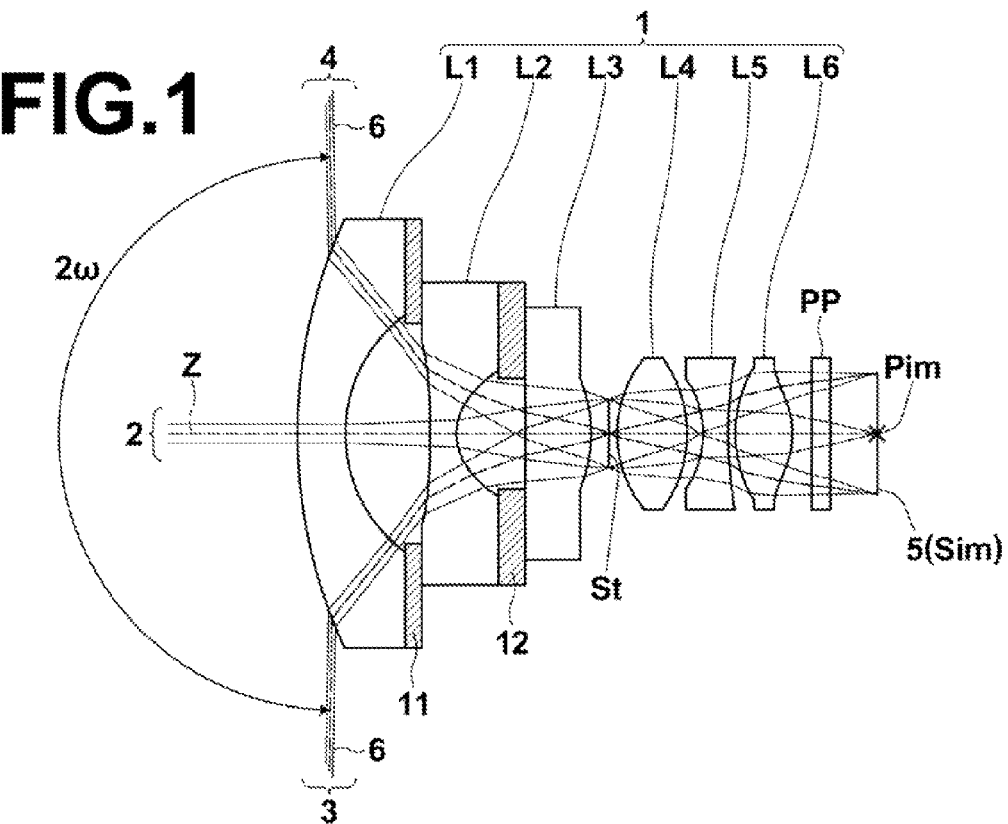
FIG. 1 is a diagram illustrating the structure of an imaging lens according to an embodiment of the present invention, and optical paths.

First, imaging lenses according to embodiments of the present invention will be described with reference to FIG. 1. FIG. 1 is a diagram illustrating the structure of an imaging lens 1 according to an embodiment of the present invention, and optical paths. The imaging lens 1 illustrated in FIG. 1 corresponds to an imaging lens in Example 1 of the present invention, which will be described later.

In FIG. 1, the left side is the object side and the right side is the image side, and axial rays 2 from an object point at infinity and off-axial rays 3, 4 at full angle of view 20 are also illustrated. In FIG. 1, application of the imaging lens 1 to an imaging apparatus is considered, and an imaging device 5 arranged at image plane Sim including image point Pim of the imaging lens 1 is also illustrated. The imaging device 5 converts an optical image formed by the imaging lens 1 into electrical signals. For example, a CCD image sensor, a CMOS image sensor, or the like may be used as the imaging device 5.

When the imaging lens 1 is applied to an imaging apparatus, it is desirable to set a cover glass, and a low-pass filter or an infrared ray cut filter, or the like based on the structure of a camera on which the lens is mounted. FIG. 1 illustrates an example in which parallel-flat-plate-shaped optical member PP, which is assumed to be such elements, is arranged between the most image-side lens and the imaging device 5 (image plane Sim).

First, the structure of the first embodiment of the present invention will be described. An imaging lens according to the first embodiment of the present invention includes negative first lens L1, negative second lens L2, positive third lens L3, positive fourth lens L4, negative fifth lens L5 and positive sixth lens L6 in this order from the object side. In the example illustrated in FIG. 1, aperture stop St is arranged between third lens L3 and fourth lens L4. In FIG. 1, aperture stop St does not represent the shape nor the size of aperture stop St, but the position of aperture stop St on optical axis Z. Since aperture stop St is arranged between third lens L3 and fourth lens L4, it is possible to reduce the size of the entire system. When aperture stop St is located close to the object side, it is possible to easily reduce the outer diameter of first lens L1. However, if aperture stop St is too close to the object side, it becomes difficult to separate axial rays and off-axial rays from each other at first lens L1 and second lens L2, and to correct curvature of field. When aperture stop St is arranged between third lens L3 and fourth lens L4, it is possible to easily correct curvature of field while reducing the lens diameter.

This imaging lens consists of at least six lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since two negative lenses are arranged on the most object side, negative refractive power can be shared by the two lenses, and it is possible to stepwise bend rays entering at a wide angle of view. Therefore, it is possible to effectively correct distortion. Further, there are also three positive lenses of third lens L3, fourth lens L4 and sixth lens L6. Therefore, these three lenses can share convergence action for forming an image on an image plane and correction of various aberrations to be performed by a positive lens or lenses. Hence, it is possible to effectively perform correction.

When third lens L3 is a positive lens, it is possible to excellently correct curvature of field. When fourth lens L4 is a positive lens and fifth lens L5 is a negative lens, it is possible to excellently correct a longitudinal chromatic aberration and a lateral chromatic aberration. When sixth lens L6 is a positive lens, it is possible to reduce an angle at which peripheral rays enter an image formation surface of the imaging lens. Therefore, it is possible to suppress shading. When fourth lens L4 is a positive lens, and fifth lens L5 is a negative lens, and sixth lens L6 is a positive lens, it is possible to excellently correct a spherical aberration and curvature of field. When negative refractive power, negative refractive power, positive refractive power, positive refractive power, negative refractive power and positive refractive power are arranged in this order from the object side, it is possible to obtain a lens system in small size and with a wide angle of view and excellent resolution performance even if the lens system has a small F-number.

The imaging lens according to the first embodiment of the present invention satisfies the following conditional formulas (1) and (6):

$$-0.61 < (R8+R9)/(R8-R9) < 0.44 \quad (1); \text{ and}$$

$$38.1 < vd3+vd5 < 45.1 \quad (6), \text{ where}$$

R8: a curvature radius of an object-side surface of fourth lens L4,

R9: a curvature radius of an image-side surface of fourth lens L4, vd3: an Abbe number of the material of third lens L3 for d-line, and vd5: an Abbe number of the material of fifth lens L5 for d-line.

When the upper limit and the lower limit of conditional formula (1) are satisfied, it is possible to make fourth lens L4 a biconvex lens, and to easily increase the refractive power of fourth lens L4. Therefore, it is possible to easily correct chromatic aberrations. When the lower limit of conditional formula (1) is satisfied, it is possible to easily prevent a curvature radius of the object-side surface from becoming small, and to easily correct curvature of field and a coma aberration. When the upper limit of conditional formula (1) is satisfied, it is possible to easily suppress a difference between the absolute value of a curvature radius of a front surface and the absolute value of a curvature radius of a rear surface, and to easily correct a spherical aberration.

If the value is lower than the lower limit of conditional formula (6), one or both of the Abbe number of third lens L3 and the Abbe number of fifth lens L5 become too small. It is possible to easily correct a longitudinal chromatic aberration and a lateral chromatic aberration. However, the cost of the material is high, and it becomes difficult to produce the lens system at low cost. If the value exceeds the upper limit of conditional formula (6), one or both of the Abbe number of third lens L3 and the Abbe number of fifth lens L5 become large, and correction of a longitudinal chromatic aberration and a lateral chromatic aberration becomes difficult.

Next, the structure of the second embodiment of the present invention will be described. An imaging lens according to the second embodiment of the present invention includes negative first lens L1, negative second lens L2, positive third lens L3, positive fourth lens L4, negative fifth lens L5 and positive sixth lens L6 in this order from the object side.

This imaging lens consists of at least six lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since two negative lenses are arranged on the most object side, negative refractive power can be shared by the two lenses, and it is possible to stepwise bend rays entering at a wide angle of view. Therefore, it is possible to effectively correct distortion. Further, there are also three positive lenses of third lens L3, fourth lens L4 and sixth lens L6. Therefore, these three lenses can share convergence action for forming an image on an image plane and correction of various aberrations to be performed by a positive lens or lenses. Hence, it is possible to effectively perform correction.

When third lens L3 is a positive lens, it is possible to excellently correct curvature of field. When fourth lens L4 is a positive lens and fifth lens L5 is a negative lens, it is possible to excellently correct a longitudinal chromatic aberration and a lateral chromatic aberration. When sixth lens L6 is a positive lens, it is possible to reduce an angle at which peripheral rays enter an image formation surface of the imaging lens. Therefore, it is possible to suppress shading. When fourth lens L4 is a positive lens, and fifth lens L5 is a negative lens, and sixth lens L6 is a positive lens, it is possible to excellently correct a spherical aberration and curvature of field. When negative refractive power, negative refractive power, positive refractive power, positive refractive power, negative refractive power and positive refractive power are arranged in this order from the object side, it is possible to obtain a lens system in small size and with a wide angle of view and excellent resolution performance even if the lens system has a small F-number.

The imaging lens according to the second embodiment of the present invention satisfies the following conditional formulas (1-1) and (12):

$$-0.11 < (R8+R9)/(R8-R9) \quad (1\text{-}1); \text{ and}$$

$$R9/f < -2.9 \quad (12), \text{ where}$$

R8: a curvature radius of an object-side surface of fourth lens L4,

R9: a curvature radius of an image-side surface of fourth lens L4, and f: a focal length of an entire system.

When the lower limit of conditional formula (1-1) is satisfied, it is possible to make fourth lend L4 a biconvex lens, and to easily increase the refractive power of fourth lens L4. Therefore, it is possible to easily correct chromatic aberrations. When the lower limit of conditional formula (1-1) is satisfied, it is possible to easily prevent a curvature radius of the object-side surface from becoming small, and to easily correct curvature of field and a coma aberration.

When the upper limit of conditional formula (12) is satisfied, it is possible to easily prevent the absolute value a curvature radius of the image-side surface of fourth lens L4 from becoming too small, and to easily increase an edge portion of fourth lens L4. Therefore, it is possible to easily process fourth lens L4, and to easily suppress the cost.

Next, the structure of the third embodiment of the present invention will be described. An imaging lens according to the third embodiment of the present invention includes negative first lens L1, negative second lens L2, positive third lens L3, positive fourth lens L4, negative fifth lens L5 and positive sixth lens L6 in this order from the object side.

This imaging lens consists of at least six lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since two negative lenses are arranged on the most object side, negative refractive power can be shared by the two lenses, and it is possible to stepwise bend rays entering at a wide angle of view. Therefore, it is possible to effectively correct distortion. Further, there are also three positive lenses of third lens L3, fourth lens L4 and sixth lens L6. Therefore, these three lenses can share convergence action for forming an image on an image plane and correction of various aberrations to be performed by a positive lens or lenses. Hence, it is possible to effectively perform correction.

When third lens L3 is a positive lens, it is possible to excellently correct curvature of field. When fourth lens L4 is a positive lens and fifth lens L5 is a negative lens, it is possible to excellently correct a longitudinal chromatic aberration and a lateral chromatic aberration. When sixth lens L6 is a positive lens, it is possible to reduce an angle at which peripheral rays enter an image formation surface of the imaging lens. Therefore, it is possible to suppress shading. When fourth lens L4 is a positive lens, and fifth lens L5 is a negative lens, and sixth lens L6 is a positive lens, it is possible to excellently correct a spherical aberration and curvature of field. When negative refractive power, negative refractive power, positive refractive power, positive refractive power, negative refractive power and positive refractive power are arranged in this order from the object side, it is possible to obtain a lens system in small size and with a wide angle of view and excellent resolution performance even if the lens system has a small F-number.

The imaging lens according to the third embodiment of the present invention satisfies the following conditional formulas (1-2) and (4):

$$-0.075 < (R8+R9)/(R8-R9) < 0.11 \quad (1\text{-}2); \text{ and}$$

$$-1.04 < (R10+R11)/(R10-R11) < -0.34 \quad (4), \text{ where}$$

R8: a curvature radius of an object-side surface of fourth lens L4,

R9: a curvature radius of an image-side surface of fourth lens L4,

R10: a curvature radius of an object-side surface of fifth lens L5, and

R11: a curvature radius of an image-side surface of fifth lens L5.

When the upper limit and the lower limit of conditional formula (1-2) are satisfied, it is possible to make fourth lens L4 a biconvex lens, and to easily increase the refractive power of fourth lens L4. Therefore, it is possible to easily correct chromatic aberrations. When the lower limit of conditional formula (1-2) is satisfied, it is possible to easily prevent a curvature radius of the object-side surface from becoming small, and to easily correct curvature of field and a coma aberration. When the upper limit of conditional formula (1-2) is satisfied, it is possible to easily suppress a difference between the absolute value of a curvature radius of a front surface and the absolute value of a curvature radius of a rear surface, and to easily correct a spherical aberration.

When the lower limit of conditional formula (4) is satisfied, it is possible to easily prevent the refractive power of fifth lens L5 from becoming weak, and to easily correct chromatic aberrations. When the upper limit of conditional formula (4) is satisfied, it is possible to easily prevent a curvature radius of the object-side surface of fifth lens L5 from becoming large, and to easily correct chromatic aberrations. Or, it is possible to easily prevent a curvature radius of the image-side surface of fifth lens L5 from becoming too small, and to easily widen the angle of view. Or, it is possible to easily correct curvature of field and a coma aberration.

Next, the structure of the fourth embodiment of the present invention will be described. An imaging lens according to the fourth embodiment of the present invention includes negative first lens L1, negative second lens L2, positive third lens L3, positive fourth lens L4, negative fifth lens L5 and positive sixth lens L6 in this order from the object side.

This imaging lens consists of at least six lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since two negative lenses are arranged on the most object side, negative refractive power can be shared by the two lenses, and it is possible to stepwise bend rays entering at a wide angle of view. Therefore, it is possible to effectively correct distortion. Further, there are also three positive lenses of third lens L3, fourth lens L4 and sixth lens L6. Therefore, these three lenses can share convergence action for forming an image on an image plane and correction of various aberrations to be performed by a positive lens or lenses. Hence, it is possible to effectively perform correction.

When third lens L3 is a positive lens, it is possible to excellently correct curvature of field. When fourth lens L4 is a positive lens and fifth lens L5 is a negative lens, it is possible to excellently correct a longitudinal chromatic aberration and a lateral chromatic aberration. When sixth lens L6 is a positive lens, it is possible to reduce an angle at which peripheral rays enter an image formation surface of the imaging lens. Therefore, it is possible to suppress shading. When fourth lens L4 is a positive lens, and fifth lens L5 is a negative lens, and sixth lens L6 is a positive lens, it is possible to excellently correct a spherical aberration and curvature of field. When negative refractive power, negative refractive power, positive refractive power, positive refractive power, negative refractive power and positive refractive power are arranged in this order from the object side, it is possible to obtain a lens system in small size and with a wide angle of view and excellent resolution performance even if the lens system has a small F-number.

Further, in the imaging lens according to the fourth embodiment, the object-side surface of third lens L3 is concave. When the object-side surface of third lens L3 is concave, it is possible to easily widen the angle of view, and to easily separate axial rays and peripheral rays from each other at first lens L1 and second lens L2.

The imaging lens according to the fourth embodiment of the present invention satisfies the following conditional formulas (1-3) and (4-1):

$$(R8+R9)/(R8-R9)<0.17 \quad (1\text{-}3); \text{and}$$

$$(R10+R11)/(R10-R11)<-0.35 \quad (4\text{-}1), \text{where}$$

R8: a curvature radius of an object-side surface of fourth lens L4,

R9: a curvature radius of an image-side surface of fourth lens L4,

R10: a curvature radius of an object-side surface of fifth lens L5, and

R11: a curvature radius of an image-side surface of fifth lens L5.

When the upper limit of conditional formula (1-3) is satisfied, it is possible to make fourth lens L4 a biconvex lens, and to easily increase the refractive power of fourth lens L4. Therefore, it is possible to easily correct chromatic aberrations. When the upper limit of conditional formula (1-3) is satisfied, it is possible to easily suppress a difference between the absolute value of a curvature radius of a front surface and the absolute value of a curvature radius of a rear surface, and to easily correct a spherical aberration.

When the upper limit of conditional formula (4-1) is satisfied, it is possible to easily prevent a curvature radius of the object-side surface of fifth lens L5 from becoming large, and to easily correct chromatic aberrations. Or, it is possible to easily prevent a curvature radius of the image-side surface of fifth lens L5 from becoming too small, and to easily widen the angle of view. Or, it is possible to easily correct curvature of field and a coma aberration.

Next, the structure of the fifth embodiment of the present invention will be described. An imaging lens according to the fifth embodiment of the present invention includes negative first lens L1, negative second lens L2, positive third lens L3, positive fourth lens L4, negative fifth lens L5 and positive sixth lens L6 in this order from the object side.

This imaging lens consists of at least six lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since two negative lenses are arranged on the most object side, negative refractive power can be shared by the two lenses, and it is possible to stepwise bend rays entering at a wide angle of view. Therefore, it is possible to effectively correct distortion. Further, there are also three positive lenses of third lens L3, fourth lens L4 and sixth lens L6. Therefore, these three lenses can share convergence action for forming an image on an image plane and correction of various aberrations to be performed by a positive lens or lenses. Hence, it is possible to effectively perform correction.

When third lens L3 is a positive lens, it is possible to excellently correct curvature of field. When fourth lens L4 is a positive lens and fifth lens L5 is a negative lens, it is possible to excellently correct a longitudinal chromatic aberration and a lateral chromatic aberration. When sixth lens L6 is a positive lens, it is possible to reduce an angle at which peripheral rays enter an image formation surface of the imaging lens. Therefore, it is possible to suppress shading. When fourth lens L4 is a positive lens, and fifth lens L5 is a negative lens, and sixth lens L6 is a positive lens, it is possible to excellently correct a spherical aberration and curvature of field. When negative refractive power, negative refractive power, positive refractive power, positive refractive power, negative refractive power and positive refractive power are arranged in this order from the object side, it is possible to obtain a lens system in small size and with a wide angle of view and excellent resolution performance even if the lens system has a small F-number.

Further, in the imaging lens according to the fifth embodiment, the object-side surface of third lens L3 is concave, and fourth lens L4 is a biconvex lens, and fifth lens L5 is a biconcave lens. When the object-side surface of third lens L3 is concave, it is possible to easily widen the angle of view, and to easily separate axial rays and peripheral rays from each other at first lens L1 and second lens L2. When fourth lens L4 is a biconvex lens, it is possible to easily increase the refractive power of fourth lens L4, and to easily correct a longitudinal chromatic aberration and a lateral chromatic aberration between fourth lens L4 and fifth lens L5. When fifth lens L5 is a biconcave lens, it is possible to easily increase the refractive power of fifth lens L5, and to easily correct a longitudinal chromatic aberration and a lateral chromatic aberration between fourth lens L4 and fifth lens L.

The imaging lens according to the fifth embodiment of the present invention satisfies the following conditional formulas (1-3) and (4-1):

$$(R8+R9)/(R8-R9)<0.17 \quad (1\text{-}3); \text{and}$$

$$(R10+R11)/(R10-R11)<-0.35 \quad (4\text{-}1), \text{where}$$

R8: a curvature radius of an object-side surface of fourth lens L4,

R9: a curvature radius of an image-side surface of fourth lens L4,

R10: a curvature radius of an object-side surface of fifth lens L5, and

R11: a curvature radius of an image-side surface of fifth lens L5.

When the upper limit of conditional formula (1-3) is satisfied, it is possible to make fourth lens L4 a biconvex lens, and to easily increase the refractive power of fourth lens L4. Therefore, it is possible to easily correct chromatic aberrations. When the upper limit of conditional formula (1-3) is satisfied, it is possible to easily suppress a difference between the absolute value of a curvature radius of a front surface and the absolute value of a curvature radius of a rear surface, and to easily correct a spherical aberration.

When the upper limit of conditional formula (4-1) is satisfied, it is possible to easily prevent a curvature radius of the object-side surface of fifth lens L5 from becoming large, and to easily correct chromatic aberrations. Or, it is possible to easily prevent a curvature radius of the image-side surface of fifth lens L5 from becoming too small, and to easily widen the angle of view. Or, it is possible to easily correct curvature of field and a coma aberration.

Next, structures to be desirably included in the imaging lenses according to the first through fifth embodiments will be given, and the action and effect of the structures will be described. As a desirable mode, an imaging lens may include one of the following structures, or arbitrary two or more of them in combination.

It is desirable that the following conditional formula (9) is satisfied:

$$2<f3/f<12 \qquad (9),\text{ where}$$

f3: a focal length of third lens L3, and
f: a focal length of the entire system.

When the lower limit of conditional formula (9) is satisfied, it is possible to prevent the refractive power of third lens L3 from becoming too strong, and to easily secure a back focus. When the upper limit of conditional formula (9) is satisfied, it is possible to prevent the refractive power of third lens L3 from becoming too weak, and to easily correct curvature of field and a lateral chromatic aberration.

It is desirable that the following conditional formula (19) is satisfied:

$$1<(D4+D5)/f<6 \qquad (19),\text{ where}$$

D4: an air space between second lens L2 and third lens L3 on an optical axis,
D5: a center thickness of third lens L3, and
f: a focal length of an entire system.

When the lower limit of conditional formula (19) is satisfied, it is possible to prevent the distance between second lens L2 and third lens L3 and the center thickness of third lens L3 from becoming too small, and to easily separate axial rays and off-axial rays from each other at first lens L1 and second lens L2. Further, it is possible to easily correct curvature of field, distortion and a coma aberration. When the upper limit of conditional formula (19) is satisfied, it is possible to prevent the distance between second lens L2 and third lens L3 and the center thickness of third lens L3 from becoming too large, and to easily reduce the size of the whole lens.

It is desirable that the following conditional formula (20) is satisfied:

$$-1<f/R5<1 \qquad (20),\text{ where}$$

f: a focal length of an entire system, and
R5: a curvature radius of an object-side surface of third lens L3.

If the value is lower than the lower limit of conditional formula (20), the object-side surface of third lens L3 is a concave surface facing the object side, and the curvature radius of the object-side surface of third lens L3 becomes too small. Therefore, the refractive power of third lens L3 becomes weak, and correction of a lateral chromatic aberration becomes difficult. If the value exceeds the upper limit of conditional formula (20), the object-side surface of third lens L3 is convex toward the object side, and the curvature radius of the object-side surface of third lens L3 becomes too small. Therefore, the refractive power of third lens L3 becomes too strong, and it is possible to excellently correct a lateral chromatic aberration. However, it becomes difficult to correct curvature of field, and to secure a back focus.

It is desirable that the following conditional formula (21) is satisfied:

$$-3<f/R3<3 \qquad (21),\text{ where}$$

f: a focal length of an entire system, and
R3: a curvature radius of an object-side surface of second lens L2.

If the value is lower than the lower limit of conditional formula (21), the object-side surface of second lens L2 is a concave surface facing the object side, and the curvature radius of the object-side surface of second lens L2 becomes too small. Therefore, rays are sharply bent at this surface. Hence, correction of distortion becomes difficult. If the value exceeds the upper limit of conditional formula (21), the object-side surface of second lens L2 is convex, and the curvature radius of the object-side surface of second lens L2 becomes too small. Therefore, the refractive power of second lens L2 becomes weak, and it becomes difficult to widen the angle of view, or the size of the lens system becomes large.

It is desirable that the following conditional formula (22) is satisfied:

$$-30<f23/f<-3 \qquad (22),\text{ where}$$

f23: a combined focal length of second lens L2 and third lens L3, and
f: a focal length of an entire system.

When the lower limit of conditional formula (22) is satisfied, it is possible to prevent the refractive power of second lens L2 from becoming too weak, and to easily widen the angle of view. When the upper limit of conditional formula (22) is satisfied, it is possible to prevent the refractive power of third lens L3 from becoming weak, and to easily correct a lateral chromatic aberration, or it is possible to prevent the refractive power of second lens L2 from becoming too strong, and to easily correct distortion.

It is desirable that the following conditional formula (23) is satisfied:

$$2<f45/f<25 \qquad (23),\text{ where}$$

f45: a combined focal length of fourth lens L4 and fifth lens L5, and
f: a focal length of an entire system.

If the value is lower than the lower limit of conditional formula (23), the combined focal length of fourth lens L4 and fifth lens L5 becomes too small, and it becomes difficult to secure a back focus. If the value exceeds the upper limit of conditional formula (23), the combined focal length of fourth lens L4 and fifth lens L5 becomes too large, and it becomes difficult to excellently correct a longitudinal chromatic aberration and a lateral chromatic aberration.

It is desirable that the following conditional formula (24) is satisfied:

$$9<L/f<20 \qquad (24),\text{ where}$$

L: a length from an object-side surface of first lens to an image plane on an optical axis (a back focus portion is a distance in air), and
f: a focal length of an entire system.

If the value exceeds the upper limit of conditional formula (24), it is possible to easily widen the angle of view, but the size of the lens system becomes large. If the value is lower than the lower limit of conditional formula (24), it is possible to reduce the size of the lens system, but it becomes difficult to widen the angle of view.

It is desirable that the following conditional formula (25) is satisfied:

$$1 < Bf/f < 3 \quad (25),$$ where

Bf: a length from an image-side surface of a most image-side lens to an image plane on an optical axis (a distance in air), and f: a focal length of an entire system.

When the upper limit of conditional formula (25) is satisfied, it is possible to easily reduce the size of the lens system. When the lower limit of conditional formula (25) is satisfied, it is possible to easily secure a back focus, and to easily arrange various filters, a cover glass or the like between the lens and a sensor.

It is desirable that the following conditional formula (26) is satisfied:

$$1.1 \le (R1+R2)/(R1-R2) \le 3.0 \quad (26),$$ where

R1: a curvature radius of an object-side surface of first lens L1, and

R2: a curvature radius of an image-side surface of first lens L1.

When conditional formula (26) is satisfied, it is possible to make first lens L1 a meniscus lens with a convex surface facing the object side. When first lens L1 is a meniscus lens with a convex surface facing the object side, it is possible to receive rays at a wide angle exceeding 1800, and to easily correct distortion. When the upper limit of conditional formula (26) is satisfied, it is possible to prevent the curvature radius of the object-side surface of first lens L1 and the curvature radius of the image-side surface of first lens L1 from becoming too close to each other. Further, it is possible to easily increase the refractive power of first lens L1. Therefore, it is possible to easily widen the angle of view. When the lower limit of conditional formula (26) is satisfied, it is possible to easily reduce the curvature radius of the object-side surface of first lens L1, and to easily correct distortion.

Regarding each of the aforementioned conditional formulas, it is desirable to satisfy a conditional formula in which an upper limit is further added, or a conditional formula in which a lower limit or an upper limit is modified, as will be described below. As a desirable mode, a conditional formula using a modified lower limit and a modified upper limit, as will be described next, in combination may be satisfied. Desirable modification examples of conditional formulas will be described next, as examples. However, the modification examples of the conditional formulas are not limited to those represented by the following expressions. The described modification values may be used in combination.

It is desirable that the upper limit of $(R8+R9)/(R8-R9)$ defined by conditional formula (1), (1-1), (1-2) or (1-3) is 0.44. Then, it is possible to easily correct a spherical aberration. It is desirable that the upper limit of conditional formula (1) is 0.43 to more easily correct a spherical aberration. It is more desirable that the upper limit is 0.25, and 0.17 is even more desirable, and 0.16 is still more desirable. Further, it is more desirable that the upper limit is 0.12, and 0.11 is even more desirable.

It is desirable that the lower limit of $(R8+R9)/(R8-R9)$ is −0.61. Then, it is possible to easily correct curvature of field and a coma aberration. It is desirable that the lower limit of conditional formula (1) is −0.55 to more easily correct curvature of field and a coma aberration, and −0.19 is more desirable, and −0.18 is even more desirable, and −0.11 is still more desirable. Further, it is desirable that the lower limit is −0.10, and −0.075 is more desirable, and −0.06 is most desirable.

Therefore, for example, it is desirable that the following conditional formula (1-4) through (1-7) is satisfied:

$$-0.10 < (R8+R9)/(R8-R9) < 0.25 \quad (1\text{-}4);$$

$$-0.06 < (R8+R9)/(R8-R9) < 0.2 \quad (1\text{-}5);$$

$$-0.10 < (R8+R9)/(R8-R9) < 0.16 \quad (1\text{-}6); \text{ or}$$

$$-0.06 < (R8+R9)/(R8-R9) < 0.12 \quad (1\text{-}7).$$

It is desirable that the upper limit of (R100+R11)/(R10−R11) defined by conditional formula (4) or (4-1) is −0.35. Then, it is possible to easily correct chromatic aberrations, curvature of field and a coma aberration. It is desirable that the upper limit of (R10+R11)/(R10−R11) is −0.34 to more easily correct chromatic aberrations, curvature of field and a coma aberration. It is more desirable that the upper limit is −0.33, and −0.40 is even more desirable, and −0.50 is still more desirable. Further, it is more desirable that the upper limit is −0.52.

It is desirable that the lower limit of conditional formula (R10+R11)/(R10−R11) is −2.68. Then, it is possible easily increase the refractive power of fifth lens L5, and to easily correct chromatic aberrations. It is desirable that the lower limit of conditional formula (4) is −2.0 to more easily correct chromatic aberrations, and −1.5 is even more desirable, and −1.3 is still more desirable. Further, it is more desirable that the lower limit is −1.2, and −1.04 is even more desirable.

Therefore, for example, it is desirable that the following conditional formula (4-2) through (4-5) is satisfied:

$$-2.68 < (R10+R11)/(R10-R11) < -0.34 \quad (4\text{-}2)$$

$$-1.5 < (R10+R11)/(R10-R11) < -0.33 \quad (4\text{-}3);$$

$$-1.3 < (R10+R11)/(R10-R11) < -0.40 \quad (4\text{-}4); \text{ or}$$

$$-1.04 < (R10+R11)/(R10-R11) < -0.52 \quad (4\text{-}5).$$

It is desirable that the upper limit of conditional formula (6) is 45.0. Then, it is possible to easily correct a longitudinal chromatic aberration and a lateral chromatic aberration. It is desirable that the upper limit of conditional formula (6) is 44.8 to more easily correct a longitudinal chromatic aberration and a lateral chromatic aberration, and 44.5 is even more desirable.

It is desirable that the lower limit of conditional formula (6) is 40.0. Then, it is possible to easily produce the lens system at low cost. It is desirable that the lower limit of conditional formula (6) is 41.0 to further reduce the cost of the lens system, and 41.5 is more desirable, and 42.0 is even more desirable, and 42.2 is still more desirable.

Therefore, for example, it is desirable that the following conditional formula (6-1) through (6-3) is satisfied:

$$41.0 < vd3+vd5 < 45.1 \quad (6\text{-}1);$$

$$42.0 < vd3+vd5 < 44.8 \quad (6\text{-}2); \text{ or}$$

$$42.2 < vd3+vd5 < 44.5 \quad (6\text{-}3).$$

It is desirable that the upper limit of conditional formula (9) is 13. Then, it is possible to more easily correct curvature of field and a lateral chromatic aberration. It is more desirable that the upper limit of conditional formula (9) is 12 to more easily correct curvature of field and a lateral chromatic aberration. It is even more desirable that the upper limit is 10.

It is desirable that the lower limit of conditional formula (9) is 4. Then, it is possible to more easily secure a back focus. It is more desirable that the lower limit of conditional formula (9) is 5 to more easily secure a back focus. It is even more desirable that the lower limit is 5.5.

Therefore, for example, it is desirable that the following conditional formula (9-1), (9-2) or (9-3) is satisfied:

$$4 < f3/f < 13 \quad (9\text{-}1);$$

$$5 < f3/f < 12 \quad (9\text{-}2);\text{ or}$$

$$5.5 < f3/f < 10 \quad (9\text{-}3).$$

It is desirable that the upper limit of conditional formula (12) is −2.95. Then, it is possible to more easily correct chromatic aberrations. It is desirable that the upper limit of conditional formula (12) is −2.98 to more easily correct chromatic aberrations, and −3.0 is even more desirable.

It is desirable to set a lower limit for conditional formula (12). In such a case, it is desirable that the lower limit is −6.2. Then, it is possible to easily prevent the absolute value of a curvature radius of the image-side surface of fourth lens L4 from becoming too small, and to easily provide a large edge portion for fourth lens L4. Therefore, it becomes possible to easily process fourth lens L4, and to easily suppress the cost. It is desirable that the lower limit of conditional formula (12) is −6.1 to more easily process fourth lens L4, and to further suppress the cost, and −5.0 is more desirable, and −4.4 is even more desirable, and −4.3 is still more desirable. Further, it is desirable that the lower limit is −4.2.

Therefore, for example, it is desirable that the following conditional formula (12-1) through (12-4) is satisfied:

$$R9/f < -2.95 \quad (12\text{-}1);$$

$$-6.1 < R9/f < -2.95 \quad (12\text{-}2);$$

$$-5.0 < R9/f < -2.98 \quad (12\text{-}3);\text{ or}$$

$$-4.3 < R9/f < -3.0 \quad (12\text{-}4).$$

It is desirable that the lower limit of conditional formula (19) is 1.4. Then, it is possible to easily correct curvature of field, distortion and a coma aberration. It is desirable that the lower limit of conditional formula (19) is 1.7 to more easily correct curvature of field, distortion and a coma aberration. It is even more desirable that the lower limit is 1.9.

It is desirable that the upper limit of conditional formula (19) is 5.5. Then, it is possible to more easily reduce the size of the system. It is desirable that the upper limit of conditional formula (19) is 5.0 to more easily reduce the size, and 4.4 is more desirable.

Therefore, for example, it is desirable that the following conditional formula (19-1), (19-2) or (19-3) is satisfied:

$$1.4 < (D4+D5)/f < 5.5 \quad (19\text{-}1);$$

$$1.7 < (D4+D5)/f < 5.0 \quad (19\text{-}2);\text{ or}$$

$$1.9 < (D4+D5)/f < 4.4 \quad (19\text{-}3).$$

It is desirable that the lower limit of conditional formula (20) is −0.9. Then, it is possible to more easily correct a lateral chromatic aberration. It is desirable that the lower limit of conditional formula (20) is −0.5 to more easily correct a lateral chromatic aberration. It is even more desirable that the lower limit is −0.2.

It is desirable that the upper limit of conditional formula (20) is 0.9. Then, it is possible to more easily correct curvature of field. It is desirable that the upper limit of conditional formula (20) is 0.5 to more easily correct curvature of field, and 0.2 is more desirable.

Therefore, for example, it is desirable that the following conditional formula (20-1), (20-2) or (20-3) is satisfied:

$$-0.9 < f/R5 < 0.9 \quad (20\text{-}1);$$

$$-0.5 < f/R5 < 0.5 \quad (20\text{-}2);\text{ or}$$

$$-0.2 < f/R5 < 0.2 \quad (20\text{-}3).$$

It is desirable that the lower limit of conditional formula (21) is −2.5. Then, it is possible to easily correct distortion. It is desirable that the lower limit of conditional formula (21) is −2.0 to more easily correction distortion. It is more desirable that the lower limit is −1.5.

It is desirable that the upper limit of conditional formula (21) is 2.0. Then, it is possible to more easily widen the angle of view, and to more easily reduce the size of the system. It is desirable that the upper limit of conditional formula (21) is 1.5 to more easily wide the angle of view and to more easily reduce the size of the system, and 1.0 is more desirable.

Therefore, for example, it is desirable that the following conditional formula (21-1), (21-2) or (21-3) is satisfied:

$$-2.5 < f/R3 < 2.0 \quad (21\text{-}1);$$

$$-2.0 < f/R3 < 1.5 \quad (21\text{-}2);\text{ or}$$

$$-1.5 < f/R3 < 1.0 \quad (21\text{-}3).$$

It is desirable that the lower limit of conditional formula (22) is −25. Then, it is possible to more easily widen the angle of view. It is desirable that the lower limit of conditional formula (22) is −20 to more easily widen the angle of view. It is more desirable that the lower limit is −19.5.

It is desirable that the upper limit of conditional formula (22) is −4. Then, it is possible to more easily correct a lateral chromatic aberration or distortion. It is desirable that the upper limit of conditional formula (22) is −5 to more easily correct a lateral chromatic aberration or distortion, and −5.5 is more desirable.

Therefore, for example, it is desirable that the following conditional formula (22-1), (22-2) or (22-3) is satisfied:

$$-25 < f23/f < -4 \quad (22\text{-}1);$$

$$-20 < f23/f < -5 \quad (22\text{-}2);\text{ or}$$

$$-19.5 < f23/f < -5.5 \quad (22\text{-}3).$$

It is desirable that the lower limit of conditional formula (23) is 3. Then, it is possible to easily secure a back focus. It is desirable that the lower limit of conditional formula (23) is 4 to more easily secure a back focus. It is more desirable that the lower limit is 4.1.

It is desirable that the upper limit of conditional formula (23) is 22. Then, it is possible to more easily correct a longitudinal chromatic aberration and a lateral chromatic aberration. It is desirable that the upper limit of conditional formula (23) is 20 to more easily correct a longitudinal chromatic aberration and a lateral chromatic aberration, and 18 is more desirable.

Therefore, for example, it is desirable that the following conditional formula (23-1), (23-2) or (23-3) is satisfied:

$$3 < f45/f < 22 \quad (23\text{-}1);$$

$$4 < f45/f < 20 \quad (23\text{-}2);\text{ or}$$

$$4.1 < f45/f < 18 \quad (23\text{-}3).$$

It is desirable that the upper limit of conditional formula (24) is 19.8. When the upper limit of conditional formula (24) is 19.8, it is possible to more easily reduce the size of the lens system.

Further, it is more desirable that the upper limit of conditional formula (24) is 19.3. It is even more desirable that the upper limit is 19.0.

It is desirable that the lower limit of conditional formula (24) is 9.5. When the lower limit of conditional formula (24) is 9.5, it is possible to more easily widen the angle of view. It is desirable that the lower limit of conditional formula (24) is 10. It is even more desirable that the lower limit is 10.2.

Therefore, for example, it is desirable that the following conditional formula (24-1), (24-2) or (24-3) is satisfied:

$$9.5<L/f<19.8 \quad (24\text{-}1);$$

$$10<L/f<19.3 \quad (24\text{-}2); \text{ or}$$

$$10.2<L/f<19.0 \quad (24\text{-}3).$$

It is desirable that the upper limit of conditional formula (25) is 2.95. When the upper limit of conditional formula (25) is 2.95, it is possible to more easily reduce the size of the system. It is more desirable that the upper limit of conditional formula (25) is 2.9 to reduce the size of the system. It is even more desirable that the upper limit is 2.85, and 2.3 is still more desirable.

It is desirable that the lower limit of conditional formula (25) is 1.5. When the lower limit of conditional formula (25) is 1.5, it is possible to more easily secure a back focus. It is more desirable that the lower limit of conditional formula (25) is 1.8. It is even more desirable that the lower limit is 1.85.

Therefore, for example, it is desirable that the following conditional formula (25-1) or (25-2) is satisfied:

$$1.5<Bf/f<2.95 \quad (25\text{-}1); \text{ or}$$

$$1.85<Bf/f<2.85 \quad (25\text{-}2).$$

It is desirable that the upper limit of conditional formula (26) is 2.5. Then, it is possible to more easily widen the angle of view. It is desirable that the upper limit of conditional formula (26) is 2.0 to more easily widen the angle of view. It is even more desirable that the upper limit is 1.9.

It is desirable that the lower limit of conditional formula (26) is 1.2. Then, it is possible to more easily correct distortion. Further, it is desirable that the lower limit of conditional formula (26) is 1.3. It is even more desirable that the lower limit is 1.4. It is still more desirable that the lower limit is 1.5.

Therefore, for example, it is desirable that the following conditional formula (26-1), (26-2) or (26-3) is satisfied:

$$1.25 \leq (R1+R2)/(R1-R2) \leq 2.5 \quad (26\text{-}1);$$

$$1.35 \leq (R1+R2)/(R1-R2) \leq 2.0 \quad (26\text{-}2); \text{ or}$$

$$1.55 \leq (R1+R2)/(R1-R2) \leq 1.9 \quad (26\text{-}3).$$

It is desirable that an aperture stop is arranged between third lens L3 and fourth lens L4. When the aperture stop is arranged between third lens L3 and fourth lens L4, it is possible to reduce the size of the whole system. If the aperture stop is located close to the object side, it is possible to easily reduce the outer diameter of first lens L1. However, if the aperture stop is too close to the object side, it becomes difficult to separate axial rays and off-axial rays from each other at first lens L1 and second lens L2. Further, it becomes difficult to correct curvature of field. When the aperture stop is arranged between third lens L3 and fourth lens L4, it is possible to easily correct curvature of field while reducing the lens diameter.

It is desirable that the Abbe numbers of the materials of first lens L1, second lens L2, fourth lens L4 and sixth lens L6 for d-line are greater than or equal to 40. Then, it is possible to suppress generation of chromatic aberrations, and to achieve excellent resolution performance. It is more desirable that the Abbe numbers are greater than or equal to 47.

It is desirable that the Abbe number of the material of second lens L2 for d-line is greater than or equal to 50. Then, it is possible to further suppress generation of chromatic aberrations, and to achieve excellent resolution performance. It is more desirable that the Abbe number is greater than or equal to 52.

It is desirable that the Abbe number of the material of sixth lens L6 for d-line is greater than or equal to 50. Then, it is possible to further suppress generation of chromatic aberrations, and to achieve excellent resolution performance. It is more desirable that the Abbe number is greater than or equal to 52.

It is desirable that the Abbe number of the material of third lens L3 for d-line is less than or equal to 40. Then, it is possible to excellently correct a lateral chromatic aberration. It is more desirable that the Abbe number is less than or equal to 30. It is even more desirable that the Abbe number is less than or equal to 28. It is still more desirable that the Abbe number is less than or equal to 25.

It is desirable that the Abbe number of the material of fifth lens L5 for d-line is less than or equal to 40. Then, it is possible to excellently correct a lateral chromatic aberration. It is more desirable that the Abbe number is less than or equal to 30. It is even more desirable that the Abbe number is less than or equal to 28. It is still more desirable that the Abbe number is less than or equal to 25. It is more desirable that the Abbe number is less than or equal to 20.

When the Abbe number of the material of first lens L1 for d-line is vd1, and the Abbe number of the material of second lens L2 for d-line is vd2, it is desirable that vd1/vd2 is greater than or equal to 0.7. Then, it is possible to suppress generation of chromatic aberrations, and to achieve excellent resolution performance.

Further, it is more desirable that vd1/vd2 is greater than or equal to 0.8. It is desirable that vd1/vd2 is less than or equal to 1.2 to balance the Abbe number of first lens L1 and the Abbe number of second lens L2 and to suppress generation of chromatic aberrations.

When the Abbe number of the material of second lens L2 for d-line is vd2, and the Abbe number of the material of third lens L3 for d-line is vd3, it is desirable that vd2/vd3 is greater than or equal to 2.0. Then, it is possible to excellently correct a longitudinal chromatic aberration and a lateral chromatic aberration.

When the Abbe number of the material of first lens L1 for d-line is vd1, and the Abbe number of the material of third lens L3 for d-line is vd3, it is desirable that vd1/vd3 is greater than or equal to 1.4. Then, it is possible to easily correct a longitudinal chromatic aberration and a lateral chromatic aberration in an excellent manner. Further, it is more desirable that vd1/vd3 is greater than or equal to 1.5 to more excellently correct a longitudinal chromatic aberration and a lateral chromatic aberration.

When the Abbe number of the material of first lens L1 for d-line is vd1, and the Abbe number of the material of third lens L3 for d-line is vd3, it is desirable that vd1/vd3 is less than or equal to 2.5. Then, it is possible to prevent the Abbe number of third lens L3 from becoming too small, and to easily reduce the cost of the material of third lens L3. Or, it is possible to prevent the Abbe number of first lens L1 from becoming too large. Therefore, it is possible to easily increase the refractive power of first lens L1 by increasing the refractive index of first lens L. Therefore, it is possible to easily reduce the size of the lens system and to easily correct distortion.

It is desirable that the refractive index of the material of first lens L1 for d-line is lower than or equal to 1.90. Then, it is possible to easily lower the cost of the material of first lens L1. Further, when the material having a low refractive index is used, a material having a large Abbe number becomes selectable. Therefore, correction of chromatic aberrations becomes easy. Further, it becomes possible to easily achieve excellent resolution performance. Further, it is more desirable that the refractive index is lower than or equal to 1.85 to more excellently correct chromatic aberrations.

It is desirable that the refractive index of the material of first lens L1 for d-line is higher than or equal to 1.60. Then, it is possible to easily increase the refractive power of first lens L1, and to easily widen the angle of view. Further, it becomes possible to easily correct distortion. Further, it is more desirable that the refractive index is higher than or equal to 1.65 to easily widen the angle of view and to easily correct distortion. It is even more desirable that the refractive index is higher than or equal to 1.70.

It is desirable that the refractive index of the material of second lens L2 for d-line is lower than or equal to 1.70. Then, it is possible to reduce the cost of the material of second lens L2.

If the material has a high refractive index, the Abbe number becomes small. Therefore, chromatic aberrations increase, and it becomes difficult to achieve excellent resolution performance. It is more desirable that the refractive index is lower than or equal to 1.65 to reduce the cost of the material of second lens L2. It is even more desirable that the refractive index is lower than or equal to 1.60.

It is desirable that the refractive index of the material of second lens L2 for d-line is higher than or equal to 1.50. Then, it is possible to easily increase the refractive power of second lens L2, and to easily correct distortion. Further, since it is possible to easily increase the refractive power of second lens L2, it is possible to easily reduce the size of the lens system.

It is desirable that the refractive index of the material of third lens L3 for d-line is lower than or equal to 1.75. Then, it is possible to reduce the cost of the material of third lens L3. It is more desirable that the refractive index is lower than or equal to 1.70 to reduce the cost of the material of third lens L3. It is even more desirable that the refractive index is lower than or equal to 1.68. It is still more desirable that the refractive index is lower than or equal to 1.65.

It is desirable that the refractive index of the material of third lens L3 for d-line is higher than or equal to 1.50. Then, it is possible to easily increase the refractive power of third lens L3 by increasing the refractive index of the material of third lens L3, and to easily correct a lateral chromatic aberration and curvature of field. It is more desirable that the refractive index is higher or equal to 1.55 to increase the refractive index of third lens L3. It is more desirable that the refractive index is higher than or equal to 1.60.

It is desirable that the refractive index of the material of fourth lens L4 for d-line is lower than or equal to 1.80. Then, it is possible to reduce the cost of the material of fourth lens L4. Further, since it is possible to easily select a material with a large Abbe number, it is possible to easily correct chromatic aberrations, and to achieve excellent resolution performance.

It is desirable that the refractive index of the material of fourth lens L4 for d-line is higher than or equal to 1.50. Then, it is possible to easily increase the refractive power of fourth lens L4 by increasing the refractive index of the material of fourth lens L4. Since the refractive power of fourth lens L4 is increased, it is possible to easily correct a spherical aberration at fourth lens LA. Further, since it is possible to sharply bend rays at fourth lens L4, it is possible to easily suppress an angle at which peripheral rays enter an imaging device. Therefore, it is possible to easily suppress shading.

It is desirable that the refractive index of the material of fifth lens L5 for d-line is higher than or equal to 1.50. Then, it is possible to easily increase the refractive power of fifth lens L5 by increasing the refractive index of the material of fifth lens L5. Further, since it is possible to easily select a material with a large Abbe number, it is possible to easily correct chromatic aberrations, and to achieve excellent resolution performance. It is more desirable that the refractive index is higher than or equal to 1.55 to increase the refractive index of the material of fifth lens L5. It is even more desirable that the refractive index is higher than or equal to 1.60. It is still more desirable that the refractive index is higher than or equal to 1.8. It is more desirable that the refractive index is higher than or equal to 1.9.

It is desirable that the refractive index of the material of sixth lens L6 for d-line is higher than or equal to 1.50. Then, it is possible to easily increase the refractive power of sixth lens L6 by increasing the refractive index of the material of sixth lens L6. Therefore, it is possible to easily correct a spherical aberration and to easily suppress an angle at which rays enter an imaging device. Therefore, it is possible to easily suppress shading. It is desirable that the refractive index of the material of sixth lens L6 for d-line is lower than or equal to 1.70. Then, it is possible to easily select a material with a large Abbe number. Therefore, it becomes possible to easily correct chromatic aberrations, and to easily achieve excellent resolution performance. It is desirable that the refractive index of the material of sixth lens L6 for d-line is lower than or equal to 1.60 to correct chromatic aberrations.

It is desirable that the object-side surface of second lens L2 is aspherical. Then, it is possible to easily reduce the size of the lens system, and to easily widen the angle of view, or excellent correction of curvature of field and distortion becomes easy. It is desirable that the object-side surface of second lens L2 has a shape having positive refractive power both at a center and at an effective diameter edge, and the positive refractive power at the effective diameter edge being weaker than the positive refractive power at the center when the positive refractive power at the center and the positive refractive power at the effective diameter edge are compared with each other. When the object-side surface of second lens L2 has such a shape, it is possible to reduce the size of the lens system. At the same time, it is possible to easily widen the angle of view.

Here, the phrase "effective diameter of a surface" means the diameter of a circle composed of outermost points (points farthest from an optical axis) in the direction of the diameter when points of intersection of all rays contributing to image formation and a lens surface are considered. Further, the term "effective diameter edge" means the outermost points. When a system is rotationally symmetric with respect to an optical axis, a figure composed of the outermost points is a circle. However, when a system is not rotationally symmetric, a figure composed of the outermost points is not a circle in some cases. In such a case, an equivalent circle may be considered, and the diameter of the equivalent circle may be regarded as an effective diameter.

With respect to the shape of an aspherical surface, when a point on lens surface i ("i" is a sign representing a corresponding lens surface. For example, when the object-side surface of second lens L2 is represented by 3, "i" may be considered as i=3 in the following descriptions about the object-side surface of second lens L2) of each lens is point Xi, and an intersection of a normal at the point and an optical axis is point Pi, a length of Xi–Pi (|Xi–Pi|) is defined as the absolute value |RXi| of a curvature radius at point Xi, and Pi is defined as the center of curvature at point Xi. Further, an intersection of the i-th lens surface and the optical axis is point Qi. At this time, refractive power at point Xi is defined based on whether point Pi is located on the object side or on the image side of point Qi. When point Xi is a point on the object-side surface, if point Pi is located on the image side of point Qi, refractive power at point Xi is defined as positive refractive power. If point Pi is located on the object side of point Qi, refractive power at point Xi is defined as negative refractive power. When point Xi is a point on the image-side surface, if point Pi is located on the object side of point Qi, refractive power at point Xi is defined as positive refractive power. If point Pi is located on the image side of point Qi, refractive power at point Xi is defined as negative refractive power.

When refractive power at the center and refractive power at point Xi are compared with each other, the absolute value of a curvature radius (a paraxial curvature radius) at the center and the absolute value |RXi| of a curvature radius at point Xi are compared with each other. If the value |RXi| is less than the absolute value of the paraxial curvature radius, refractive power at point Xi is regarded as being stronger than refractive power at the center. On the contrary, if the value |RXi| is greater than the absolute value of the paraxial curvature radius, refractive power at point Xi is regarded as being weaker than refractive power at the center. This relationship is similar whether a surface has positive refractive power or negative refractive power.

Figure 2:
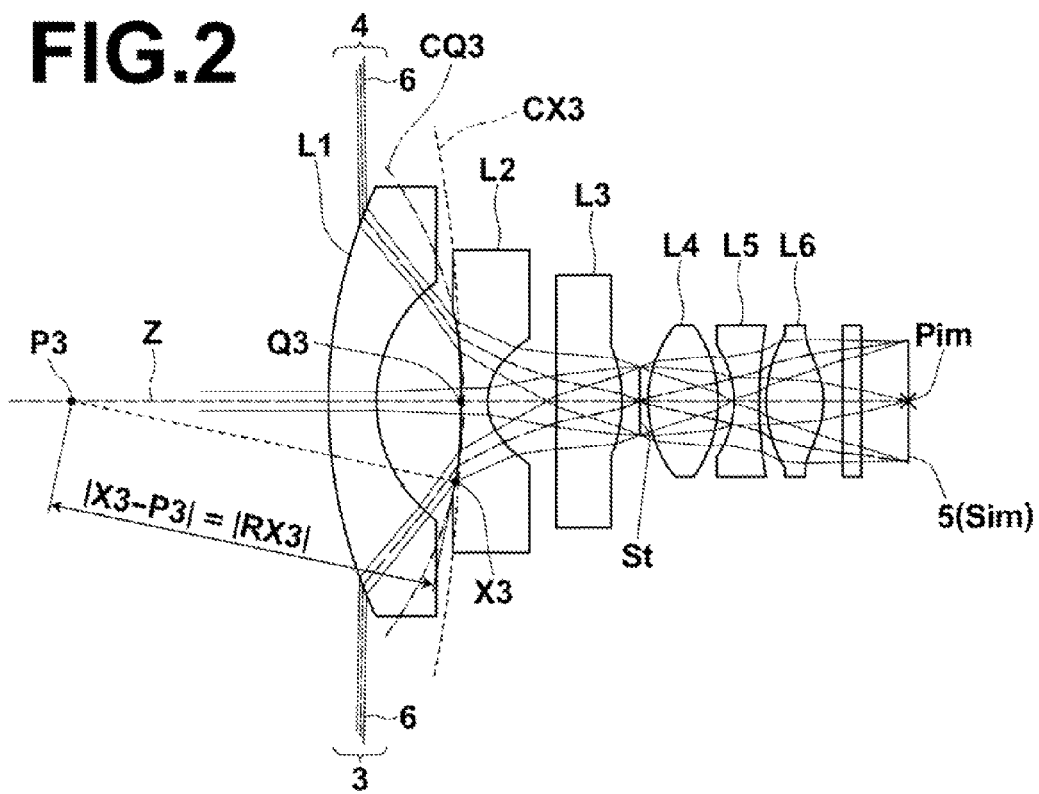
Figure 7:
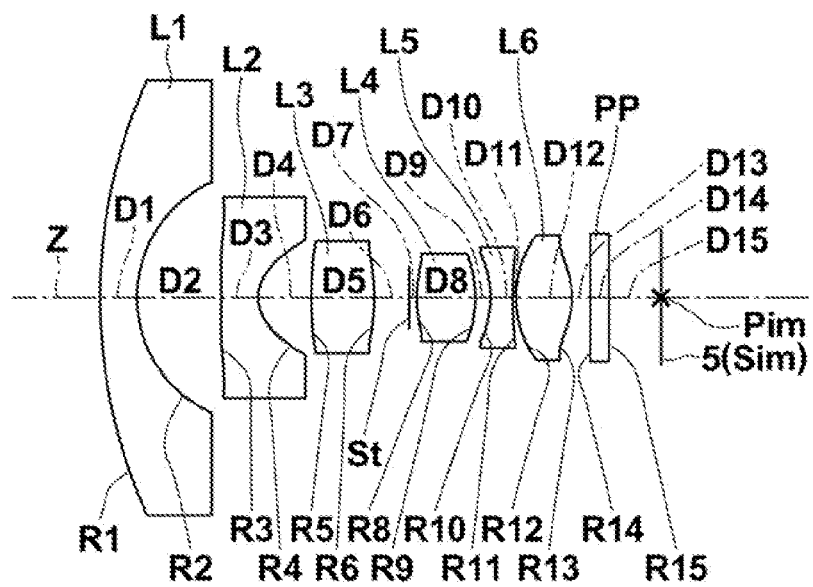
FIG. 7 is a cross section illustrating the lens structure of an imaging lens in Example 5 of the present invention.
Figure 8:
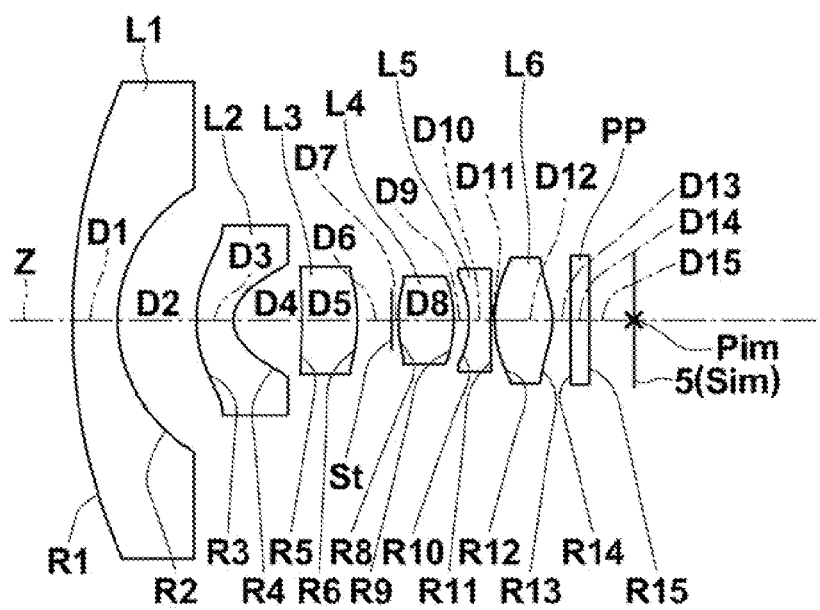
FIG. 8 is a cross section illustrating the lens structure of an imaging lens in Example 6 of the present invention.
Figure 9:
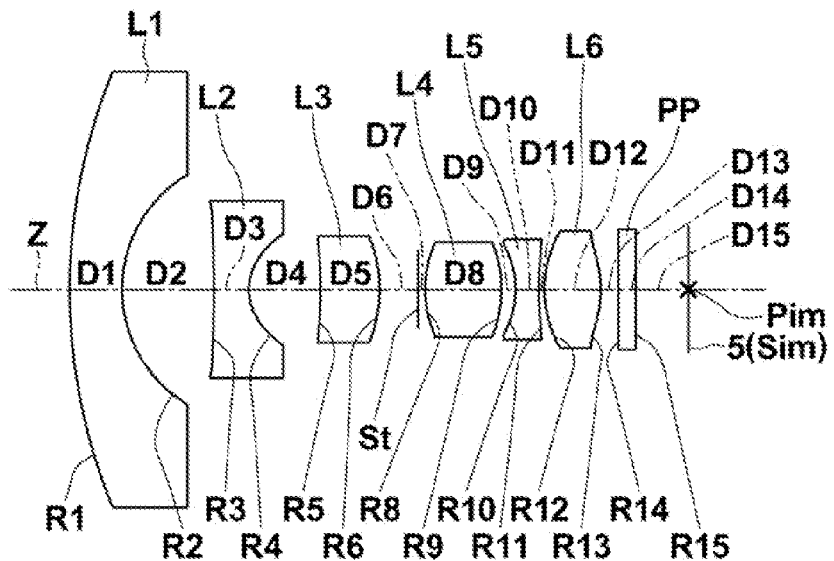
FIG. 9 is a cross section illustrating the lens structure of an imaging lens in Example 7 of the present invention.
Figure 10:
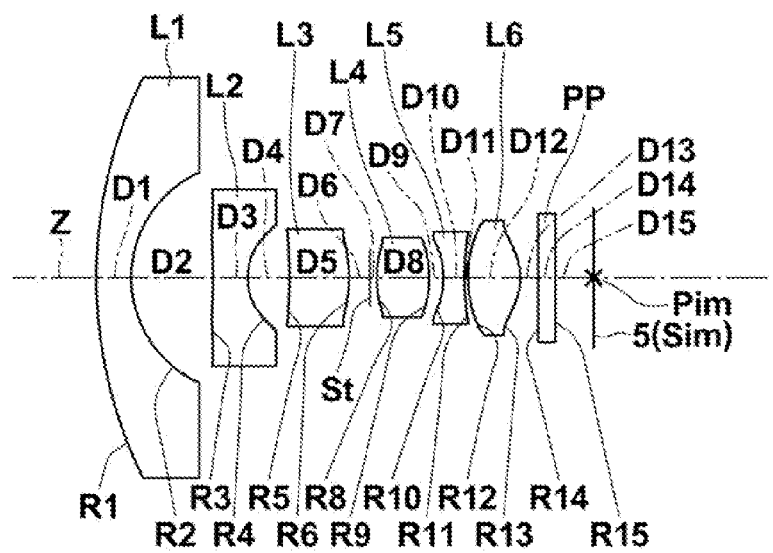
FIG. 10 is a cross section illustrating the lens structure of an imaging lens in Example 8 of the present invention.
Figure 11:
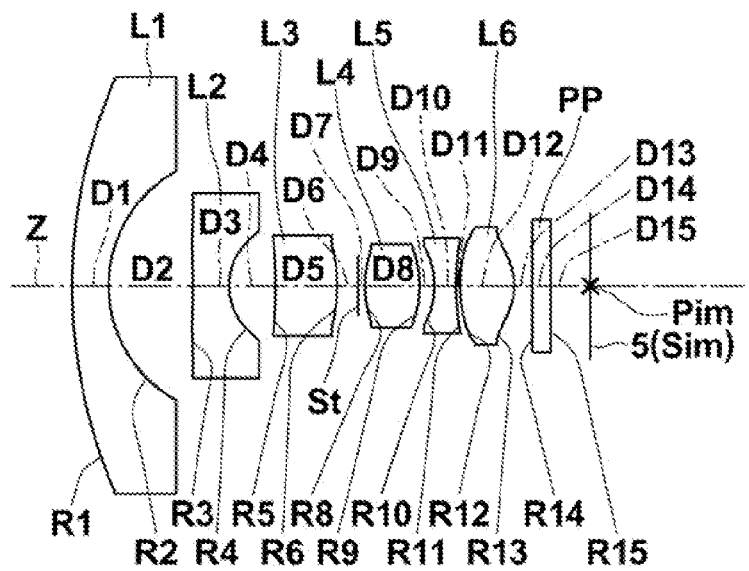
FIG. 11 is a cross section illustrating the lens structure of an imaging lens in Example 9 of the present invention.
Figure 12:
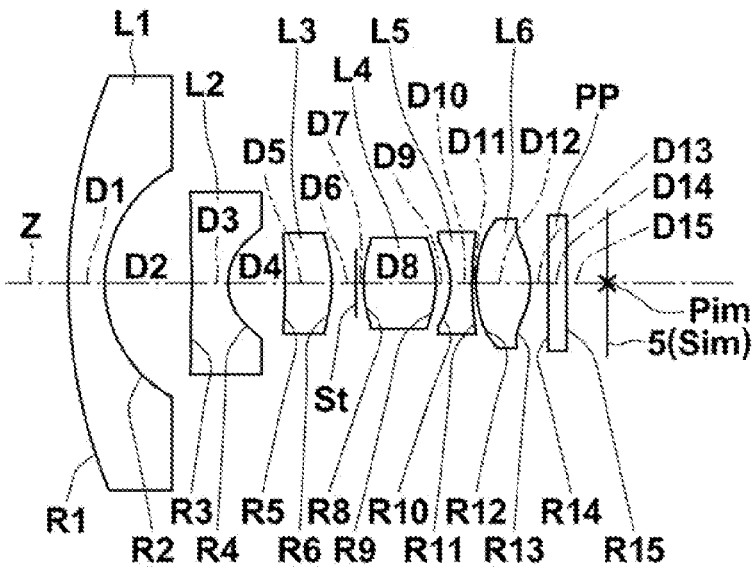
FIG. 12 is a cross section illustrating the lens structure of an imaging lens in Example 10 of the present invention.
Figure 13:
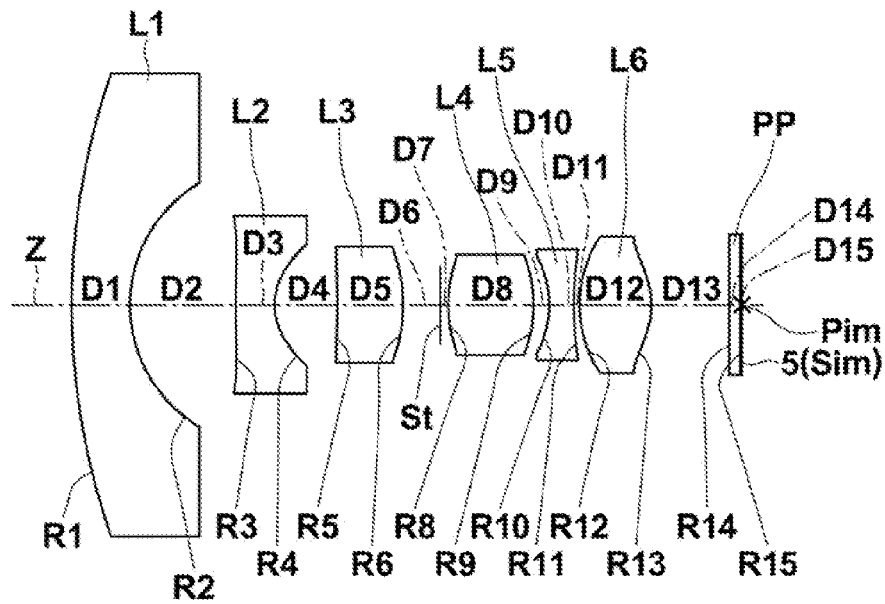
FIG. 13 is a cross section illustrating the lens structure of an imaging lens in Example 11 of the present invention.
Figure 14:
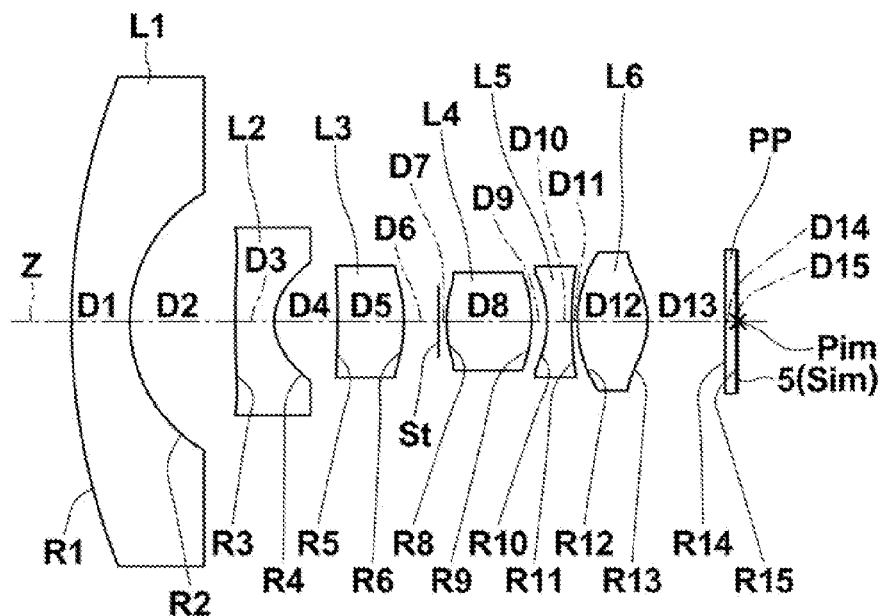
FIG. 14 is a cross section illustrating the lens structure of an imaging lens in Example 12 of the present invention.
Figure 15:
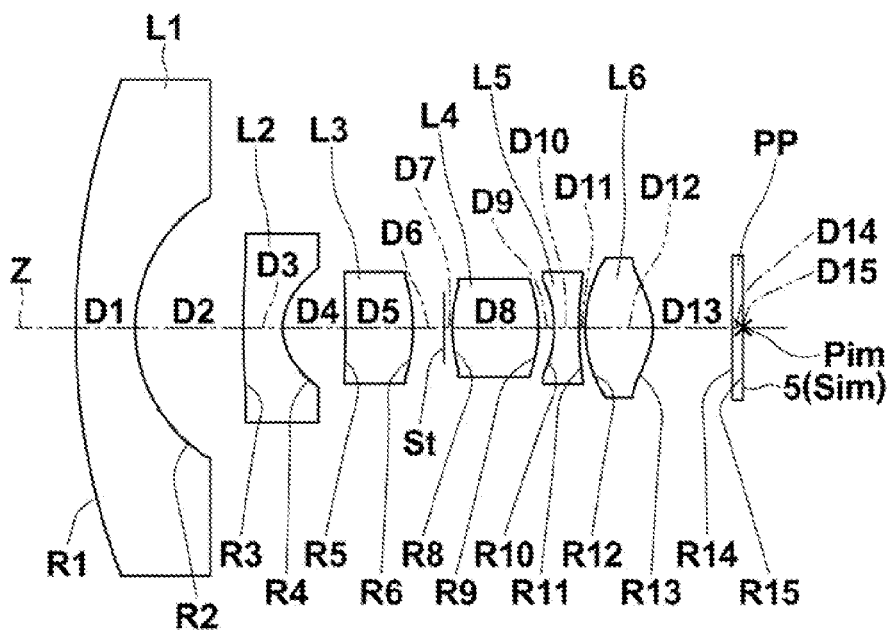
FIG. 15 is a cross section illustrating the lens structure of an imaging lens in Example 13 of the present invention.
Figure 16:
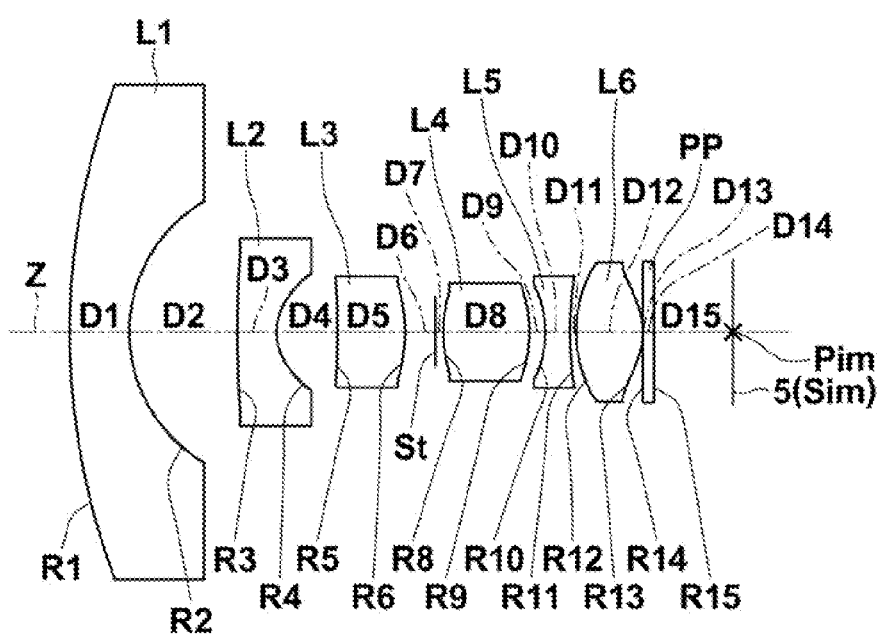
FIG. 16 is a cross section illustrating the lens structure of an imaging lens in Example 14 of the present invention.
Figure 19:
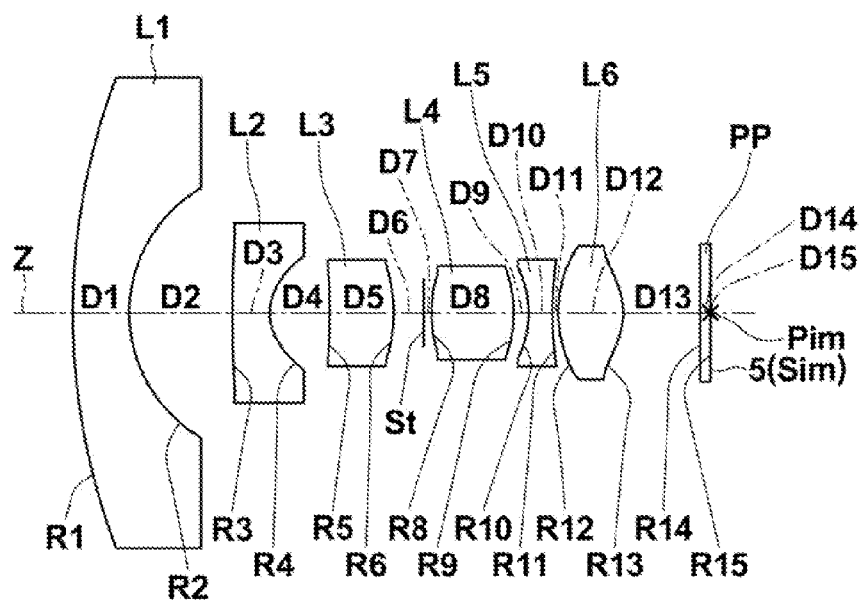
FIG. 19 is a cross section illustrating the lens structure of an imaging lens in Example 17 of the present invention.
Figure 20:
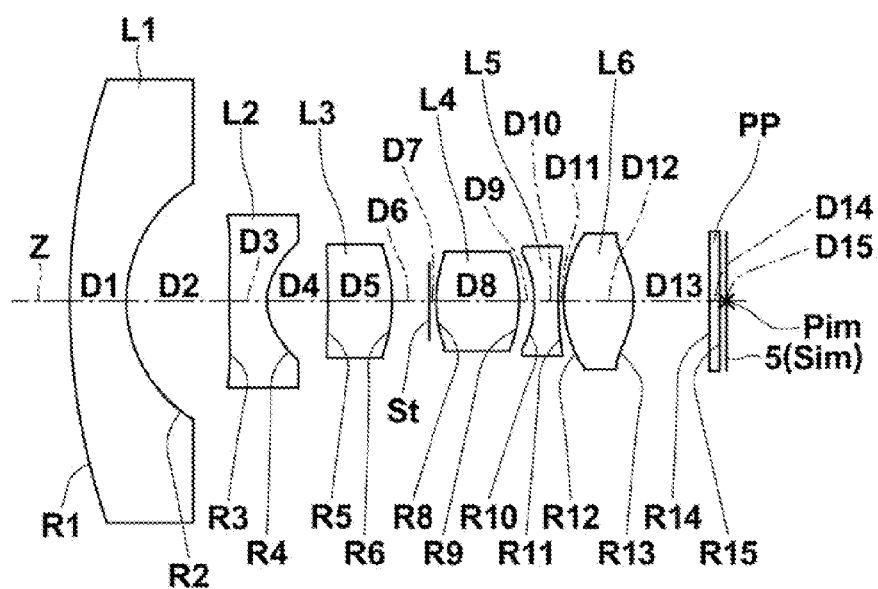
FIG. 20 is a cross section illustrating the lens structure of an imaging lens in Example 18 of the present invention.
Figure 21:
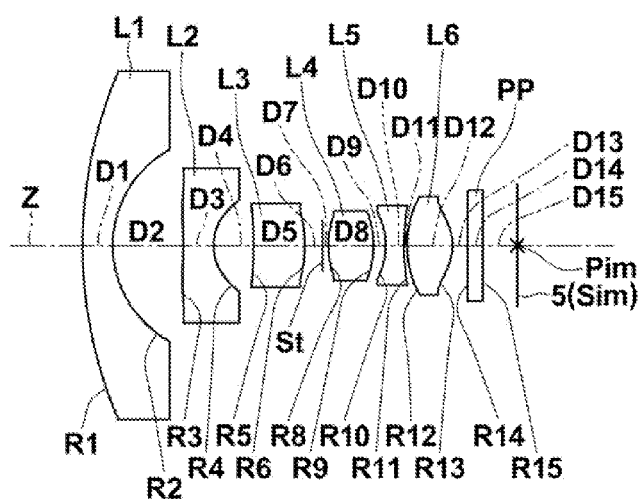
FIG. 21 is a cross section illustrating the lens structure of an imaging lens in Example 19 of the present invention.

Here, with reference to FIG. 2, the shape of the object-side surface of second lens L2 will be described. FIG. 2 is a diagram illustrating optical paths of the imaging lens 1 illustrated in FIG. 1. In FIG. 2, point Q3 is the center of the object-side surface of second lens L2, which is an intersection of the object-side surface of second lens L2 and optical axis Z. In FIG. 2, point X3 on the object-side surface of second lens L2 is located at an effective diameter edge, and point X3 is an intersection of an outermost ray 6 included in off-axial rays 3 and the object-side surface of second lens L2. In FIG. 2, point X3 is located at the effective diameter edge. However, since point X3 is an arbitrary point on the object-side surface of second lens, other points may be considered in a similar manner.

At this time, an intersection of a normal to the lens surface at point X3 and optical axis Z is point P3, as illustrated in FIG. 2, and segment X3–P3 connecting point X3 and point P3 is defined as curvature radius RX3 at point X3, and the length |X3–P3| of segment X3–P3 is defined as absolute value |RX3| of curvature radius RX3. In other words, |X3–P3|=|RX3|. Further, a curvature radius at point Q3, in other words, a curvature radius at the center of the object-side surface of second lens L2 is R3, and the absolute value of the curvature radius is |R3| (not illustrated in FIG. 2).

The expression "a shape having positive refractive power both at a center and at an effective diameter edge, and the positive refractive power at the effective diameter edge being weaker than the positive refractive power at the center when the positive refractive power at the center and the positive refractive power at the effective diameter edge are compared with each other" of the object-side surface of second lens L2 means a shape in which a paraxial region including point Q3 is convex, and in which point P3 is located on the image side of point Q3 when point X3 is located at an effective diameter edge, and in which the absolute value |RX3| of a curvature radius at point X3 is greater than the absolute value |R3| of a curvature radius at point Q3.

The object-side surface of second lens L2 may have a shape having positive refractive power at the center and negative refractive power at the effective diameter edge. When the object-side surface of second lens L2 has such a shape, it is possible to reduce the size of the lens system. At the same time, it is possible to easily widen the angle of view.

The expression "a shape having positive refractive power at the center and negative refractive power at the effective diameter edge" of the object-side surface of second lens L2 means a shape in which a paraxial region including point Q3 is convex, and in which point P3 is located on the object side of point Q3 when point X3 is located at an effective diameter edge.

It is desirable that the object-side surface of second lens L2 has a shape having negative refractive power at the center and including a part having positive refractive power in an area between the center and an effective diameter edge. When the object-side surface of second lens L2 has such a shape, it is possible to reduce the size of the lens system, and to widen the angle of view. At the same time, it is possible to excellently correct curvature of field.

The expression "a shape having negative refractive power at the center and including a part having positive refractive power in an area between the center and an effective diameter edge" of the object-side surface of second lens L2 means a shape in which a paraxial region including point Q3 is concave, and in which point X3 with point P3 located on the image side of point Q3 is present between the center and the effective diameter edge.

The object-side surface of second lens L2 may have a shape having negative refractive power at the center, and including a part having positive refractive power in an area between the center and an effective diameter edge, and having negative refractive power at the effective diameter edge. When the object-side surface of second lens L2 has such a shape, it is possible to reduce the size of the lens system, and to widen the angle of view. At the same time, it is possible to excellently correct curvature of field and distortion.

The expression "a shape having negative refractive power at a center, and including a part having positive refractive power in an area between the center and an effective diameter edge" of the object-side surface of second lens L2 means a shape in which a paraxial region including point Q3 is concave, and in which point X3 with point P3 located on the image side of point Q3 is present between the center and the effective diameter edge. Further, the expression "a shape having negative refractive power at an effective diameter edge" of second lens L2 means a shape in which point P3 is located on the object side of point Q3 when point X3 is located at the effective diameter edge.

The object-side surface of second lens L2 may have a shape having negative refractive power both at the center and at the effective diameter edge, and when the negative refractive power at the center and the negative refractive power at the effective diameter edge are compared with each other, the negative refractive power at the effective diameter edge may be weaker than the negative refractive power at the center. When the object-side surface of second lens L2 has such a shape, it is possible to reduce the size of the lens system, and to widen the angle of view. At the same time, it is possible to excellently correct curvature of field.

The expression "a shape having negative refractive power both at the center and at the effective diameter edge, and when the negative refractive power at the center and the negative refractive power at the effective diameter edge are compared with each other, the negative refractive power at the effective diameter edge is weaker than the negative refractive power at the center" of the object-side surface of second lens L2 means a shape in which a paraxial region including point Q3 is concave, and in which point P3 is located on the object side of point Q3 when point X3 is located at the effective diameter edge, and in which the absolute value |RX3| of a curvature radius at point X3 is greater than the absolute value |R3| of a curvature radius at point Q3.

In FIG. 2, for the purpose of understanding, circle CQ3, which passes point Q3 with the radius of |R3|, and the center of which is a point on an optical axis, is drawn with a two dot dashed line. Further, a part of circle CX3, which passes point X3 with the radius of |RX3|, and the center of which is a point on the optical axis, is drawn with a broken line. Circle CX3 is larger than circle CQ3, and |R3|<|RX3| is clearly illustrated.

It is desirable that the image-side surface of second lens L2 is aspherical. Then, it is possible to excellently correct curvature of field and distortion. It is desirable that the image-side surface of second lens L2 has a shape having negative refractive power both at the center and at an effective diameter, and in which the negative refractive power at the effective diameter is weaker than the negative refractive power at the center when the negative refractive power at the center and the negative refractive power at the effective diameter edge are compared with each other. When the image-side surface of second lens L2 has such a shape, it is possible to excellently correct curvature of field and distortion.

The shape of the image-side surface of second lens L2 may be considered, as follows, in a manner similar to the shape of the object-side surface of second lens L2 explained with reference to FIG. 2. In a lens cross section, when a point on the image-side surface of second lens L2 is point X4, and an intersection of a normal at the point and optical axis Z is point P4, segment X4–P4 connecting point X4 and point P4 is defined as a curvature radius at point X4, and the length |X4–P4| of the segment connecting point X4 and point P4 is defined as absolute value |RX4| of the curvature radius at point X4. Therefore, |X4|P4|=|RX4|. Further, an intersection of the image-side surface of second lens L2 and optical axis Z, in other words, the center of the image-side surface of second lens L2 is point Q4, and the absolute value of a curvature radius at point Q4 is |R4|.

The expression "a shape having negative refractive power both at the center and at an effective diameter, and in which the negative refractive power at the effective diameter is weaker than the negative refractive power at the center when the negative refractive power at the center and the negative refractive power at the effective diameter edge are compared with each other" of the image-side surface of second lens L2 means a shape in which a paraxial region including point Q4 is concave, and in which point P4 is located on the image side of point Q4 when point X4 is located at the effective diameter edge, and in which the absolute value |RX4| of a curvature radius at point X4 is greater than the absolute value |R4| of a curvature radius at point Q4.

It is desirable that the object-side surface of third lens L3 is aspherical. It is desirable that the object-side surface of third lens L3 has a shape having negative refractive power both at the center and at the effective diameter edge, and in which the negative refractive power at the effective diameter edge is weaker than the negative refractive power at the center. Or, it is desirable that the object-side surface of third lens L3 has a shape having negative refractive power at the center and positive refractive power at the effective diameter edge. When the object-side surface of third lens L3 has such a shape, it is possible to excellently correct a coma aberration.

The shape of the object-side surface of third lens L3 may be considered, as follows, in a manner similar to the shape of the object-side surface of second lens L2 explained with reference to FIG. 2. In a lens cross section, when a point on the object-side surface of third lens L3 is point X5, and an intersection of a normal at the point and optical axis Z is point P5, segment X5–P5 connecting point X5 and point P5 is defined as a curvature radius at point X5, and the length |X5–P5| of the segment connecting point X5 and point P5 is defined as absolute value |RX5| of the curvature radius at point X5. Therefore, |X5–P5|=|RX5|. Further, an intersection of the object-side surface of third lens L3 and optical axis Z, in other words, the center of the object-side surface of third lens L3 is point Q5, and the absolute value of a curvature radius at point Q5 is |R5|.

The expression "a shape having negative refractive power both at the center and at the effective diameter edge, and in which the negative refractive power at the effective diameter edge is weaker than the negative refractive power at the center" of the object-side surface of third lens L3 means a shape in which a paraxial region including point Q5 is concave, and in which point P5 is located on the object side of point Q5 when point X5 is located at the effective diameter edge, and in which the absolute value |RX5| of a curvature radius at point X5 is greater than the absolute value |R5| of a curvature radius at point Q5.

Further, the expression "a shape having negative refractive power at the center and positive refractive power at the effective diameter edge" means a shape in which a paraxial region including point Q5 is concave, and in which point P5 is located on the image side of point Q5 when point X5 is located at the effective diameter edge.

The object-side surface of third lens L3 may have a shape having negative refractive power both at the center and at the effective diameter edge, and in which the negative refractive power at the effective diameter edge is stronger than the negative refractive power at the center when the negative refractive power at the center and the negative refractive power at the center are compared with each other. When the object-side surface of third lens L3 has such a shape, it is possible to easily widen the angle of view. Further, it is possible to easily separate axial rays and off-axial rays from each other at first lens L and second lens L2. Therefore, it is possible to easily correct curvature of field and distortion.

The expression "a shape having negative refractive power both at the center and at the effective diameter edge, and in which the negative refractive power at the effective diameter edge is stronger than the negative refractive power at the center when the negative refractive power at the center and the negative refractive power at the center are compared with each other" of the object-side surface of third lens L3 means a shape in which a paraxial region including point Q5 is concave, and in which point P5 is located on the object side of point Q5 when point X5 is located at the effective diameter edge, and in which the absolute value |RX5| of a curvature radius at point X5 is less than the absolute value |R5| of a curvature radius at point Q5.

A paraxial region on the object-side surface of third lens L3 may be a flat surface.

It is desirable that an image-side surface of third lens L3 is aspherical. It is desirable that the image-side surface of third lens L3 has a shape having positive refractive power both at a center and at an effective diameter edge, and in which the positive refractive power at the effective diameter edge is weaker than the positive refractive power at the center. When third lens L3 has such a shape, it is possible to improve image qualities in a peripheral portion of an image by excellently correcting a coma aberration caused by off-axial rays.

The shape of the image-side surface of third lens L3 may be considered, as follows, in a manner similar to the shape of the object-side surface of second lens L2 explained with reference to FIG. 2. In a lens cross section, when a point on the image-side surface of third lens L3 is point X6, and an intersection of a normal at the point and optical axis Z is point P6, segment X6–P6 connecting point X6 and point P6 is defined as a curvature radius at point X6, and the length |X6–P6| of the segment connecting point X6 and point P6 is defined as absolute value |RX6| of the curvature radius at point X6. Therefore, |X6–P6|=|RX6|. Further, an intersection of the image-side surface of third lens L3 and optical axis Z, in other words, the center of the image-side surface of third lens L3 is point Q6, and the absolute value of a curvature radius at point Q6 is |R6|.

The expression "a shape having positive refractive power both at a center and at an effective diameter edge, and in which the positive refractive power at the effective diameter edge is weaker than the positive refractive power at the center" of the image-side surface of third lens L3 means a shape in which a paraxial region including point Q6 is convex, and in which point P6 is located on the object side of point Q6 when point X6 is located at the effective diameter edge, and in which the absolute value |RX6| of a curvature radius at point X6 is greater than the absolute value |R6| of a curvature radius at point Q6.

The image-side surface of third lens L3 may have a shape having positive refractive power both at the center and at the effective diameter edge, and in which the positive refractive power at the effective diameter edge is stronger than the positive refractive power at the center. When third lens L3 has such a shape, it is possible to easily correct a spherical aberration and curvature of field in an excellent manner.

The expression "a shape having positive refractive power both at the center and at the effective diameter edge, and in which the positive refractive power at the effective diameter edge is stronger than the positive refractive power at the center" means a shape in which a paraxial region including point Q6 is convex, and in which point P6 is located on the object side of point Q6 when point X6 is located at the effective diameter edge, and in which the absolute value |RX6| of a curvature radius at point X6 is less than the absolute value |R6| of a curvature radius at point Q6.

It is desirable that the object-side surface of sixth lens L6 is aspherical. It is desirable that the object-side surface of sixth lens L6 has a shape having positive refractive power both at the center and at the effective diameter edge, and in which the positive refractive power at the effective diameter edge is weaker than the positive refractive power at the center. When the object-side surface of sixth lens L6 has such a shape, it is possible to easily correct curvature of field and a spherical aberration in an excellent manner.

The shape of the object-side surface of sixth lens L6 may be considered, as follows, in a manner similar to the shape of the object-side surface of second lens L2 explained with reference to FIG. 2. In a lens cross section, when a point on the object-side surface of sixth lens L6 is point X12, and an intersection of a normal at the point and optical axis Z is point P12, segment X12–P12 connecting point X12 and point P12 is defined as a curvature radius at point X12, and the length |X12–P12| of the segment connecting point X12 and point P12 is defined as absolute value |RX12| of the curvature radius at point X12. Therefore, |X12–P12|=|RX12|. Further, an intersection of the object-side surface of sixth lens L6 and optical axis Z, in other words, the center of the object-side surface of sixth lens L6 is point Q12, and the absolute value of a curvature radius at point Q12 is |R12|.

The expression "a shape having positive refractive power both at the center and at the effective diameter edge, and the positive refractive power at the effective diameter edge being weaker than the positive refractive power at the center" of the object-side surface of sixth lens L6 means a shape in which a paraxial region including point Q12 is convex, and in which point P12 is located on the image side of point Q12 when point X12 is located at the effective diameter edge, and in which the absolute value |RX12| of a curvature radius at point X12 is greater than the absolute value |R12| of a curvature radius at point 012.

It is desirable that the image-side surface of sixth lens L6 is aspherical. It is desirable that the image-side surface of sixth lens L6 has a shape having positive refractive power both at the center and at the effective diameter edge, and the positive refractive power at the effective diameter edge being weaker, compared with the center, or a shape having positive refractive power at the center and negative refractive power at the effective diameter edge. When the image-side surface of sixth lens L6 has such a shape, it is possible to excellently correct a spherical aberration and curvature of field.

The shape of the image-side surface of sixth lens L6 may be considered, as follows, in a manner similar to the shape of the object-side surface of second lens L2 explained with reference to FIG. 2. In a lens cross section, when a point on the image-side surface of sixth lens L6 is point X13, and an intersection of a normal at the point and optical axis Z is point P13, segment X13–P13 connecting point X13 and point P13 is defined as a curvature radius at point X13, and the length |X13–P13| of the segment connecting point X13 and point P13 is defined as absolute value |RX13| of the curvature radius at point X13. Therefore, |X13–P13|=|RX13|. Further, an intersection of the image-side surface of sixth lens L6 and optical axis Z, in other words, the center of the image-side surface of sixth lens L6 is point Q13, and the absolute value of a curvature radius at point Q13 is |R13|.

The expression "a shape having positive refractive power both at the center and at the effective diameter edge, and the positive refractive power at the effective diameter edge being weaker, compared with the center" of the image-side surface of sixth lens L6 means a shape in which a paraxial region including point Q13 is convex, and in which point P13 is located on the object side of point Q13 when point X13 is located at the effective diameter edge, and in which the absolute value |RX13| of a curvature radius at point X13 is greater than the absolute value |R13| of a curvature radius at point Q13.

Further, the expression "a shape having positive refractive power at the center and negative refractive power at the effective diameter edge" means a shape in which a paraxial region including point Q13 is convex, and in which point P13 is located on the image side of point Q13 when point X13 is located at the effective diameter edge.

When each surface of the object-side surface of second lens L2 through the image-side surface of sixth lens L6 has an aspherical shape as described above, it is possible to excellently correct distortion in addition to a spherical aberration, curvature of field and a coma aberration.

It is desirable that first lens L1 is a meniscus lens with a convex surface facing the object side. Then, it becomes possible to produce a wide angle lens, for example, exceeding 180 degrees. When first lens L1 is a biconcave lens, it is possible to easily increase the refractive power of first lens L1. Therefore, it is possible to easily widen an angle of view. However, rays are sharply bent by first lens L1. Therefore, correction of distortion becomes difficult. Further, when the object-side surface is a concave surface, an angle of incidence of peripheral rays entering the lens surface becomes large. Therefore, when rays enter the surface, a reflection loss becomes large. Hence, a peripheral area becomes dark. Further, when an angle of incidence of a ray exceeds 180 degrees, the ray cannot enter the surface. Therefore, it is desirable that first lens L1 is a positive meniscus lens having a convex surface facing the object side to easily correct distortion while achieving a wide angle of view.

It is desirable that second lens L2 is a biconcave lens. Then, it becomes possible to easily widen an angle of view, and to easily correct curvature of field, distortion and a spherical aberration.

Second lens L2 may be a meniscus lens with a convex surface facing the object side. Then, it is possible to easily widen an angle of view, and to excellently correct distortion and curvature of field.

It is desirable that the object-side surface of third lens L3 is a concave surface or a flat surface. Then, it is possible to easily widen an angle of view, and to easily separate axial rays and peripheral rays from each other at first lens L1 and second lens L2. Therefore, it is possible to excellently correct curvature of field and a coma aberration.

It is desirable that the image-side surface of third lens L3 is convex. Then, it is possible to make the refractive power of third lens L3 positive power, and to excellently correct a lateral chromatic aberration.

It is desirable that third lens L3 has a meniscus shape with a concave surface facing the object side, or is a plano-convex lens with a flat surface facing the object side. Then, it is possible to easily reduce the size of the lens system in the direction of the system, and to excellently correct curvature of field and a coma aberration.

It is desirable that fourth lens L4 is a biconvex lens. Then, it is possible to excellently correct a spherical aberration and curvature of field. Further, when the refractive power of fourth lens L4 is increased, it is possible to easily correct chromatic aberrations between fourth lens L4 and fifth lens L5.

It is desirable that fifth lens L5 is a biconcave lens or a plano-convex lens with a flat surface facing the image side. Then, it is possible to excellently correct curvature of field. Further, it is possible to easily increase the refractive power of fifth lens L5, and to easily correct chromatic aberrations between fourth lens L4 and fifth lens L5.

Fifth lens L5 may be a negative meniscus lens with a convex surface facing the image side, or a plano-concave lens with a flat surface facing the image side. Then, it is possible to easily correct a coma aberration and curvature of field in an excellent manner.

It is desirable that sixth lens L6 is a biconvex lens. Then, it is possible to suppress an angle at which rays enter an imaging device. Therefore, it is possible to easily suppress shading.

Sixth lens L6 may be a meniscus lens with a convex surface facing the image side. Then, it is possible to easily correct curvature of field in an excellent manner.

It is desirable that the material of first lens L1 is glass. When an imaging lens is used in tough environment conditions, for example, such as use in an in-vehicle camera or a surveillance camera, first lens L1, which is arranged on the most object side, needs to use a material resistant to a deterioration of a surface by wind and rain and a change in temperature by direct sun light, and resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material of first lens L1 is glass, it is possible to satisfy such needs. Alternatively, transparent ceramic may be used as the material of first lens L1. Further, as the material of first lens L1, a material with Knoop hardness of 550 or higher may be used. It is desirable that the material of first lens L1 has acid resistance by a powder method of class 4 or higher and water resistance by a powder method of class 3 or higher in a test of acid resistance by a powder method and water resistance by a powder method regulated by Japan Optical Glass Manufacturers' Association, and higher classes are more desirable. Further, it is desirable that the material has detergent resistance of class 3 or higher specified by ISO. Further, it is desirable that the material has weather resistance by a surface method of class 3 or higher. Further, for example, a lens for an in-vehicle camera or a surveillance camera is exposed to ultraviolet rays from the sun for a long period of time. Therefore, it is desirable to use a material resistant to ultraviolet rays, as the material of this lens.

One or both of the surfaces of first lens L1 may be aspherical. When first lens L1 is a glass aspheric lens, it is possible to more excellently correct various aberrations.

Further, a protection means may be applied to the object-side surface of first lens L1 to increase the strength, scratch-resistance, and chemical-resistance of the surface. In that case, the material of first lens L1 may be plastic. The protection means may be a hard coating or a water-repellent coating.

It is desirable that a material of one of second lens L2, third lens L3 and sixth lens L6, or materials of arbitrary plural lenses of them in combination are plastic. When the material is plastic, it is possible to structure the lens system at low cost and with light weight. Further, when an aspherical surface is provided, it is possible to accurately produce the aspherical shape. Therefore, it is possible to produce a lens having excellent performance.

The material of at least one of fourth lens L4 and fifth lens L5 may be plastic. When the material is plastic, it is possible to structure the lens system at low cost and with light weight. Further, when an aspherical surface is provided, it is possible to accurately produce the aspherical shape. Therefore, it is possible to produce a lens having excellent performance.

It is desirable that the materials of second lens L2 and sixth lens L6 are polyolefin. Polyolefin can produce a material having a low water absorption ratio, high transparency, low double refraction, and a large Abbe number. When the materials of second lens L2 and sixth lens L6 are polyolefin, it is possible to produce a lens a change in the shape of which by absorption of water is small, and which has high transmission and low double refraction. Further, it is possible to use the material having a large Abbe number. Therefore, it is possible to suppress generation of a longitudinal chromatic aberration and a lateral chromatic aberration. Further, it is possible to produce a highly environment-resistant lens having excellent resolution performance.

It is desirable that the material of third lens L3 is polycarbonate. Polycarbonate has a small Abbe number. When polycarbonate is used in third lens L3, it is possible to excellently correct a lateral chromatic aberration.

The materials of second lens L2 and sixth lens L6 may be acrylic. Since acrylic is inexpensive, it is possible to lower the cost of the lens system by using acrylic.

When plastic material is used in at least one of second lens L2, third lens L3, fourth lens L4, fifth lens L5 and sixth lens L6, so-called nano composite material, in which particles smaller than the wavelength of light are mixed into plastic, may be used as the material.

A material of one of second lens L2, third lens L3 and sixth lens L6, or materials of arbitrary plural lenses of them in combination may be glass. When the material is glass, it is possible to suppress a deterioration of performance caused by a change in temperature.

It is desirable that a material of at least one of fourth lens L4 and fifth lens L5 is glass. When the material of fourth lens L4 is glass, it is possible to suppress a deterioration of performance caused by a change in temperature. When the material of fifth lens L5 is glass, it is possible to easily select a material with a small Abbe number. Hence, it is possible to easily correct chromatic aberrations.

It is desirable that a glass transition temperature (Tg) of the material of at least one of first lens L1, second lens L2, third lens L3, fourth lens L4, fifth lens L5 and sixth lens L6 is higher than or equal to 145° C., and higher than or equal to 150° C. is more desirable. When a material the glass transition temperature of which is higher than or equal to 150° C. is used, it is possible to produce a lens having excellent heat-resistant characteristics.

Further, a filter that cuts ultraviolet light through blue light, or an IR (InfraRed) cut filter, which cuts infrared light, may be inserted between the lens system and the imaging device 5 based on the usage of the imaging lens 1. Alternatively, a coating having properties similar to those of the aforementioned filter may be applied to a lens surface, or a material that absorbs ultraviolet light, blue light, infrared light or the like may be used as the material of one of the lenses.

FIG. 1 illustrates a case in which optical member PP, which is assumed to be various filters or the like, is arranged between a lens system and the imaging device 5. Instead, the various filters may be arranged between lenses. Alternatively, a coating having an action similar to that of the various filters may be applied to a lens surface of one of the lenses included in the imaging lens.

Here, rays of light passing through the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion of a lens outside the effective diameter, or by providing there an opaque plate member. Alternatively, an opaque plate member, as a light shield means, may be provided in the optical path of rays that will become stray light. Alternatively, a hood-like member for blocking stray light may be provided further on the object side of the most object-side lens. FIG. 1 illustrates an example in which light shield means 11, 12 are provided outside the effective diameter on the image-side surface of first lens L1 and on the image-side surface of second lens L2, respectively. The position at which the light shield means is provided is not limited to the example illustrated in FIG. 1. The light shield means may be arranged on another lens or between lenses.

Further, a member, such as a stop, may be arranged between lenses to block peripheral rays in such a manner that relative illumination is within a practically acceptable range. The peripheral rays are rays from an object point that is not on optical axis Z, and pass through the peripheral portion of the entrance pupil of an optical system. When a member that blocks the peripheral rays is provided in this manner, it is possible to improve image qualities in the peripheral portion of the image formation area. Further, the member can reduce ghost by blocking light that generates the ghost.

In the imaging lenses according to the first through fifth embodiments, it is desirable that the lens system consists of only six lenses of first lens L1, second lens L2, third lens L3, fourth lens L4, fifth lens L5 and sixth lens L6. When the lens system consists of only six lenses, it is possible to lower the cost of the lens system.

An imaging apparatus according to an embodiment of the present invention includes the imaging lens according to an embodiment of the present invention. Therefore, it is possible to structure the imaging apparatus in small size and at low cost. Further, the imaging apparatus has a sufficiently wide angle of view, and can obtain an excellent image with high resolution by using an imaging device.

An image obtained by photography using an imaging apparatus including the imaging lens according to the first through fifth embodiments may be displayed on a cellular phone. For example, a photography apparatus including the imaging lens according to an embodiment of the present invention is installed in a car as an in-vehicle camera in some cases. Further, the rear side of the car or a surrounding area of the car is photographed by the in-vehicle camera, and an image obtained by photography is displayed on a display device. In such a case, if a car navigation system (hereinafter, referred to as car navigation) is installed in the car, the image obtained by photography may be displayed on a display device of the car navigation. However, if a car navigation is not installed in the car, a specialized display device, such as a liquid crystal display, needs to be set in the car. However, a display device is expensive. Meanwhile, in recent years, a high performance display device, which can be used to browse dynamic images and the Web, became mounted on a cellular phone. If the cellular phone is used as a display device for an in-vehicle camera, even if a car navigation is not installed in the car, it is not necessary to install a specialized display device in the car. Consequently, it is possible to install the in-vehicle camera at low cost.

Here, an image obtained by photography by the in-vehicle camera may be sent to the cellular phone by wire using a cable or the like. Alternatively, the image may be sent to the cellular phone wirelessly by infrared communication or the like. Further, the operation of the cellular phone or the like and the operation of the car may be linked with each other. When a car is put into reverse gear, or a blinker is used, or the like, an image obtained by the in-vehicle camera may be automatically displayed on the display device of the cellular phone.

A display device for displaying the image obtained by the in-vehicle camera is not limited to the cellular phone. A mobile information terminal, such as PDA, a small-size personal computer, or a small-size car navigation that can be carried by a user may be used.

[Numerical Value Example of Imaging Lens]

Next, numerical value examples of imaging lenses of the present invention will be described. Lens cross sections of imaging lenses of Example 1 through Example 19 are illustrated in FIG. 3 through FIG. 21, respectively. In FIG. 3 through FIG. 21, the left side of the diagram is the object side, and the right side of the diagram is the image side. Further, aperture stop St, optical member PP and the imaging device 5, which is arranged on image plane Sim, are also illustrated in a similar manner to FIG. 1. In each diagram, aperture stop St does not represent the shape nor the size of aperture stop St but the position of aperture stop St on optical axis Z. In each example, signs Ri, Di (i=1, 2, 3, . . . ) in the lens cross section correspond to Ri, Di in lens data that will be described next.

The imaging lens according to the first embodiment of the present invention corresponds to Examples 1 through 19. The imaging lens according to the second embodiment of the present invention corresponds to Examples 1 through 3 and 5 through 19. The imaging lens according to the third embodiment of the present invention corresponds to Examples 1 through 3 and 5 through 19. The imaging lens according to the fourth embodiment of the present invention corresponds to Examples 1 through 4 and 6 through 19. The imaging lens according to the fifth embodiment of the present invention corresponds to Examples 1 through 3 and 6 through 19.

Table 1 through Table 19 show lens data about the imaging lenses of Example 1 through Example 19, respectively. In each table, (A) shows basic lens data, and (B) shows various kinds of data, and (C) shows aspherical surface data.

In the basic lens data, column Si shows the surface number of the i-th surface (i=1, 2, 3, . . . ). The object-side surface of the most object-side composition element is the first surface, and surface numbers sequentially increase toward the image side. Column Ri shows the curvature radius of the i-th surface, and column Di shows a distance between the i-th surface and the (i+1)th surface on optical axis Z. Here, the sign of a curvature radius is positive when the shape of a surface is convex toward the object side, and the sign of a curvature radius is negative when the shape of a surface is convex toward the image side. Further, column Ndj shows the refractive index of the j-th optical element (j=1, 2, 3, . . . ) for d-line (wavelength is 587.6 nm). The most object-side lens is the first optical element, and the number j sequentially increases toward the image side. The column vdj shows the Abbe number of the j-th optical element for d-line. Here, the basic lens data include aperture stop St and optical member PP. In the column of the surface number, the term (St) is also written for a surface corresponding to aperture stop St.

In the basic lens data, mark "*" is attached to the surface number of an aspherical surface. The basic lens data show, as the curvature radius of an aspherical surface, the numerical value of a paraxial curvature radius (a curvature radius at the center). The aspherical surface data show the surface numbers of aspherical surfaces and aspherical surface coefficients about the aspherical surfaces. In the aspherical surface data, "E-n" (n: integer) means "×10$^{-n}$", and "E+n" means "×10$^{n}$". Here, the aspherical surface coefficients are values of coefficients KA, RBm (m=3, 4, 5, . . . 20) in the following aspherical equation:

$$Zd = \frac{C \times Y^2}{1 + \sqrt{1 - KA \times C^2 \times Y^2}} + \sum_m RB_m Y^m,$$ [Equation 1]

where

Zd: depth of an aspherical surface (the length of a perpendicular from a point on the aspherical surface at height Y to a plane that contacts with the vertex of the aspherical surface and is perpendicular to the optical axis), Y: height (the length from the optical axis to the lens surface), C: paraxial curvature, and KA, RBm: aspherical surface coefficients (m=3, 4, 5, . . . 20).

In various kinds of data, L is a distance (a back focus portion is a distance in air) on optical axis Z from the object-side surface of first lens L1 to image plane Sim, and Bf is a distance (corresponding to back focus, and distance in air) on optical axis Z from the image-side surface of the most image-side lens to image plane Sim. Further, f is the focal length of the entire system, and f1 is the focal length of first lens L1, and f2 is the focal length of second lens L2, and f3 is the focal length of third lens L3, and f4 is the focal length of fourth lens L4, and f5 is the focal length of fifth lens L5, and f6 is the focal length of sixth lens L6. Further, f23 is a combined focal length of second lens L2 and third lens L3, and f45 is a combined focal length of fourth lens L4 and fifth lens L5.

Tables 20 and 21 collectively show values corresponding to conditional formulas for each example. Here, conditional formula (1) is (R8+R9)/(R8−R9), conditional formula (2) is D9/f, conditional formula (3) is (R5+R6)/(R5−R6), conditional formula (4) is (R10+R11)/(R10−R11), conditional formula (5) is D4/f, conditional formula (6) is vd3+vd5, conditional formula (7) is |f1/f|, conditional formula (8) is |f2/f|, conditional formula (9) is f3/f, conditional formula (10) is f4/f, conditional formula (11) is R2/f, conditional formula (12) is R9/f, conditional formula (13) is R1/f, conditional formula (14) is f6/f, conditional formula (15) is R13/f, conditional formula (16) is f5/f, conditional formula (17) is R4/f, conditional formula (18) is R10/f, conditional formula (19) is (D4+D5)/f, conditional formula (20) is f/R5, conditional formula (21) is f/R3, conditional formula (22) is f23/f, conditional formula (23) is f45/f, conditional formula (24) is L/f, conditional formula (25) is Bf/f, and conditional formula (26) is (R1+R2)/(R1−R2), where R1: a curvature radius of an object-side surface of first lens L1, R2: a curvature radius of an image-side surface of first lens L1, R3: a curvature radius of an object-side surface of second lens L2, R4: a curvature radius of an image-side surface of second lens L2, R5: a curvature radius of an object-side surface of third lens L3, R6: a curvature radius of an image-side surface of third lens L3, R8: a curvature radius of an object-side surface of fourth lens L4, R9: a curvature radius of an image-side surface of fourth lens L4, R10: a curvature radius of an object-side surface of fifth lens L5, R11: a curvature radius of an image-side surface of fifth lens L5, R13: a curvature radius of an image-side surface of sixth lens L6, D4: an air space between second lens L2 and third lens L3 on an optical axis, D5: a center thickness of third lens L3, D9: an air space between fourth lens L4 and fifth lens L5 on an optical axis, vd3: an Abbe number of the material of third lens 1.3 for d-line, vd5: an Abbe number of the material of fifth lens L5 for d-line, f: a focal length of an entire system, f1: a focal length of first lens L1, f2: a focal length of second lens L2, f3: a focal length of third lens L3, f4: a focal length of fourth lens L4, f5: a focal length of fifth lens L5, f6: a focal length of sixth lens L6, f23: a combined focal length of second lens L2 and third lens L3, f45: a combined focal length of fourth lens L4 and fifth lens L5, L: a length on an optical axis from an object-side surface of first lens L1 to an image plane (a back focus portion is a distance in air), and Bf: a length on an optical axis from an image-side surface of a most image-side lens to an image plane (a distance in air).

As the unit of each numerical value, "mm" is used for length. However, this unit is only an example. Since an optical system can be used by proportionally enlarging or reducing the optical system, other appropriate units may be used.

TABLE 1

EXAMPLE 1

(A)

| Si | Ri | Di | Ndj | νdj |
|---|---|---|---|---|
| 1 | 20.2481 | 1.89740 | 1.8830 | 40.8 |
| 2 | 5.8769 | 3.34841 | | |
| *3 | −56.4108 | 1.04999 | 1.5339 | 55.9 |
| *4 | 2.0915 | 2.76457 | | |
| *5 | −222.3832 | 2.59243 | 1.6140 | 25.5 |
| *6 | −5.5992 | 0.70727 | | |
| 7(St) | ∞ | 0.32722 | | |
| 8 | 4.7343 | 2.76957 | 1.6228 | 57.1 |
| 9 | −5.1156 | 0.63032 | | |
| 10 | −3.8731 | 1.00159 | 1.9229 | 18.9 |
| 11 | 18.0622 | 0.27837 | | |
| *12 | 4.5152 | 2.26606 | 1.5339 | 55.9 |
| *13 | −3.1308 | 0.75000 | | |
| 14 | ∞ | 0.75000 | 1.5168 | 64.2 |
| 15 | ∞ | 1.84637 | | |
| IMAGE PLANE | ∞ | * | | |

(B)

| | |
|---|---|
| L | 22.7 |
| Bf | 3.1 |
| f | 1.61 |
| f1 | −10.00 |
| f2 | −3.75 |
| f3 | 9.31 |
| f4 | 4.43 |
| f5 | −3.38 |
| f6 | 3.88 |
| f23 | −30.95 |
| f45 | 22.33 |

(C)

| | KA | RB3 | RB4 | RB5 | RB6 | RB7 | RB8 |
|---|---|---|---|---|---|---|---|
| 3 | 0.0000000E+00 | −1.9147091E−04 | −5.1324898E−04 | −2.5090541E−04 | −6.3699653E−05 | 3.7141400E−05 | −3.6776802E−06 |
| 4 | 0.0000000E+00 | −4.5553241E−03 | 3.8915134E−03 | 1.1756358E−03 | 6.8022473E−04 | −9.5487306E−06 | −1.0079419E−04 |
| 5 | 0.0000000E+00 | 4.5744040E−04 | −1.4020941E−03 | −1.5941987E−05 | 2.3580236E−04 | 8.6993459E−05 | −2.2745543E−05 |
| 6 | 0.0000000E+00 | −2.5002646E−03 | 1.8648280E−03 | −3.2271493E−04 | −4.1942479E−04 | −1.0396139E−04 | 1.3172461E−04 |
| 12 | 0.0000000E+00 | −4.3245119E−03 | −1.9313883E−03 | 2.8148314E−05 | 2.1932569E−04 | 8.1947941E−05 | −3.5942238E−06 |
| 13 | 0.0000000E+00 | 4.4606036E−04 | 4.2153832E−03 | 8.0087389E−04 | 8.4794053E−05 | 1.2658674E−05 | 1.7420796E−05 |

TABLE 2

EXAMPLE 2

(A)

| Si | Ri | Di | Ndj | νdj |
|---|---|---|---|---|
| 1 | 19.8729 | 1.54630 | 1.8348 | 42.7 |
| 2 | 5.7942 | 3.26839 | | |
| *3 | −48.3856 | 1.13615 | 1.5339 | 55.9 |
| *4 | 2.0411 | 2.83732 | | |
| *5 | −75.3245 | 2.71197 | 1.6140 | 25.5 |
| *6 | −5.6997 | 0.55359 | | |
| 7(St) | ∞ | 0.30001 | | |
| 8 | 4.7107 | 3.00237 | 1.6228 | 57.1 |
| 9 | −5.0346 | 0.60000 | | |
| 10 | −3.8545 | 0.90312 | 1.9229 | 18.9 |
| 11 | 18.0622 | 0.23315 | | |
| *12 | 4.5827 | 2.26532 | 1.5339 | 55.9 |
| *13 | −3.1584 | 0.75000 | | |
| 14 | ∞ | 0.75000 | 1.5168 | 64.2 |
| 15 | ∞ | 1.94048 | | |
| IMAGE PLANE | ∞ | * | | |

TABLE 2-continued

EXAMPLE 2

(B)

| | |
|---|---|
| L | 22.5 |
| Bf | 22.5 |
| f | 1.59 |
| f1 | −10.31 |
| f2 | −3.64 |
| f3 | 9.90 |
| f4 | 4.43 |
| f5 | −3.38 |
| f6 | 3.90 |
| f23 | −22.54 |
| f45 | 21.10 |

(C)

| | KA | RB3 | RB4 | RB5 | RB6 | RB7 | RB8 |
|---|---|---|---|---|---|---|---|
| 3 | 0.0000000E+00 | −3.6095633E−04 | −4.8844271E−04 | −2.0919881E−04 | −5.2427173E−05 | 2.7663499E−05 | −1.9820914E−06 |
| 4 | 0.0000000E+00 | −4.9844780E−03 | 2.9172784E−03 | 7.1648628E−04 | 5.4847886E−04 | −1.4281608E−05 | −7.3647129E−05 |
| 5 | 0.0000000E+00 | 8.8474128E−04 | −1.6095270E−03 | −1.8692709E−04 | 1.6791039E−04 | 7.3890432E−05 | −1.7693870E−05 |
| 6 | 0.0000000E+00 | −2.0460509E−03 | 1.4066501E−03 | −3.4724162E−04 | −3.5842777E−04 | −8.3711060E−05 | 1.2196176E−04 |
| 12 | 0.0000000E+00 | −4.6928465E−03 | −1.9569316E−03 | 7.5464784E−05 | 2.7594533E−04 | 1.2480403E−04 | −2.2148169E−05 |
| 13 | 0.0000000E+00 | 4.4290402E−04 | 4.2659289E−03 | 8.7934854E−04 | 1.2798315E−04 | 2.5917505E−05 | 1.6088272E−05 |

TABLE 3

EXAMPLE 3

(A)

| Si | Ri | Di | Ndj | νdj |
|---|---|---|---|---|
| 1 | 16.7039 | 1.23161 | 1.8830 | 40.8 |
| 2 | 4.8927 | 3.64353 | | |
| *3 | −24.3483 | 0.89999 | 1.5339 | 55.9 |
| *4 | 1.8993 | 2.81580 | | |
| *5 | −670.4895 | 2.57933 | 1.6140 | 25.5 |
| *6 | −5.5631 | 1.15501 | | |
| 7(St) | ∞ | 0.39756 | | |
| 8 | 4.8908 | 3.15000 | 1.6228 | 57.1 |
| 9 | −4.8689 | 0.58713 | | |
| 10 | −3.8315 | 0.74999 | 1.9229 | 18.9 |
| 11 | 18.8948 | 0.39375 | | |
| *12 | 4.0281 | 1.83749 | 1.5339 | 55.9 |
| *13 | −3.1365 | 0.75000 | | |
| 14 | ∞ | 0.30000 | 1.5168 | 64.2 |
| 15 | ∞ | 2.11070 | | |
| IMAGE PLANE | ∞ | * | | |

(B)

| | |
|---|---|
| L | 22.5 |
| Bf | 3.1 |
| f | 1.26 |
| f1 | −8.24 |
| f2 | −3.26 |
| f3 | 9.12 |
| f4 | 4.47 |
| f5 | −3.40 |
| f6 | 3.63 |
| f23 | −21.32 |
| f45 | 22.23 |

(C)

| | KA | RB3 | RB4 | RB5 | RB6 | RB7 | RB8 |
|---|---|---|---|---|---|---|---|
| 3 | 0.0000000E+00 | 9.1257393E−05 | −7.7836115E−04 | −2.7070206E−04 | −6.9600813E−05 | 2.0545830E−05 | 1.9019799E−06 |
| 4 | 0.0000000E+00 | −1.3310763E−03 | 4.0606486E−03 | 8.3034812E−04 | 4.6466358E−04 | −2.2646755E−05 | −2.9898410E−05 |
| 5 | 0.0000000E+00 | 1.2157838E−04 | −1.9606748E−04 | 5.7509224E−04 | 4.9678970E−04 | 1.3467210E−05 | −5.7742730E−05 |
| 6 | 0.0000000E+00 | −6.1820599E−04 | 2.1029239E−04 | 2.2294058E−04 | 9.0450911E−05 | 6.2226563E−05 | −6.2468217E−06 |
| 12 | 0.0000000E+00 | −5.0590132E−03 | −2.0515757E−03 | 1.5974456E−04 | 3.2090727E−04 | 1.4895527E−04 | −7.0816505E−06 |
| 13 | 0.0000000E+00 | −1.5087804E−03 | 4.4889384E−03 | 1.0901659E−03 | 1.8591380E−04 | 3.5366868E−05 | 2.4235106E−05 |

TABLE 4

EXAMPLE 4

(A)

| Si | Ri | Di | Ndj | νdj |
|---|---|---|---|---|
| 1 | 16.4185 | 1.00010 | 1.7725 | 49.6 |
| 2 | 3.5796 | 1.71564 | | |
| *3 | 12.9987 | 1.00002 | 1.5339 | 55.9 |
| *4 | 1.7329 | 1.46930 | | |
| *5 | −19.3883 | 1.70001 | 1.6140 | 25.5 |
| *6 | −5.0143 | 1.47765 | | |
| 7(St) | ∞ | 0.20001 | | |
| 8 | 3.8840 | 2.20737 | 1.7550 | 52.3 |
| 9 | −3.9858 | 0.40896 | | |
| 10 | −2.8660 | 0.60213 | 1.9229 | 18.9 |
| 11 | −50.9187 | 0.10004 | | |
| *12 | 4.5990 | 1.51366 | 1.5339 | 55.9 |
| *13 | −4.5989 | 0.50000 | | |
| 14 | ∞ | 0.50000 | 1.5168 | 64.2 |
| 15 | ∞ | 2.11226 | | |
| IMAGE PLANE | ∞ | * | | |

(B)

| | |
|---|---|
| L | 16.3 |
| Bf | 2.9 |
| f | 1.57 |
| f1 | −6.13 |
| f2 | −3.86 |
| f3 | 10.54 |
| f4 | 2.96 |
| f5 | −3.31 |
| f6 | 4.57 |
| f23 | −10.31 |
| f45 | 6.71 |

(C)

| | KA | RB3 | RB4 | RB5 | PB6 | RB7 | RB8 |
|---|---|---|---|---|---|---|---|
| 3 | 0.0000000E+00 | 1.2354426E−02 | −1.6697786E−03 | −6.3949108E−04 | −4.7913007E−04 | −2.0862151E−04 | 8.3816657E−05 |
| 4 | 0.0000000E+00 | 2.1491775E−02 | 1.3466427E−02 | 4.0075223E−03 | 6.6515395E−04 | −2.4216286E−04 | −2.5095929E−04 |
| 5 | 0.0000000E+00 | −1.0593142E−03 | 3.2645128E−03 | −2.6787145E−04 | −3.2510346E−04 | −8.8932636E−05 | 1.5822642E−04 |
| 6 | 0.0000000E+00 | −5.0822563E−03 | −4.3024594E−03 | −6.8130534E−04 | −4.1337040E−04 | −6.8626384E−05 | 9.5322657E−05 |
| 12 | 0.0000000E+00 | −7.6738495E−03 | −2.0608036E−03 | −3.3559476E−04 | −3.7148601E−05 | −3.9221757E−05 | −7.0666747E−06 |
| 13 | 0.0000000E+00 | 1.3148915E−03 | 5.0500205E−03 | 1.3043876E−03 | −4.3814567E−05 | −1.9124640E−04 | 2.2501694E−06 |

TABLE 5

EXAMPLE 5

(A)

| Si | Ri | Di | Ndj | νdj |
|---|---|---|---|---|
| 1 | 14.2920 | 1.00010 | 1.7725 | 49.6 |
| 2 | 3.4283 | 2.29671 | | |
| *3 | −12.6900 | 1.00002 | 1.5339 | 55.9 |
| *4 | 1.1175 | 1.44071 | | |
| *5 | 12.7290 | 1.70001 | 1.6140 | 25.5 |
| *6 | −6.0091 | 0.97245 | | |
| 7(St) | ∞ | 0.20001 | | |
| 8 | 4.0640 | 1.58288 | 1.7550 | 52.3 |
| 9 | −3.3251 | 0.41197 | | |
| 10 | −2.8664 | 0.60212 | 1.9229 | 18.9 |
| 11 | 11.4601 | 0.10004 | | |
| *12 | 2.7559 | 1.51327 | 1.5339 | 55.9 |
| *13 | −2.0718 | 0.50000 | | |
| 14 | ∞ | 0.50000 | 1.5168 | 64.2 |
| 15 | ∞ | 1.41080 | | |
| IMAGE PLANE | ∞ | * | | |

TABLE 5-continued

EXAMPLE 5

(B)

| | |
|---|---|
| L | 15.1 |
| Bf | 2.2 |
| f | 0.80 |
| f1 | −6.08 |
| f2 | −1.88 |
| f3 | 6.89 |
| f4 | 2.67 |
| f5 | −2.44 |
| f6 | 2.49 |
| f23 | −4.65 |
| f45 | 9.45 |

(C)

| | KA | RB3 | RB4 | RB5 | RB6 | RB7 | RB8 |
|---|---|---|---|---|---|---|---|
| 3 | 0.0000000E+00 | 3.6439160E−02 | 1.5205420E−03 | −1.5869927E−03 | −7.4041968E−04 | −2.3121409E−04 | 1.0711704E−04 |
| 4 | 0.0000000E+00 | 1.0397204E−03 | 3.5459035E−02 | 1.1221998E−02 | 8.0430069E−04 | −2.5624775E−03 | −2.9953419E−03 |
| 5 | 0.0000000E+00 | 2.2021753E−03 | 3.1903225E−03 | 1.4680107E−03 | 4.1097489E−04 | −1.0872744E−04 | −3.5401918E−04 |
| 6 | 0.0000000E+00 | 2.7203228E−03 | −3.0250466E−03 | −1.5782089E−03 | −7.3104029E−04 | 3.1495283E−04 | 9.3146490E−04 |
| 12 | 0.0000000E+00 | −1.4097279E−02 | 1.6998102E−03 | 2.7475822E−03 | 1.4708821E−03 | 4.1535737E−04 | −6.7314304E−05 |
| 13 | 0.0000000E+00 | −2.8468327E−03 | 2.1065897E−02 | 1.0101608E−02 | 3.1517777E−03 | 3.7552387E−04 | −3.5028229E−04 |

TABLE 6

EXAMPLE 6

(A)

| Si | Ri | Di | Ndj | νdj |
|---|---|---|---|---|
| 1 | 16.1382 | 1.23319 | 1.8348 | 42.7 |
| 2 | 4.1198 | 2.14134 | | |
| *3 | 4.9385 | 1.00001 | 1.5339 | 55.9 |
| *4 | 0.9023 | 1.85720 | | |
| *5 | −14.5206 | 1.50018 | 1.6140 | 25.5 |
| *6 | −4.4649 | 0.93804 | | |
| 7(St) | ∞ | 0.20001 | | |
| 8 | 4.0011 | 1.50020 | 1.7550 | 52.3 |
| 9 | −3.2146 | 0.40407 | | |
| 10 | −2.6843 | 0.60198 | 1.9229 | 18.9 |
| 11 | 55.2372 | 0.10004 | | |
| *12 | 3.3034 | 1.56644 | 1.5339 | 55.9 |
| *13 | −2.0245 | 0.50000 | | |
| 14 | ∞ | 0.50000 | 1.5168 | 64.2 |
| 15 | ∞ | 1.20833 | | |
| IMAGE PLANE | ∞ | * | | |

(B)

| | |
|---|---|
| L | 15.1 |
| Bf | 2.0 |
| f | 0.80 |
| f1 | −6.95 |
| f2 | −2.26 |
| f3 | 9.94 |
| f4 | 2.59 |
| f5 | −2.76 |
| f6 | 2.62 |
| f23 | −4.78 |
| f45 | 7.13 |

(C)

| | KA | RB3 | RB4 | RB5 | RB6 | RB7 | RB8 |
|---|---|---|---|---|---|---|---|
| 3 | 0.0000000E+00 | 3.5767133E−02 | 4.7573447E−03 | −1.3888390E−03 | −2.1075877E−03 | −7.2502444E−04 | 2.7290721E−04 |
| 4 | 0.0000000E+00 | 8.9794224E−03 | 5.7195254E−02 | 1.0851729E−02 | 3.2638339E−03 | −4.7171889E−03 | −6.9315691E−03 |
| 5 | 0.0000000E+00 | 9.2741708E−03 | −7.0175313E−03 | −2.5264498E−04 | 3.1650013E−03 | 1.6740932E−03 | −1.5873107E−03 |
| 6 | 0.0000000E+00 | −6.6050291E−03 | 4.9265978E−03 | −6.2555321E−04 | −2.1398532E−03 | −1.2823966E−04 | 1.1571347E−03 |
| 12 | 0.0000000E+00 | 5.7360652E−03 | −1.5166840E−03 | −2.6299280E−04 | 8.6551905E−04 | 4.5739198E−04 | −3.5735299E−04 |
| 13 | 0.0000000E+00 | 3.0949784E−02 | 2.4828730E−02 | 6.2369612E−03 | 6.2999431E−05 | −1.3182863E−03 | −2.8928602E−04 |

TABLE 7

EXAMPLE 7

(A) | | | | | (B) | |
---|---|---|---|---|---|---
Si | Ri | Di | Ndj | νdj | L | 17.5
1 | 16.3636 | 1.50044 | 1.8830 | 40.8 | Bf | 2.3
2 | 3.8317 | 2.61982 | | | f | 1.06
*3 | −74.8232 | 1.00001 | 1.5339 | 55.9 | f1 | −6.00
*4 | 1.4606 | 2.04351 | | | f2 | −2.67
*5 | −19.1195 | 1.70001 | 1.6140 | 25.5 | f3 | 8.24
*6 | −4.1357 | 1.10024 | | | f4 | 2.88
7 | ∞ | 0.20001 | | | f5 | −2.28
(St) | | | | | | 
8 | 3.2310 | 2.20145 | 1.6773 | 57.4 | f6 | 3.05
9 | −3.5725 | 0.40387 | | | f23 | −9.90
10 | −2.5813 | 0.67076 | 1.9229 | 18.9 | f45 | 10.08
11 | 12.7731 | 0.15007 | | | | 
*12 | 3.0039 | 1.61783 | 1.5339 | 55.9 | | 
*13 | −2.8831 | 0.50000 | | | | 
14 | ∞ | 0.50000 | 1.5168 | 64.2 | | 
15 | ∞ | 1.49983 | | | | 
IMAGE PLANE | ∞ | * | | | |

(C) | | | | | | |
---|---|---|---|---|---|---|---
 | KA | RB3 | RB4 | RB5 | RB6 | RB7 | RB8
3 | 0.0000000E+00 | 6.4167058E−04 | −7.3014245E−04 | −6.4207339E−04 | −2.1936065E−04 | 4.1609087E−04 | −1.1275087E−04
4 | 0.0000000E+00 | −6.7048994E−03 | 1.0698020E−02 | 4.9998443E−03 | 5.2208911E−03 | 1.0035646E−04 | −1.6410160E−03
5 | 0.0000000E+00 | 1.4982832E−03 | −4.3501923E−03 | −4.0826376E−05 | 1.5347042E−03 | 6.2079675E−04 | −7.9806733E−04
6 | 0.0000000E+00 | −1.3211045E−02 | 8.3580688E−03 | 1.2650370E−03 | −2.1549873E−03 | −1.7051495E−03 | 9.1066026E−04
12 | 0.0000000E+00 | −5.9486336E−03 | −5.5053693E−03 | 5.9041721E−04 | 1.7704309E−03 | 8.0005899E−04 | −2.9406100E−04
13 | 0.0000000E+00 | 7.5652828E−04 | 1.3907828E−02 | 3.8049092E−03 | 5.0792786E−04 | 1.3562301E−04 | 4.1394624E−04

TABLE 8

EXAMPLE 8

(A) | | | | | (B) | |
---|---|---|---|---|---|---
Si | Ri | Di | Ndj | νdj | L | 14.1
1 | 12.9353 | 1.00010 | 1.7725 | 49.6 | Bf | 1.9
2 | 3.3026 | 2.33152 | | | f | 0.93
*3 | −9.2276 | 1.00002 | 1.5339 | 55.9 | f1 | −6.01
*4 | 1.8067 | 1.19161 | | | f2 | −2.74
*5 | −14.7807 | 1.70001 | 1.6336 | 23.6 | f3 | 8.72
*6 | −4.2006 | 0.61714 | | | f4 | 2.33
7 | ∞ | 0.20001 | | | f5 | −1.91
(St) | | | | | | 
8 | 3.2299 | 1.50020 | 1.7550 | 52.3 | f6 | 2.21
9 | −3.0919 | 0.40417 | | | f23 | −7.22
10 | −2.3268 | 0.60198 | 1.9229 | 18.9 | f45 | 8.64
11 | 8.1157 | 0.10004 | | | | 
*12 | 2.9136 | 1.50009 | 1.5339 | 55.9 | | 
*13 | −1.6243 | 0.50000 | | | | 
14 | ∞ | 0.50000 | 1.5168 | 64.2 | | 
15 | ∞ | 1.09866 | | | | 
IMAGE PLANE | ∞ | * | | | |

(C) | | | | | | |
---|---|---|---|---|---|---|---
 | KA | RB3 | RB4 | RB5 | RB6 | RB7 | RB8
3 | 0.0000000E+00 | 2.1650010E−02 | 9.5757739E−03 | 1.0451234E−03 | −2.8985068E−03 | −9.2399451E−06 | 1.4244246E−04
4 | 0.0000000E+00 | 7.9228128E−03 | 1.9838866E−02 | 1.7711872E−02 | 8.6288760E−03 | −2.2026234E−03 | −5.8572144E−03
5 | 0.0000000E+00 | 7.5105232E−03 | −9.3254512E−03 | −1.9101014E−05 | 3.4820491E−03 | 1.6050183E−03 | −2.3049936E−03
6 | 0.0000000E+00 | −2.6184159E−03 | 3.2705289E−03 | −4.4794584E−04 | 7.0603398E−05 | 4.1220718E−04 | 4.7444046E−04
12 | 0.0000000E+00 | −2.6813985E−02 | −5.7551683E−03 | 5.9193536E−03 | 3.1091072E−03 | 5.1868097E−04 | 1.4364395E−04
13 | 0.0000000E+00 | −1.5195553E−03 | 3.0531743E−02 | 1.3435523E−03 | −3.2356532E−03 | 1.6948655E−04 | 3.5038515E−03

TABLE 9

EXAMPLE 9

(A)

| Si | Ri | Di | Ndj | νdj |
|---|---|---|---|---|
| 1 | 14.3662 | 1.00010 | 1.7725 | 49.6 |
| 2 | 3.6085 | 2.32029 | | |
| *3 | −9.5917 | 1.00002 | 1.5339 | 55.9 |
| *4 | 1.7873 | 1.27677 | | |
| *5 | −15.1422 | 1.70001 | 1.6336 | 23.6 |
| *6 | −4.2122 | 0.59020 | | |
| 7 (St) | ∞ | 0.20001 | | |
| 8 | 3.2246 | 1.50020 | 1.7550 | 52.3 |
| 9 | −3.0905 | 0.40417 | | |
| 10 | −2.3252 | 0.60198 | 1.9229 | 18.9 |
| 11 | 7.7324 | 0.10004 | | |
| *12 | 2.9669 | 1.50009 | 1.5339 | 55.9 |
| *13 | −1.6230 | 0.50000 | | |
| 14 | ∞ | 0.50000 | 1.5168 | 64.2 |
| 15 | ∞ | 1.09853 | | |
| IMAGE PLANE | ∞ | * | | |

(B)

| L | 14.1 |
|---|---|
| Bf | 1.9 |
| f | 0.96 |
| f1 | −6.50 |
| f2 | −2.74 |
| f3 | 8.69 |
| f4 | 2.33 |
| f5 | −1.88 |
| f6 | 2.22 |
| f23 | −7.40 |
| f45 | 8.85 |

(C)

| | KA | RB3 | RB4 | RB5 | RB6 | RB7 | RB8 |
|---|---|---|---|---|---|---|---|
| 3 | 0.0000000E+00 | 2.1903544E−02 | 9.6727507E−03 | 1.0674937E−02 | −2.9158835E−03 | −9.5875193E−06 | 1.4246576E−04 |
| 4 | 0.0000000E+00 | 9.5250820E−03 | 2.0806130E−02 | 1.8030587E−02 | 8.6806552E−03 | −2.2082019E−03 | −5.8533254E−03 |
| 5 | 0.0000000E+00 | 7.5782111E−03 | −8.8911589E−03 | 2.2262780E−04 | 3.5323132E−03 | 1.5412693E−03 | −2.4255053E−03 |
| 6 | 0.0000000E+00 | −1.9393557E−03 | 3.4367199E−03 | −4.6228391E−04 | 8.6633691E−06 | 3.6251208E−04 | 4.6002726E−04 |
| 12 | 0.0000000E+00 | −2.6854927E−02 | −5.6169777E−03 | 6.0156642E−03 | 3.1427576E−03 | 5.1579764E−04 | 1.3158408E−04 |
| 13 | 0.0000000E+00 | −1.7193117E−03 | 3.0532502E−02 | 1.3430953E−03 | −3.2534905E−03 | 1.6226469E−04 | 3.5194545E−03 |

TABLE 10

EXAMPLE 10

(A)

| Si | Ri | Di | Ndj | νdj |
|---|---|---|---|---|
| 1 | 15.0780 | 1.00010 | 1.7725 | 49.6 |
| 2 | 3.5849 | 2.41053 | | |
| *3 | −8.6418 | 1.00002 | 1.5339 | 55.9 |
| *4 | 1.7529 | 1.55171 | | |
| *5 | −17.3481 | 1.30033 | 1.6336 | 23.6 |
| *6 | −3.9473 | 0.67095 | | |
| 7 (St) | ∞ | 0.20001 | | |
| 8 | 3.2492 | 2.00649 | 1.7550 | 52.3 |
| 9 | −3.1836 | 0.40414 | | |
| 10 | −2.2631 | 0.60198 | 1.9229 | 18.9 |
| 11 | 9.2061 | 0.10004 | | |
| *12 | 2.8017 | 1.50009 | 1.5339 | 55.9 |
| *13 | −1.9654 | 0.50000 | | |
| 14 | ∞ | 0.50000 | 1.5168 | 64.2 |
| 15 | ∞ | 1.12508 | | |
| IMAGE PLANE | ∞ | * | | |

(B)

| L | 14.7 |
|---|---|
| Bf | 2.0 |
| f | 1.05 |
| f1 | −6.33 |
| f2 | −2.64 |
| f3 | 7.77 |
| f4 | 2.46 |
| f5 | −1.92 |
| f6 | 2.43 |
| f23 | −8.28 |
| f45 | 8.17 |

(C)

| | KA | RB3 | RB4 | RB5 | RB6 | RB7 | RB8 |
|---|---|---|---|---|---|---|---|
| 3 | 0.0000000E+00 | 2.2640990E−02 | 9.8674636E−03 | 9.4672569E−04 | −3.2037994E−03 | 3.0629965E−05 | 1.5570189E−04 |
| 4 | 0.0000000E+00 | 1.0116639E−02 | 3.0225304E−02 | 2.1775019E−02 | 9.0362897E−03 | −2.4509923E−03 | −6.0958646E−03 |
| 5 | 0.0000000E+00 | 6.9279135E−03 | −4.9059337E−03 | 2.6546955E−03 | 4.3318198E−03 | 1.4690108E−03 | −2.8401252E−03 |
| 6 | 0.0000000E+00 | −2.6611278E−03 | 4.0795282E−03 | −2.4720430E−04 | −2.8088451E−04 | −1.6063163E−04 | 4.2602080E−05 |
| 12 | 0.0000000E+00 | −2.5049753E−03 | −5.8822184E−03 | 5.5505889E−03 | 2.7285266E−03 | 3.2719457E−04 | 2.9205341E−04 |
| 13 | 0.0000000E+00 | −5.9254798E−03 | 2.9919005E−02 | 6.5599273E−04 | −4.0295060E−03 | −2.7386507E−04 | 3.5738004E−03 |

TABLE 11

EXAMPLE 11

(A)

| Si | Ri | Di | Ndj | ν dj |
|---|---|---|---|---|
| 1 | 19.8204 | 1.65037 | 1.8830 | 40.8 |
| 2 | 4.0196 | 2.99994 | | |
| *3 | 39.0364 | 1.09917 | 1.5339 | 55.9 |
| *4 | 1.6219 | 1.77888 | | |
| *5 | −28.1292 | 1.87020 | 1.6335 | 23.6 |
| *6 | −4.5095 | 1.07554 | | |
| 7 (St) | ∞ | 0.21994 | | |
| 8 | 3.7642 | 2.42012 | 1.6779 | 55.3 |
| 9 | −3.8509 | 0.44386 | | |
| 10 | −2.9067 | 0.69649 | 1.9229 | 18.9 |
| 11 | 9.8419 | 0.16499 | | |
| *12 | 3.2865 | 2.03691 | 1.5339 | 55.9 |
| *13 | −2.1848 | 2.21192 | | |
| 14 | ∞ | 0.30000 | 1.5168 | 64.2 |
| 15 | ∞ | 0.05853 | | |
| IMAGE PLANE | ∞ | * | | |

(B)

| L | 18.9 |
|---|---|
| Bf | 2.5 |
| f | 1.12 |
| f1 | −6.00 |
| f2 | −3.20 |
| f3 | 8.22 |
| f4 | 3.22 |
| f5 | −2.37 |
| f6 | 2.82 |
| f23 | −13.49 |
| f45 | 15.00 |

(C)

| | KA | RB3 | RB4 | RB5 | RB6 | RB7 | RB8 |
|---|---|---|---|---|---|---|---|
| 3 | 0.0000000E+00 | −9.1618953E−04 | −1.0480220E−03 | −7.6285175E−04 | −2.1553948E−04 | 2.2707572E−04 | −5.6094758E−05 |
| 4 | 0.0000000E+00 | −4.7639190E−03 | −2.3785628E−03 | −3.1100012E−04 | 2.8500663E−03 | 4.5089975E−04 | −5.2206334E−04 |
| 5 | 0.0000000E+00 | −1.2657864E−03 | −2.5750575E−03 | 6.8657979E−04 | 1.2297470E−03 | 4.7944448E−04 | −2.2597723E−04 |
| 6 | 0.0000000E+00 | −1.0422881E−02 | 6.5516845E−03 | 9.1917831E−04 | −1.2647720E−03 | −8.6088094E−04 | 5.4614545E−04 |
| 12 | 0.0000000E+00 | −3.3628265E−03 | −4.5860184E−03 | 5.5109520E−04 | 1.3149638E−03 | 5.4029773E−04 | −1.6634909E−04 |
| 13 | 0.0000000E+00 | 7.3445487E−03 | 1.2199040E−02 | 2.1844674E−03 | −8.9048156E−05 | 1.9962900E−07 | 3.8318230E−04 |

TABLE 12

EXAMPLE 12

(A)

| Si | Ri | Di | Ndj | ν dj |
|---|---|---|---|---|
| 1 | 18.7719 | 1.65038 | 1.8830 | 40.8 |
| 2 | 4.2192 | 2.99994 | | |
| *3 | 34.5061 | 1.09549 | 1.5339 | 55.9 |
| *4 | 1.3926 | 1.80845 | | |
| *5 | −23.0494 | 1.87022 | 1.6335 | 23.6 |
| *6 | −4.5817 | 1.01344 | | |
| 7 (St) | ∞ | 0.22000 | | |
| 8 | 3.7866 | 2.40989 | 1.6779 | 55.3 |
| 9 | −3.8204 | 0.44184 | | |
| 10 | −2.9290 | 0.69549 | 1.9229 | 18.9 |
| 11 | 10.4027 | 0.16497 | | |
| *12 | 3.3129 | 1.98940 | 1.5339 | 55.9 |
| *13 | −1.9817 | 2.19592 | | |
| 14 | ∞ | 0.30000 | 1.5168 | 64.2 |
| 15 | ∞ | 0.06808 | | |
| IMAGE PLANE | ∞ | * | | |

(B)

| L | 18.8 |
|---|---|
| Bf | 2.5 |
| f | 0.99 |
| f1 | −6.51 |
| f2 | −2.75 |
| f3 | 8.69 |
| f4 | 3.22 |
| f5 | −2.42 |
| f6 | 2.67 |
| f23 | −8.58 |
| f45 | 14.25 |

(C)

| | KA | RB3 | RB4 | RB5 | RB6 | RB7 | RB8 |
|---|---|---|---|---|---|---|---|
| 3 | 0.0000000E+00 | 5.7911664E−04 | −6.6379806E−04 | −6.5589233E−04 | −1.7111511E−04 | 2.3557560E−04 | −6.1986275E−05 |
| 4 | 0.0000000E+00 | −6.3269412E−03 | −1.8735708E−03 | 2.0690458E−04 | 3.1383771E−03 | 5.6997298E−04 | −4.9495560E−04 |
| 5 | 0.0000000E+00 | −8.8853942E−04 | −2.6682851E−03 | 5.9749183E−04 | 1.1919519E−03 | 4.8049613E−04 | −1.7362108E−04 |
| 6 | 0.0000000E+00 | −1.0306868E−02 | 6.3860445E−03 | 8.1798995E−04 | −1.2990590E−03 | −8.7113010E−04 | 5.3781229E−04 |
| 12 | 0.0000000E+00 | −4.3064743E−03 | −4.8399775E−03 | 5.3416883E−04 | 1.3396193E−03 | 5.6358634E−04 | −1.4794939E−04 |
| 13 | 0.0000000E+00 | 8.3244992E−03 | 1.2960182E−02 | 2.4778117E−03 | 1.3092162E−05 | 3.5252713E−05 | 3.9678846E−04 |

TABLE 13

EXAMPLE 13

(A)

| Si | Ri | Di | Ndj | ν dj |
|---|---|---|---|---|
| 1 | 19.4108 | 1.65017 | 1.8830 | 40.8 |
| 2 | 4.2210 | 2.99994 | | |
| *3 | 26.9795 | 1.08895 | 1.5339 | 55.9 |
| *4 | 1.4324 | 1.74913 | | |
| *5 | −20.8030 | 1.87040 | 1.6335 | 23.6 |
| *6 | −4.6173 | 0.88090 | | |
| 7 (St) | ∞ | 0.22004 | | |
| 8 | | | | |
| 9 | 3.8010 | 2.39372 | 1.6779 | 55.3 |
| 10 | −3.7756 | 0.43913 | | |
| 11 | −2.9576 | 0.69143 | 1.9229 | 18.9 |
| *12 | 10.8080 | 0.16470 | | |
| *13 | 3.3054 | 1.88014 | 1.5339 | 55.9 |
| 14 | −1.9183 | 2.19961 | | |
| 15 | ∞ | 0.30000 | 1.5168 | 64.2 |
| 1 | ∞ | 0.00045 | | |
| IMAGE PLANE | ∞ | * | | |

(B)

| L | 18.4 |
|---|---|
| Bf | 2.4 |
| f | 0.98 |
| f1 | −6.44 |
| f2 | −2.88 |
| f3 | 8.97 |
| f4 | 3.20 |
| f5 | −2.46 |
| f6 | 2.60 |
| f23 | −8.67 |
| f45 | 13.48 |

(C)

| | KA | RB3 | RB4 | RB5 | RB6 | RB7 | RB8 |
|---|---|---|---|---|---|---|---|
| 3 | 0.0000000E+00 | 1.3600789E−03 | −4.9566783E−04 | −6.0617245E−04 | −1.1418766E−04 | 2.3880621E−04 | −7.0991830E−05 |
| 4 | 0.0000000E+00 | −1.0005303E−02 | −1.0185862E−03 | 1.1874268E−03 | 3.6890752E−03 | 7.8096094E−04 | −4.7291234E−04 |
| 5 | 0.0000000E+00 | −8.6920852E−04 | −2.8453992E−03 | 5.9242040E−04 | 1.2820077E−03 | 6.0342051E−04 | −4.4211263E−05 |
| 6 | 0.0000000E+00 | −9.9929881E−03 | 6.3050145E−03 | 8.3431424E−04 | −1.2058447E−03 | −7.8286597E−04 | 5.8830193E−04 |
| 12 | 0.0000000E+00 | −4.7546954E−03 | −4.8877353E−03 | 5.7101388E−04 | 1.3672240E−03 | 5.7840065E−04 | −1.3700312E−04 |
| 13 | 0.0000000E+00 | 9.6379755E−03 | 1.3486884E−02 | 2.5672676E−03 | 1.8558555E−05 | 5.1177438E−05 | 4.1403857E−04 |

TABLE 14

EXAMPLE 14

(A)

| Si | Ri | Di | Ndj | ν dj |
|---|---|---|---|---|
| 1 | 19.3963 | 1.65018 | 1.8830 | 40.8 |
| 2 | 4.2083 | 2.99994 | | |
| *3 | 27.3125 | 1.08708 | 1.5339 | 55.9 |
| *4 | 1.4325 | 1.69437 | | |
| *5 | −20.3608 | 1.87048 | 1.6335 | 23.6 |
| *6 | −4.6215 | 0.85933 | | |
| 7 (St) | ∞ | 0.22006 | | |
| 8 | 3.8030 | 2.38955 | 1.6779 | 55.3 |
| 9 | −3.7560 | 0.43851 | | |
| 10 | −2.9681 | 0.69014 | 1.9229 | 18.9 |
| 11 | 10.9073 | 0.16461 | | |
| *12 | 3.3067 | 1.85430 | 1.5339 | 55.9 |
| *13 | −1.9013 | 0.00000 | | |
| 14 | ∞ | 0.30000 | 1.5168 | 64.2 |
| 15 | ∞ | 2.19995 | | |
| IMAGE PLANE | ∞ | * | | |

(B)

| L | 18.3 |
|---|---|
| Bf | 2.4 |
| f | 0.98 |
| f1 | −6.41 |
| f2 | −2.87 |
| f3 | 9.02 |
| f4 | 3.20 |
| f5 | −2.47 |
| f6 | 2.58 |
| f23 | −8.42 |
| f45 | 13.19 |

(C)

| | KA | RB3 | RB4 | RB5 | RB6 | RB7 | RB8 |
|---|---|---|---|---|---|---|---|
| 3 | 0.0000000E+00 | 1.5199344E−03 | −4.5767913E−04 | −5.9666256E−04 | −1.1240736E−04 | 2.4188715E−04 | −7.4207454E−05 |
| 4 | 0.0000000E+00 | −1.1380017E−02 | −9.8252471E−04 | 1.3745292E−03 | 3.8051900E−03 | 8.2004911E−04 | −4.8110527E−04 |
| 5 | 0.0000000E+00 | −8.2955667E−04 | −2.8594539E−03 | 6.1086088E−04 | 1.3165747E−03 | 6.4247393E−04 | −4.0541629E−06 |
| 6 | 0.0000000E+00 | −9.8597186E−03 | 6.2879381E−03 | 8.4179728E−04 | −1.1739429E−03 | −7.5366509E−04 | 6.0273236E−04 |
| 12 | 0.0000000E+00 | −4.8369955E−03 | −4.8874721E−03 | 5.8142545E−04 | 1.3714685E−03 | 5.7983922E−04 | −1.3192975E−04 |
| 13 | 0.0000000E+00 | 9.9848537E−03 | 1.3609662E−02 | 2.5823992E−03 | 1.8445168E−05 | 5.5624718E−05 | 4.2254966E−04 |

TABLE 15

EXAMPLE 15

(A)

| Si | Ri | Di | Ndj | ν dj |
|---|---|---|---|---|
| 1 | 19.1534 | 1.65016 | 1.8830 | 40.8 |
| 2 | 4.2105 | 2.99994 | | |
| *3 | 27.6482 | 1.09042 | 1.5339 | 55.9 |
| *4 | 1.4168 | 1.74765 | | |
| *5 | −20.8261 | 1.87033 | 1.6335 | 23.6 |
| *6 | −4.6218 | 0.89922 | | |
| 7 (St) | ∞ | 0.22003 | | |
| 8 | 3.7996 | 2.39665 | 1.6779 | 55.3 |
| 9 | −3.7880 | 0.43963 | | |
| 10 | −2.9502 | 0.69223 | 1.9229 | 18.9 |
| 11 | 10.6491 | 0.16475 | | |
| *12 | 3.3061 | 1.89882 | 1.5339 | 55.9 |
| *13 | −1.9350 | 2.17392 | | |
| 14 | ∞ | 0.30000 | 1.5168 | 64.2 |
| 15 | ∞ | 0.07082 | | |
| IMAGE PLANE | ∞ | * | | |

(B)

| L | 18.5 |
|---|---|
| Bf | 2.4 |
| f | 0.99 |
| f1 | −6.45 |
| f2 | −2.84 |
| f3 | 8.97 |
| f4 | 3.21 |
| f5 | −2.44 |
| f6 | 2.62 |
| f23 | −8.44 |
| f45 | 13.77 |

(C)

| | KA | RB3 | RB4 | RB5 | RB6 | RB7 | RB8 |
|---|---|---|---|---|---|---|---|
| 3 | 0.0000000E+00 | 1.2135826E−03 | −5.4827237E−04 | −6.2228982E−04 | −1.1839901E−04 | 2.3589533E−04 | −6.8931254E−05 |
| 4 | 0.0000000E+00 | −9.6585402E−03 | −1.0997123E−03 | 1.0661618E−03 | 3.6200788E−03 | 7.6065699E−04 | −4.6448677E−04 |
| 5 | 0.0000000E+00 | −9.1054824E−04 | −2.8395735E−03 | 5.8457548E−04 | 1.2634230E−03 | 5.8030977E−04 | −6.9079319E−05 |
| 6 | 0.0000000E+00 | −1.0207010E−02 | 6.2635815E−03 | 8.0858841E−04 | −1.2345468E−03 | −8.0529203E−04 | 5.7664724E−04 |
| 12 | 0.0000000E+00 | −4.5547763E−03 | −4.8593583E−03 | 5.6610998E−04 | 1.3617043E−03 | 5.7508513E−04 | −1.4022249E−04 |
| 13 | 0.0000000E+00 | 8.9417253E−03 | 1.3287713E−02 | 2.5293519E−03 | 1.4445088E−05 | 4.9633691E−05 | 4.1054475E−04 |

TABLE 16

EXAMPLE 16

(A)

| Si | Ri | Di | Ndj | ν dj |
|---|---|---|---|---|
| 1 | 19.1124 | 1.65010 | 1.8830 | 40.8 |
| 2 | 4.0933 | 2.99994 | | |
| *3 | 33.6358 | 1.09016 | 1.5339 | 55.9 |
| *4 | 1.4401 | 1.38560 | | |
| *5 | −21.7237 | 1.87072 | 1.6335 | 23.6 |
| *6 | −4.5851 | 0.92811 | | |
| 7 (St) | ∞ | 0.22003 | | |
| 8 | 3.7852 | 2.39072 | 1.6779 | 55.3 |
| 9 | −3.7298 | 0.43934 | | |
| 10 | −2.9860 | 0.69063 | 1.9229 | 18.9 |
| 11 | 11.7354 | 0.16466 | | |
| *12 | 3.2575 | 1.88242 | 1.5339 | 55.9 |
| *13 | −1.8817 | 2.12592 | | |
| 14 | ∞ | 0.30000 | 1.5168 | 64.2 |
| 15 | ∞ | 0.07249 | | |
| IMAGE PLANE | ∞ | * | | |

(B)

| L | 18.1 |
|---|---|
| Bf | 2.4 |
| f | 0.99 |
| f1 | −6.22 |
| f2 | −2.85 |
| f3 | 8.80 |
| f4 | 3.18 |
| f5 | −2.52 |
| f6 | 2.56 |
| f23 | −7.83 |
| f45 | 12.07 |

(C)

| | KA | RB3 | RB4 | RB5 | RB6 | RB7 | RB8 |
|---|---|---|---|---|---|---|---|
| 3 | 0.0000000E+00 | 1.1302555E−03 | −5.3976596E−04 | −6.2349115E−04 | −1.1101261E−04 | 2.3248838E−04 | −7.5861402E−05 |
| 4 | 0.0000000E+00 | −1.0522044E−02 | −1.2126094E−03 | 1.1514267E−03 | 3.6998641E−03 | 8.0245799E−04 | −4.5300885E−04 |
| 5 | 0.0000000E+00 | −7.4230886E−04 | −2.7882029E−03 | 6.3302767E−04 | 1.3127481E−03 | 6.2489482E−04 | −3.0902174E−05 |
| 6 | 0.0000000E+00 | −1.0109178E−02 | 6.1935181E−03 | 7.5235935E−04 | −1.2664325E−03 | −8.2892812E−04 | 5.5270229E−04 |
| 12 | 0.0000000E+00 | −4.8769728E−03 | −4.8948942E−03 | 5.6024397E−04 | 1.3410211E−03 | 5.9856313E−04 | −1.2329356E−04 |
| 13 | 0.0000000E+00 | 1.0047645E−02 | 1.3538766E−02 | 2.5457521E−03 | 4.2529876E−05 | 1.0296145E−04 | 4.4379556E−04 |

TABLE 17

EXAMPLE 17

| (A) | | | | | (B) | |
|---|---|---|---|---|---|---|
| Si | Ri | Di | Ndj | νdj | L | 18.5 |
| 1 | 19.1534 | 1.65016 | 1.8830 | 40.8 | Bf | 2.4 |
| 2 | 4.2105 | 2.99994 | | | f | 0.99 |
| *3 | 27.6462 | 1.09042 | 1.5339 | 55.9 | f1 | −6.45 |
| *4 | 1.4168 | 1.74765 | | | f2 | −2.84 |
| *5 | −20.8261 | 1.87033 | 1.6335 | 23.6 | f3 | 8.97 |
| *6 | −4.6218 | 0.89922 | | | f4 | 3.21 |
| 7 (St) | ∞ | 0.22003 | | | f5 | −2.44 |
| 8 | 3.7996 | 2.39665 | 1.6779 | 55.3 | f6 | 2.62 |
| 9 | −3.7880 | 0.43963 | | | f23 | −8.44 |
| 10 | −2.9502 | 0.69223 | 1.9229 | 18.9 | f45 | 13.77 |
| 11 | 10.6491 | 0.16475 | | | | |
| *12 | 3.3061 | 1.89882 | 1.5339 | 55.9 | | |
| *13 | −1.9350 | 2.24459 | | | | |
| 14 | ∞ | 0.30000 | 1.5168 | 64.2 | | |
| 15 | ∞ | 0.00014 | | | | |
| IMAGE PLANE | ∞ | * | | | | |

(C)

| | KA | RB3 | RB4 | RB5 | RB6 | RB7 | RB8 |
|---|---|---|---|---|---|---|---|
| 3 | 0.0000000E+00 | 1.2135826E−03 | −5.4827237E−04 | −6.2228982E−04 | −1.1839901E−04 | 2.3599533E−04 | −6.8931254E−05 |
| 4 | 0.0000000E+00 | −9.6585402E−03 | −1.0997123E−03 | 1.0661618E−03 | 3.6200788E−03 | 7.6065699E−04 | −4.6448677E−04 |
| 5 | 0.0000000E+00 | −9.1054824E−04 | −2.8395735E−03 | 5.8457548E−04 | 1.2634230E−03 | 5.8030977E−04 | −6.9079319E−05 |
| 6 | 0.0000000E+00 | −1.0207010E−02 | 6.2635815E−03 | 8.0858841E−04 | −1.2345468E−03 | −8.0529203E−04 | 5.7664724E−04 |
| 12 | 0.0000000E+00 | −4.5547763E−03 | −4.8593583E−03 | 5.6610998E−04 | 1.3617043E−03 | 5.7508513E−04 | −1.4022249E−04 |
| 13 | 0.0000000E+00 | 8.9417253E−03 | 1.3287713E−02 | 2.5293519E−03 | 1.4445088E−05 | 4.9633691E−05 | 4.1054475E−04 |

TABLE 18

EXAMPLE 18

| (A) | | | | | (B) | |
|---|---|---|---|---|---|---|
| Si | Ri | Di | Ndj | νdj | L | 19.1 |
| 1 | 19.8680 | 1.65030 | 1.8830 | 40.8 | Bf | 2.6 |
| 2 | 4.0183 | 3.00000 | | | f | 1.15 |
| *3 | 39.0518 | 1.09922 | 1.5339 | 55.9 | f1 | −6.00 |
| *4 | 1.6221 | 1.78227 | | | f2 | −3.20 |
| *5 | −28.3241 | 1.87504 | 1.6335 | 23.6 | f3 | 8.21 |
| *6 | −4.5064 | 1.07592 | | | f4 | 3.22 |
| 7 (St) | ∞ | 0.22000 | | | f5 | −2.28 |
| 8 | 3.7625 | 2.42015 | 1.6779 | 55.3 | f6 | 2.82 |
| 9 | −3.8476 | 0.44429 | | | f23 | −13.62 |
| 10 | −2.9085 | 0.69636 | 1.9591 | 17.5 | f45 | 17.47 |
| 11 | 9.8419 | 0.16329 | | | | |
| *12 | 3.2833 | 2.03547 | 1.5339 | 55.9 | | |
| *13 | −2.1813 | 2.21192 | | | | |
| 14 | ∞ | 0.30000 | 1.5168 | 64.2 | | |
| 15 | ∞ | 0.00000 | | | | |
| IMAGE PLANE | ∞ | * | | | | |

(C)

| | KA | RB3 | RB4 | RB5 | RB6 | RB7 | RB8 |
|---|---|---|---|---|---|---|---|
| 3 | 0.0000000E+00 | −9.1495283E−04 | −1.0472207E−03 | −7.6266433E−04 | −2.1547070E−04 | 2.2711604E−04 | −5.6077130E−05 |
| 4 | 0.0000000E+00 | −4.7704519E−03 | −2.3811883E−03 | −3.1183127E−04 | 2.8498261E−03 | 4.5083352E−04 | −5.2208159E−04 |
| 5 | 0.0000000E+00 | −1.2522367E−03 | −2.5714865E−03 | 6.8771772E−04 | 1.2301342E−03 | 4.7958213E−04 | −2.2589801E−04 |
| 6 | 0.0000000E+00 | −1.0434528E−02 | 6.5485969E−03 | 9.1812795E−04 | −1.2651927E−03 | −8.6106848E−04 | 5.4604863E−04 |
| 12 | 0.0000000E+00 | −3.3326210E−03 | −4.5752374E−03 | 5.5605340E−04 | 1.3170792E−03 | 5.4146064E−04 | −1.6569472E−04 |
| 13 | 0.0000000E+00 | 7.2677508E−03 | 1.2173467E−02 | 2.1742649E−03 | −9.3472367E−05 | −1.8051682E−06 | 3.8227702E−04 |

TABLE 19

EXAMPLE 19

(A)

| Si | Ri | Di | Ndj | νdj |
|---|---|---|---|---|
| 1 | 14.5366 | 1.00010 | 1.7725 | 49.6 |
| 2 | 3.6087 | 2.32583 | | |
| *3 | −9.6209 | 1.00002 | 1.5339 | 55.9 |
| *4 | 1.7543 | 1.31209 | | |
| *5 | −15.8107 | 1.70001 | 1.6336 | 23.6 |
| *6 | −4.1898 | 0.58330 | | |
| 7 (St) | ∞ | 0.20001 | | |
| 8 | 3.2152 | 1.50020 | 1.7550 | 52.3 |
| 9 | −3.0768 | 0.40418 | | |
| 10 | −2.3350 | 0.60198 | 1.9591 | 17.5 |
| 11 | 7.9008 | 0.10004 | | |
| *12 | 2.9551 | 1.50009 | 1.5339 | 55.9 |
| *13 | −1.6122 | 0.50000 | | |
| 14 | ∞ | 0.50000 | 1.5168 | 64.2 |
| 15 | ∞ | 1.14364 | | |
| IMAGE PLANE | ∞ | * | | |

(B)

| L | 14.2 |
|---|---|
| Bf | 2.0 |
| f | 0.96 |
| f1 | −6.47 |
| f2 | −2.70 |
| f3 | 8.51 |
| f4 | 2.32 |
| f5 | −1.83 |
| f6 | 2.21 |
| f23 | −7.48 |
| f45 | 9.54 |

(C)

| | KA | RB3 | RB4 | RB5 | RB6 | RB7 | RB8 |
|---|---|---|---|---|---|---|---|
| 3 | 0.0000000E+00 | 2.2029093E−02 | 9.6841249E−03 | 1.0600324E−03 | −2.9248348E−03 | −5.1089151E−06 | 1.4184556E−04 |
| 4 | 0.0000000E+00 | 8.7378422E−03 | 2.0512755E−02 | 1.7948847E−02 | 8.6760551E−03 | −2.1839669E−03 | −5.8205467E−03 |
| 5 | 0.0000000E+00 | 7.4398591E−03 | −8.8937072E−03 | 2.2141918E−04 | 3.5150335E−03 | 1.5118150E−03 | −2.4618447E−03 |
| 6 | 0.0000000E+00 | −1.7470486E−03 | 3.4442680E−03 | −5.1197726E−04 | −4.0029098E−05 | 3.3501886E−04 | 4.5662776E−04 |
| 12 | 0.0000000E+00 | −2.6808717E−02 | −5.6039222E−03 | 6.0176133E−03 | 3.1411856E−03 | 5.1341299E−04 | 1.2985840E−04 |
| 13 | 0.0000000E+00 | −2.2011342E−03 | 3.0343871E−02 | 1.2793178E−03 | −3.2740690E−03 | 1.5772732E−04 | 3.5217907E−03 |

TABLE 20

CONDITIONAL FORMULA

| EXAMPLE | (1) (R8 + R9)/(R8 − R9) | (2) D9/f | (3) (R5 + R6)/(R5 − R6) | (4) (R10 + R11)/(R10 − R11) | (5) D4/f | (6) νd3 + νd5 | (7) \|f1/f\| | (8) \|f2/f\| | (9) f3/f | (10) f4/f | (11) R2/f | (12) R9/f | (13) R1/f | (14) f6/f | (15) R13/f | (16) f5/f | (17) R4/f |
|---|---|---|---|---|---|---|---|---|---|---|---|---|---|---|---|---|---|
| 1 | −0.04 | 0.39 | 1.05 | −0.65 | 1.71 | 44.42 | 6.20 | 2.33 | 5.78 | 2.75 | 3.65 | −3.17 | 12.56 | 2.40 | −1.94 | −2.10 | 1.30 |
| 2 | −0.03 | 0.38 | 1.16 | −0.65 | 1.78 | 44.42 | 6.49 | 2.29 | 6.22 | 2.79 | 3.64 | −3.17 | 12.50 | 2.45 | −1.99 | −2.12 | 1.28 |
| 3 | 0.00 | 0.47 | 1.02 | −0.66 | 2.24 | 44.42 | 6.56 | 2.59 | 7.26 | 3.56 | 3.89 | −3.87 | 13.29 | 2.89 | −2.50 | −2.70 | 1.51 |
| 4 | −0.01 | 0.26 | 1.70 | −1.12 | 0.93 | 44.42 | 3.90 | 2.46 | 6.71 | 1.89 | 2.28 | −2.54 | 10.45 | 2.91 | −2.93 | −2.11 | 1.10 |
| 5 | 0.10 | 0.51 | 0.36 | −0.60 | 1.79 | 44.42 | 7.57 | 2.34 | 8.57 | 3.32 | 4.27 | −4.14 | 17.80 | 3.10 | −2.58 | −3.03 | 1.39 |
| 6 | 0.11 | 0.60 | 1.89 | −0.91 | 2.31 | 44.42 | 8.64 | 2.81 | 12.34 | 3.22 | 5.12 | −3.99 | 20.05 | 3.25 | −2.52 | −3.43 | 1.12 |
| 7 | −0.05 | 0.38 | 1.55 | −0.66 | 1.93 | 44.42 | 5.66 | 2.52 | 7.77 | 2.72 | 3.61 | −3.37 | 15.43 | 2.87 | −2.72 | −2.15 | 1.38 |
| 8 | 0.02 | 0.43 | 1.79 | −0.55 | 1.28 | 42.51 | 6.44 | 2.94 | 9.34 | 2.50 | 3.54 | −3.31 | 13.86 | 2.37 | −1.74 | −2.04 | 1.94 |
| 9 | 0.02 | 0.42 | 1.77 | −0.54 | 1.33 | 42.51 | 6.77 | 2.85 | 9.05 | 2.43 | 3.76 | −3.22 | 14.97 | 2.31 | −1.69 | −1.96 | 1.86 |
| 10 | 0.01 | 0.39 | 1.59 | −0.61 | 1.48 | 42.51 | 6.04 | 2.52 | 7.42 | 2.35 | 3.42 | −3.04 | 14.39 | 2.32 | −1.88 | −1.83 | 1.67 |
| 11 | −0.01 | 0.40 | 1.38 | −0.54 | 1.59 | 42.52 | 5.35 | 2.86 | 7.33 | 2.87 | 3.58 | −3.43 | 17.67 | 2.52 | −1.95 | −2.11 | 1.45 |
| 12 | 0.00 | 0.44 | 1.50 | −0.56 | 1.82 | 42.52 | 6.55 | 2.77 | 8.73 | 3.24 | 4.24 | −3.84 | 18.88 | 2.69 | −1.99 | −2.43 | 1.40 |
| 13 | 0.00 | 0.45 | 1.57 | −0.57 | 1.78 | 42.52 | 6.55 | 2.93 | 9.12 | 3.26 | 4.29 | −3.84 | 19.75 | 2.64 | −1.95 | −2.50 | 1.46 |
| 14 | 0.01 | 0.45 | 1.59 | −0.57 | 1.73 | 42.52 | 6.55 | 2.94 | 9.22 | 3.26 | 4.30 | −3.84 | 19.82 | 2.64 | −1.94 | −2.52 | 1.46 |
| 15 | 0.00 | 0.45 | 1.57 | −0.57 | 1.77 | 42.52 | 6.53 | 2.87 | 9.09 | 3.25 | 4.26 | −3.84 | 19.40 | 2.65 | −1.96 | −2.48 | 1.44 |
| 16 | 0.01 | 0.45 | 1.54 | −0.59 | 1.40 | 42.52 | 6.30 | 2.89 | 8.92 | 3.22 | 4.15 | −3.78 | 19.37 | 2.59 | −1.91 | −2.56 | 1.46 |
| 17 | 0.00 | 0.45 | 1.57 | −0.57 | 1.77 | 42.52 | 6.53 | 2.87 | 9.09 | 3.25 | 4.26 | −3.84 | 19.40 | 2.65 | −1.96 | −2.48 | 1.44 |
| 18 | −0.01 | 0.39 | 1.38 | −0.54 | 1.55 | 41.09 | 5.23 | 2.79 | 7.15 | 2.81 | 3.50 | −3.35 | 17.32 | 2.46 | −1.90 | −1.99 | 1.41 |
| 19 | 0.02 | 0.42 | 1.72 | −0.54 | 1.37 | 41.08 | 6.76 | 2.82 | 8.89 | 2.42 | 3.77 | −3.21 | 15.18 | 2.30 | −1.68 | −1.91 | 1.83 |

TABLE 21

CONDITIONAL FORMULA

| EXAMPLE | (18) r10/f | (19) (D4 + D5)/f | (20) f/r5 | (21) f/r3 | (22) f23/f | (23) f45/f | (24) L/f | (25) Bf/f | (26) (R1 + R2)/(R1 − R2) |
|---|---|---|---|---|---|---|---|---|---|
| 1 | −2.40 | 3.32 | −0.01 | 0.18 | −19.20 | 13.85 | 14.10 | 1.92 | 1.82 |
| 2 | −2.42 | 3.49 | −0.02 | 0.21 | −14.17 | 13.27 | 14.18 | 2.00 | 1.82 |
| 3 | −3.05 | 4.29 | 0.00 | 0.34 | −16.97 | 17.68 | 17.90 | 2.43 | 1.83 |

TABLE 21-continued

| | CONDITIONAL FORMULA | | | | | | | |
|---|---|---|---|---|---|---|---|---|
| EXAMPLE | (18) r10/f | (19) (D4 + D5)/f | (20) f/r5 | (21) f/r3 | (22) f23/f | (23) f45/f | (24) L/f | (25) Bf/f | (26) (R1 + R2)/(R1 − R2) |
| 4 | −1.82 | 2.02 | −0.08 | −0.47 | −6.56 | 4.27 | 10.39 | 1.87 | 1.56 |
| 5 | −3.57 | 3.91 | 0.06 | 0.48 | −5.79 | 11.77 | 18.75 | 2.79 | 1.63 |
| 6 | −3.33 | 4.17 | −0.06 | −1.41 | −5.94 | 8.86 | 18.74 | 2.53 | 1.69 |
| 7 | −2.43 | 3.53 | −0.06 | 0.08 | −9.33 | 9.50 | 16.54 | 2.20 | 1.61 |
| 8 | −2.49 | 3.10 | −0.06 | 0.65 | −7.74 | 9.26 | 15.08 | 2.07 | 1.69 |
| 9 | −2.42 | 3.10 | −0.06 | 0.68 | −7.72 | 9.22 | 14.72 | 2.01 | 1.67 |
| 10 | −2.16 | 2.72 | −0.06 | 0.73 | −7.90 | 7.80 | 14.03 | 1.87 | 1.62 |
| 11 | −2.59 | 3.25 | −0.04 | −0.15 | −12.03 | 13.37 | 16.87 | 2.20 | 1.51 |
| 12 | −2.95 | 3.70 | −0.04 | −0.19 | −8.63 | 14.33 | 18.93 | 2.48 | 1.58 |
| 13 | −3.01 | 3.68 | −0.05 | −0.24 | −8.82 | 13.72 | 18.75 | 2.44 | 1.56 |
| 14 | −3.03 | 3.64 | −0.05 | −0.23 | −8.61 | 13.47 | 18.71 | 2.45 | 1.55 |
| 15 | −2.99 | 3.66 | −0.05 | −0.23 | −8.54 | 13.94 | 18.75 | 2.47 | 1.56 |
| 16 | −3.03 | 3.30 | −0.05 | −0.16 | −7.94 | 12.23 | 18.35 | 2.43 | 1.55 |
| 17 | −2.99 | 3.66 | −0.05 | −0.23 | −8.54 | 13.94 | 18.75 | 2.47 | 1.56 |
| 18 | −2.53 | 3.19 | −0.04 | −0.15 | −11.87 | 15.23 | 16.62 | 2.27 | 1.51 |
| 19 | −2.44 | 3.14 | −0.06 | 0.67 | −7.81 | 9.96 | 14.82 | 2.06 | 1.66 |

In the imaging lenses of Examples 1 through 19, first lens L1, fourth lens L4 and fifth lens L5 are glass spherical lenses, and second lens L2, third lens L3 and sixth lens L6 are plastic aspheric lenses.

Figure 22:
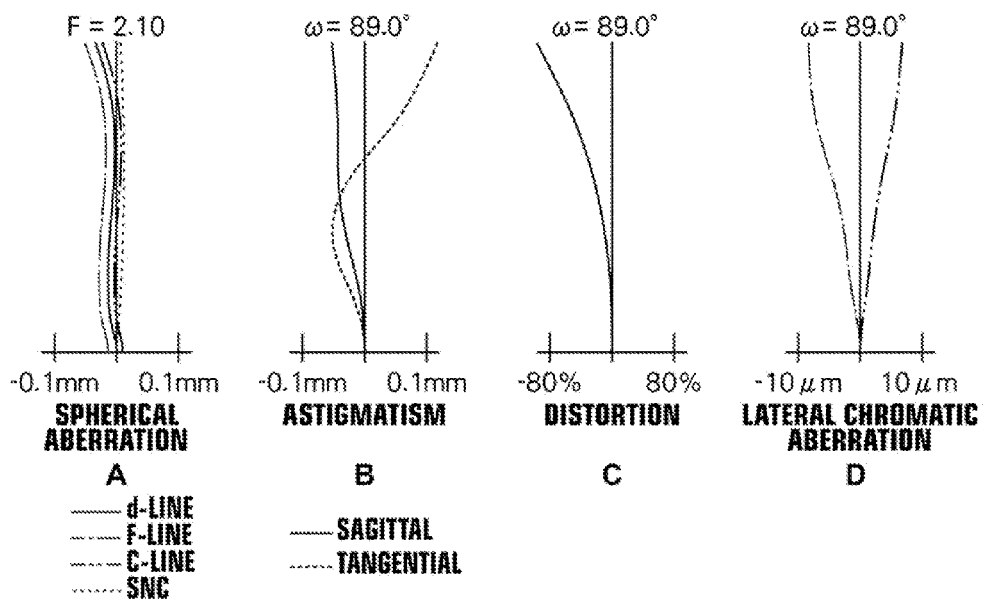
FIG. 22, Sections A through D are aberration diagrams of the imaging lens in Example 1 of the present invention.
Figure 27:
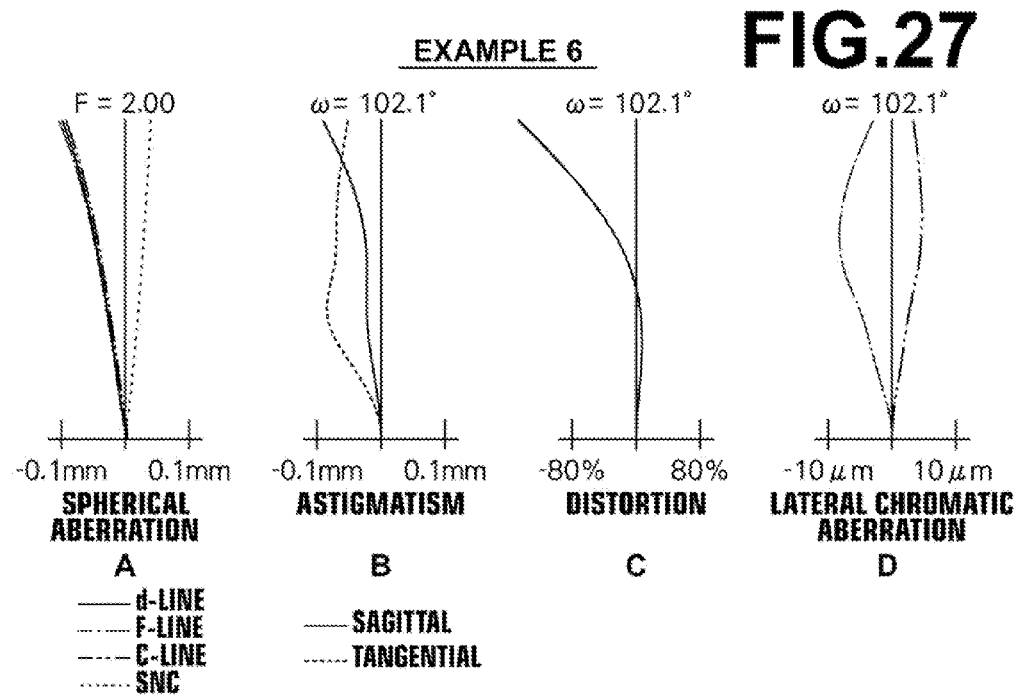
FIG. 27, Sections A through D are aberration diagrams of the imaging lens in Example 6 of the present invention.
Figure 28:
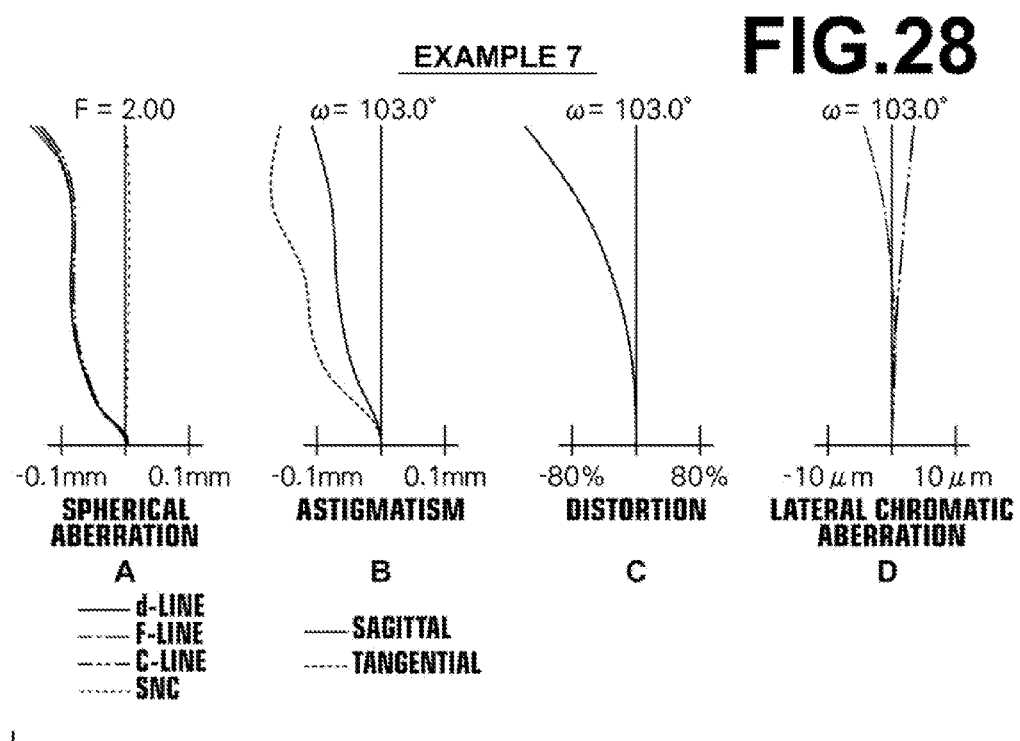
FIG. 28, Sections A through D are aberration diagrams of the imaging lens in Example 7 of the present invention.
Figure 29:
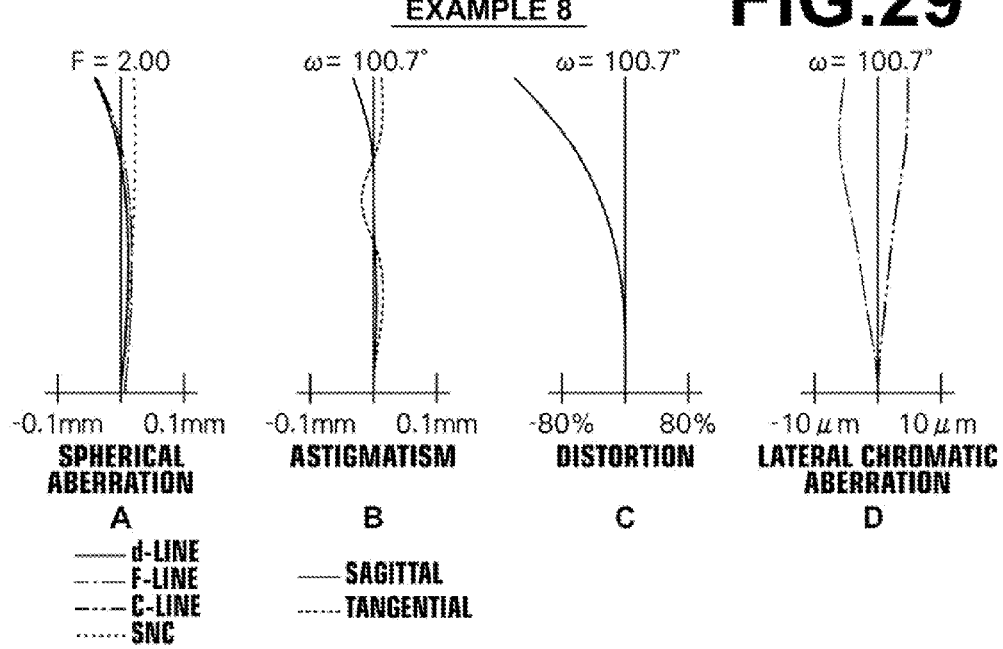
FIG. 29, Sections A through D are aberration diagrams of the imaging lens in Example 8 of the present invention.
Figure 30:
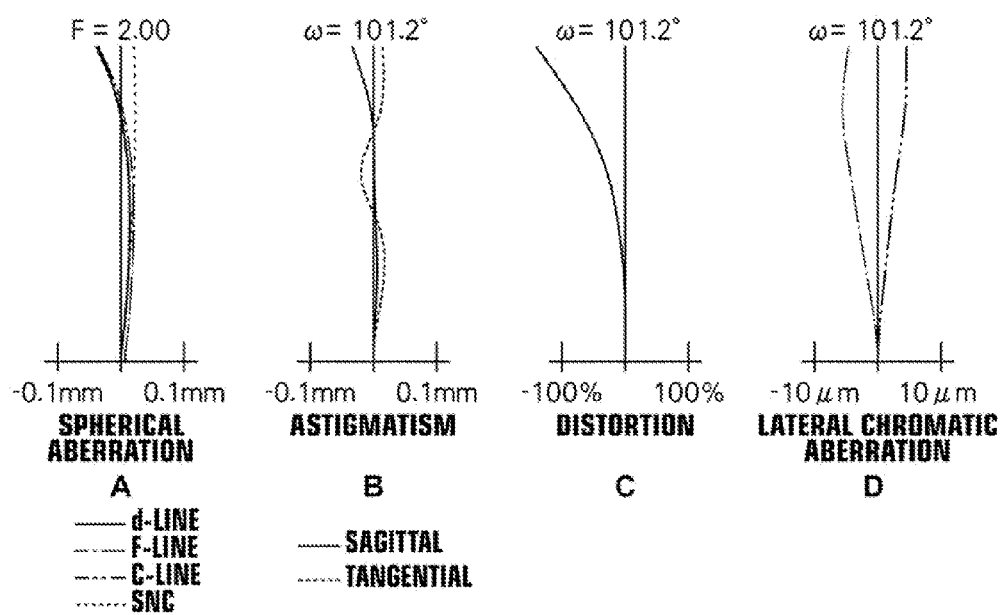
FIG. 30, Sections A through D are aberration diagrams of the imaging lens in Example 9 of the present invention.
Figure 37:
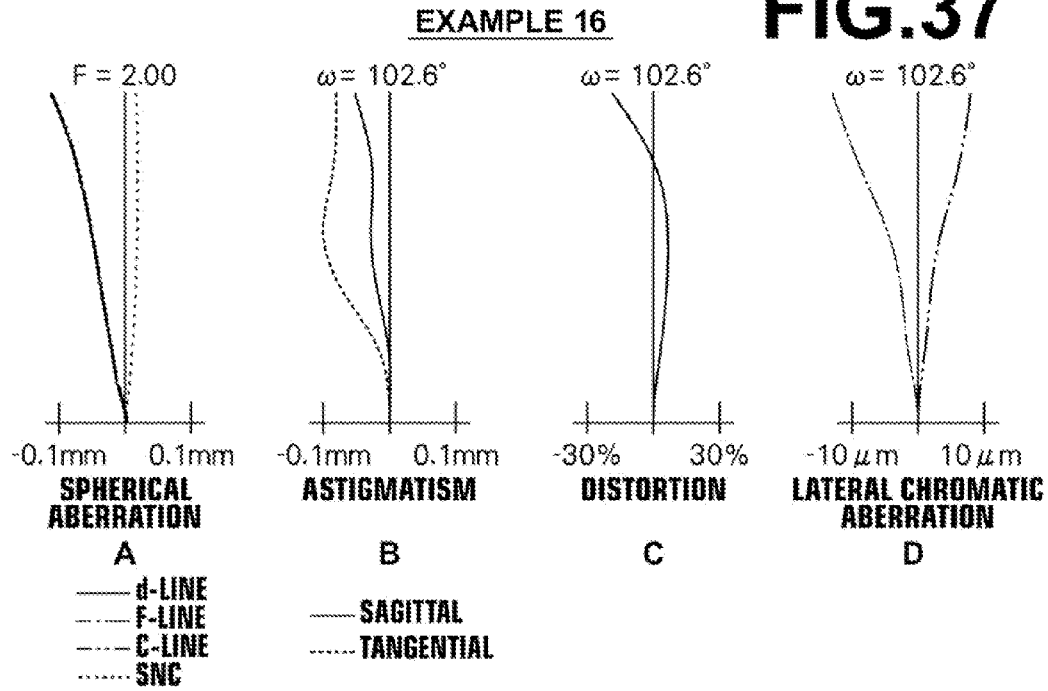
FIG. 37, Sections A through D are aberration diagrams of the imaging lens in Example 16 of the present invention.
Figure 38:
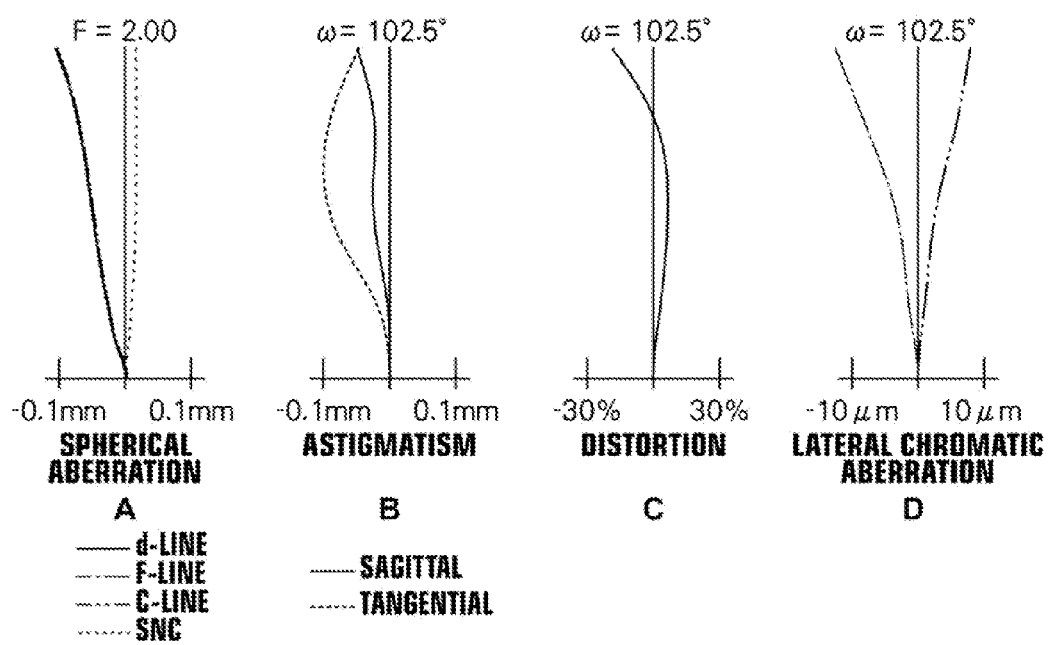
FIG. 38, Sections A through D are aberration diagrams of the imaging lens in Example 17 of the present invention.

Aberration diagrams of the imaging lenses according to Examples 1 through 19 are illustrated in FIG. 22, Sections A through D, FIG. 23, Sections A through D, FIG. 24, Sections A through D, FIG. 25, Sections A through D, FIG. 26, Sections A through D, FIG. 27, Sections A through D, FIG. 28, Sections A through D, FIG. 29, Sections A through D, FIG. 30, Sections A through D, FIG. 31, Sections A through D, FIG. 32, Sections A through D, FIG. 33, Sections A through D, FIG. 34, Sections A through D, FIG. 35, Sections A through D, FIG. 36, Sections A through D, FIG. 37, Sections A through D, FIG. 38, Sections A through D, FIG. 39, Sections A through D, and FIG. 40, Sections A through D, respectively.

Here, the aberration diagrams of Example 1 will be explained as an example, but the aberration diagrams of the other examples are similar to those of Example 1. FIG. 22, Section A, Section B, Section C and Section D illustrate a spherical aberration, astigmatism, distortion (distortion aberration), and a lateral chromatic aberration (a chromatic aberration of magnification) in the imaging lens of Example 1, respectively. In the diagram of a spherical aberration, F represents F-number, and in the other diagrams, ω represents a half angle of view. In the diagram of distortion, a shift amount from an ideal image height 2f×tan(φ/2) is illustrated by using focal length f of the entire system and angle φ of view (variable, 0≤φ≤ω). Each aberration diagram illustrates an aberration when d-line (587.56 nm) is a reference wavelength. The diagram of spherical aberrations illustrates aberrations also for F-line (wavelength 486.13 nm), C-line (wavelength 656.27 nm) and an offense against the sine condition (indicated as SNC). Further, the diagram of lateral chromatic aberrations illustrates aberrations for F-line and C-line. Since the kinds of line used in the diagram of lateral chromatic aberrations are the same as those used in the diagram of spherical aberrations, the descriptions are omitted in the diagram of lateral chromatic aberrations.

As these data show, the imaging lens of Examples 1 through 19 consists of six lenses, which are a small number of lenses, and producible in small size and at low cost. Further, it is possible to achieve an extremely wide angle of view of a full angle of view of about 178 to 208 degrees. Further, F-number is 2.0, which is small. Further, the imaging lens has excellent optical performance in which each aberration has been corrected in an excellent manner. These imaging lenses are appropriate for use in a surveillance camera, an in-vehicle camera for imaging an image on the front side, the lateral sides, the rear side or the like of a car, or the like.

[Embodiment of Imaging Apparatus]

Figure 41:
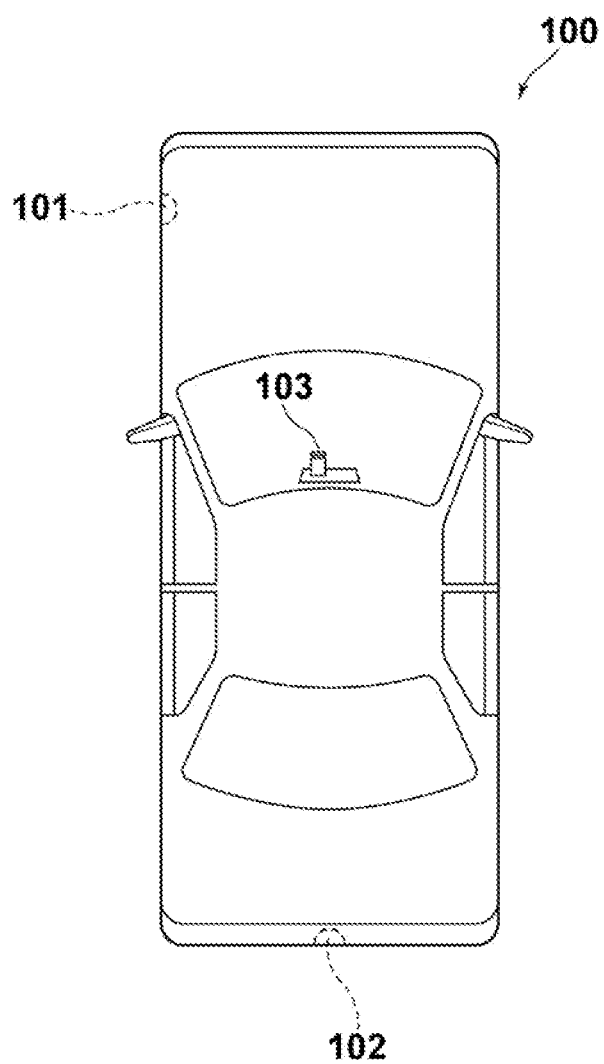
FIG. 41 is a diagram for explaining the arrangement of imaging apparatuses for in-vehicle use according to an embodiment of the present invention.

FIG. 41 illustrates, as an example of usage, a manner of mounting an imaging apparatus including an imaging lens according to an embodiment of the present invention in a car 100. In FIG. 41, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to an embodiment of the present invention, and they include an imaging lens according to an example of the present invention and an imaging device for converting an optical image formed by the imaging lens into electrical signals.

The imaging lenses according to the examples of the present invention have the aforementioned advantages. Therefore, the exterior cameras 101 and 102, and the interior camera 103 can be structured also in small size and at low cost, and have wide angles of view. Further, they can obtain excellent images even in a peripheral portion of an image formation area.

So far, the present invention has been described by using embodiments and examples. However, the present invention is not limited to the aforementioned embodiments nor examples, and various modifications are possible. For example, the values of a curvature radius, a distance between surfaces, a refractive index, and an Abbe number of each lens element are not limited to the values in the aforementioned examples of numerical values, but may be other values.

In the aforementioned examples, all of the lenses consist of homogeneous materials. Alternatively, a gradient index lens having a distribution of refractive index may be used. Further, in some of the aforementioned examples, second lens L2 through sixth lens L6 consist of refraction-type lenses on which aspherical surfaces are formed. A diffraction optical element or elements may be formed on a surface or plural surfaces.

In the embodiment of the imaging apparatus, a case in which the present invention is applied to an in-vehicle camera was described with reference to the drawing. However, the use of the present invention is not limited to this purpose. For example, the present invention may be applied to a camera for a mobile terminal, a surveillance camera, and the like.

What is claimed is:

1. An imaging lens substantially consisting of six lenses of a negative first lens, a negative second lens, a positive third lens, a positive fourth lens, a negative fifth lens and a positive sixth lens in this order from an object side,
   wherein the following conditional formulas (1) and (6) are satisfied:

$$-0.11 < (R8+R9)/(R8-R9) < 0.44 \quad (1); \text{ and}$$

$$38.1 < vd3+vd5 < 45.1 \quad (6), \text{ where}$$

R8: a curvature radius of an object-side surface of fourth lens,
   R9: a curvature radius of an image-side surface of fourth lens,
   vd3: an Abbe number of the material of third lens for d-line, and
   vd5: an Abbe number of the material of fifth lens for d-line.

2. An imaging lens substantially consisting of six lenses of a negative first lens, a negative second lens, a positive third lens, a positive fourth lens, a negative fifth lens and a positive sixth lens in this order from an object side,
   wherein Abbe numbers of materials of the first lens, the second lens, the fourth lens and the sixth lens for d-line are greater than or equal to 40, and
   wherein the following conditional formulas (1-1) and (12) are satisfied:

$$-0.11 < (R8+R9)/(R8-R9) \quad (1\text{-}1); \text{ and}$$

$$R9/f < -2.9 \quad (12), \text{ where}$$

R8: a curvature radius of an object-side surface of fourth lens,
   R9: a curvature radius of an image-side surface of fourth lens, and
   f: a focal length of an entire system.

3. An imaging lens substantially consisting of six lenses of a negative first lens, a negative second lens, a positive third lens, a positive fourth lens, a negative fifth lens and a positive sixth lens in this order from an object side,
   wherein Abbe numbers of materials of the first lens, the second lens, the fourth lens and the sixth lens for d-line are greater than or equal to 40, and
   wherein the following conditional formulas (1-2) and (4) are satisfied:

$$-0.075 < (R8+R9)/(R8-R9) < 0.11 \quad (1\text{-}2); \text{ and}$$

$$-1.04 < (R10+R1)/(R10-R11) < -0.34 \quad (4), \text{ where}$$

R8: a curvature radius of an object-side surface of fourth lens,
   R9: a curvature radius of an image-side surface of fourth lens,
   R10: a curvature radius of an object-side surface of fifth lens, and
   R11: a curvature radius of an image-side surface of fifth lens.

4. An imaging lens substantially consisting of six lenses of a negative first lens, a negative second lens, a positive third lens, a positive fourth lens, a negative fifth lens and a positive sixth lens in this order from an object side,
   wherein an object-side surface of the third lens is concave, and
   wherein Abbe numbers of materials of the first lens, the second lens, the fourth lens and the sixth lens for d-line are greater than or equal to 40, and
   wherein vd1/vd3 is greater than or equal to 1.4 and less than or equal to 2.5 when the Abbe number of the material of the first lens for d-line is |d1 and an Abbe number of the material of the third lens for d-line is vd3, and
   wherein the following conditional formulas (1-3) and (4-1) are satisfied:

$$(R8+R9)/(R8-R9) < 0.17 \quad (1\text{-}3); \text{ and}$$

$$(R10+R11)/(R10-R11) < -0.35 \quad (4\text{-}1), \text{ where}$$

R8: a curvature radius of an object-side surface of fourth lens,
   R9: a curvature radius of an image-side surface of fourth lens,
   R10: a curvature radius of an object-side surface of fifth lens, and
   R11: a curvature radius of an image-side surface of fifth lens.

5. The imaging lens, as defined in claim 4,
   wherein the fourth lens is a biconvex lens, and
   wherein the fifth lens is a biconcave lens, and
   wherein the following conditional formulas (1-3) and (4-1) are satisfied:

$$(R8+R9)/(R8-R9) < 0.17 \quad (1\text{-}3); \text{ and}$$

$$(R10+R11)/(R10-R11) < -0.35 \quad (4\text{-}1), \text{ where}$$

R8: a curvature radius of an object-side surface of fourth lens,
   R9: a curvature radius of an image-side surface of fourth lens,
   R10: a curvature radius of an object-side surface of fifth lens, and
   R11: a curvature radius of an image-side surface of fifth lens.

6. The imaging lens, as defined in claim 1, wherein the following conditional formula (19) is satisfied:

$$1 < (D4+D5)/f < 6 \quad (19), \text{ where}$$

D4: an air space between the second lens and the third lens on an optical axis,
   D5: a center thickness of the third lens, and
   f: a focal length of an entire system.

7. The imaging lens, as defined in claim 6, wherein the following conditional formula (19-3) is satisfied:

$$1.9 < (D4+D5)/f < 4.4 \quad (19\text{-}3), \text{ where}$$

D4: an air space between the second lens and the third lens on an optical axis,
   D5: a center thickness of the third lens, and
   f: a focal length of an entire system.

8. The imaging lens, as defined in claim 1, wherein the following conditional formula (20) is satisfied:

$$-1 < f/R5 < 1 \quad (20), \text{ where}$$

f: a focal length of an entire system, and
   R5: a curvature radius of an object-side surface of the third lens.

9. The imaging lens, as defined in claim 8, wherein the following conditional formula (20-2) is satisfied:

$$-0.5 < f/R5 < 0.5 \qquad (20\text{-}2), \text{ where}$$

f: a focal length of an entire system, and
R5: a curvature radius of an object-side surface of the third lens.

10. The imaging lens, as defined in claim 1, wherein the following conditional formula (21) is satisfied:

$$-3 < f/R3 < 3 \qquad (21), \text{ where}$$

f: a focal length of an entire system, and
R3: a curvature radius of an object-side surface of the second lens.

11. The imaging lens, as defined in claim 10, wherein the following conditional formula (21-2) is satisfied:

$$-2.0 < f/R3 < 1.5 \qquad (21\text{-}2), \text{ where}$$

f: a focal length of an entire system, and
R3: a curvature radius of an object-side surface of the second lens.

12. The imaging lens, as defined in claim 1, wherein the following conditional formula (22) is satisfied:

$$-30 < f23/f < -3 \qquad (22), \text{ where}$$

f23: a combined focal length of the second lens and the third lens, and
f: a focal length of an entire system.

13. The imaging lens, as defined in claim 12, wherein the following conditional formula (22-2) is satisfied:

$$-20 < f23/f < -5 \qquad (22\text{-}2), \text{ where}$$

f23: a combined focal length of the second lens and the third lens, and
f: a focal length of an entire system.

14. The imaging lens, as defined in claim 1, wherein the following conditional formula (23) is satisfied:

$$2 < f45/f < 25 \qquad (23), \text{ where}$$

f45: a combined focal length of the fourth lens and the fifth lens, and
f: a focal length of an entire system.

15. The imaging lens, as defined in claim 14, wherein the following conditional formula (23-2) is satisfied:

$$4 < f45/f < 20 \qquad (23\text{-}2), \text{ where}$$

f45: a combined focal length of the fourth lens and the fifth lens, and
f: a focal length of an entire system.

16. The imaging lens, as defined in claim 1, where a stop is arranged between the third lens and the fourth lens.

17. An imaging apparatus comprising:
the imaging lens, as defined in claim 1, mounted thereon.

* * * * *